(12) United States Patent
Frangione et al.

(10) Patent No.: US 6,516,189 B1
(45) Date of Patent: Feb. 4, 2003

(54) SYSTEM AND METHOD FOR GATHERING DATA FROM WIRELESS COMMUNICATIONS NETWORKS

(75) Inventors: Tom Frangione, Novato, CA (US); Mark Heidohrn, Pleasanton, CA (US); John Oyler, San Francisco, CA (US); Alan Peyrat, San Francisco, CA (US)

(73) Assignee: Telephia, Inc., San Francisco, CA (US)

( * ) Notice: Subject to any disclaimer, the term of this patent is extended or adjusted under 35 U.S.C. 154(b) by 0 days.

(21) Appl. No.: 09/271,105

(22) Filed: Mar. 17, 1999

(51) Int. Cl.[7] ............................................. H04M 11/00
(52) U.S. Cl. ...................................... 455/405; 455/2.01
(58) Field of Search ................................ 455/2.01, 3.01, 455/3.03, 405, 456, 423, 425, 560, 67.1, 446

(56) References Cited

U.S. PATENT DOCUMENTS

| | | |
|---|---|---|
| 5,289,526 A | 2/1994 | Chymyck et al. |
| 5,451,839 A | 9/1995 | Rappaport et al. |
| 5,490,204 A | 2/1996 | Gulledge |
| 5,546,444 A | 8/1996 | Roach, Jr. et al. |
| 5,623,535 A | 4/1997 | Leung |
| 5,644,623 A | 7/1997 | Gulledge |
| 5,781,865 A * | 7/1998 | Gammon .................. 455/561 |
| 5,784,442 A * | 7/1998 | Foti ........................ 455/405 |
| 5,822,410 A | 10/1998 | McCausland et al. |
| 5,826,186 A * | 10/1998 | Mitchell .................. 455/410 |
| 6,006,085 A * | 12/1999 | Balachandran ............. 455/405 |
| 6,138,020 A * | 10/2000 | Galyas ..................... 455/436 |
| 6,212,386 B1 * | 4/2001 | Briere ..................... 455/447 |
| 6,223,031 B1 * | 4/2001 | Naslund ................... 455/423 |

FOREIGN PATENT DOCUMENTS

| | | |
|---|---|---|
| WO | WO 95/33352 | 12/1995 |
| WO | WO 96/41492 | 12/1996 |
| WO | WO 98/33344 | 7/1998 |
| WO | WO 98/37724 | 8/1998 |

* cited by examiner

Primary Examiner—Vivian Chin
Assistant Examiner—James K Moore
(74) Attorney, Agent, or Firm—Morrison & Foerster LLP

(57) ABSTRACT

A system and method for gathering data from wireless communication networks, the wireless communication network including a plurality of cell sites, mobile subscriber units, and a mobile telephone switching office. The data gathering system comprises a plurality of data gathering nodes and a control center. Each data gathering node comprises multiple receivers, with each receiver gathering data from a different wireless communication network. Stored data at the control center is processed to generate marketing information on each wireless communication network.

7 Claims, 51 Drawing Sheets

BASELINING PERIOD RAW DATA

| Date | Time | Area code | User ID | Cell site | Carrier | City | Type |
|---|---|---|---|---|---|---|---|
| 3/4/1999 | 12:10:53 | 415 | 2719321 | 33 | Carrier B | San Francisco | TC Assignment |
| 3/4/1999 | 12:10:53 | 415 | 3201813 | 33 | Carrier A | San Francisco | Registration |
| 3/4/1999 | 12:10:54 | 415 | 8043621 | 33 | Carrier B | San Francisco | Registration |
| 3/4/1999 | 12:10:54 | 408 | 6322327 | 33 | Carrier A | San Francisco | TC Assignment |
| 3/4/1999 | 12:10:54 | 650 | 3290201 | 33 | Carrier A | San Francisco | Page |
| 3/4/1999 | 12:10:54 | 213 | 4929087 | 33 | Carrier A | San Francisco | Page |
| 3/4/1999 | 12:10:55 | 650 | 5105341 | 33 | Carrier B | San Francisco | Page |
| 3/4/1999 | 12:10:55 | 650 | 8917483 | 33 | Carrier B | San Francisco | Page |
| 3/4/1999 | 12:10:55 | 510 | 5312381 | 33 | Carrier A | San Francisco | TC Assignment |
| 3/4/1999 | 12:10:55 | 510 | 4075791 | 33 | Carrier A | San Francisco | TC Assignment |
| 3/4/1999 | 12:10:56 | 925 | 6022625 | 33 | Carrier B | San Francisco | Page |
| 3/4/1999 | 12:10:56 | 925 | 7202077 | 33 | Carrier A | San Francisco | Page |
| 3/4/1999 | 12:10:56 | 925 | 4799759 | 33 | Carrier B | San Francisco | Page |
| 3/4/1999 | 12:10:56 | 917 | 8393984 | 33 | Carrier B | San Francisco | Registration |
| 3/4/1999 | 12:10:57 | 408 | 3216877 | 33 | Carrier B | San Francisco | Registration |
| 3/4/1999 | 12:10:57 | 415 | 6912099 | 33 | Carrier A | San Francisco | TC Assignment |
| 3/4/1999 | 12:10:57 | 415 | 8839323 | 33 | Carrier A | San Francisco | Page |
| 3/4/1999 | 12:10:57 | 415 | 9719867 | 33 | Carrier B | San Francisco | Registration |
| 3/4/1999 | 12:10:58 | 408 | 5318627 | 33 | Carrier B | San Francisco | Registration |
| 3/4/1999 | 12:10:58 | 650 | 7203431 | 33 | Carrier A | San Francisco | Page |
| 3/4/1999 | 12:10:58 | 650 | 1099979 | 33 | Carrier B | San Francisco | Registration |
| 3/4/1999 | 12:10:58 | 650 | 8160867 | 33 | Carrier A | San Francisco | TC Assignment |
| 3/4/1999 | 12:10:59 | 510 | 3086351 | 33 | Carrier B | San Francisco | Page |
| 3/4/1999 | 12:10:59 | 510 | 4792793 | 33 | Carrier A | San Francisco | Registration |
| 3/4/1999 | 12:10:59 | 925 | 9837734 | 33 | Carrier A | San Francisco | Registration |
| 3/4/1999 | 12:10:59 | 925 | 3086351 | 33 | Carrier B | San Francisco | Page |
| 3/4/1999 | 12:11:00 | 925 | 4946649 | 33 | Carrier A | San Francisco | Registration |
| 3/4/1999 | 12:11:00 | 206 | 8473934 | 33 | Carrier A | San Francisco | TC Assignment |
| 3/4/1999 | 12:11:00 | 408 | 3081099 | 33 | Carrier A | San Francisco | TC Assignment |
| 3/4/1999 | 12:11:01 | 415 | 7070091 | 33 | Carrier B | San Francisco | Page |
| 3/4/1999 | 12:11:01 | 415 | 9718063 | 33 | Carrier B | San Francisco | Registration |
| 3/4/1999 | 12:11:01 | 415 | 9157921 | 33 | Carrier A | San Francisco | Registration |
| 3/4/1999 | 12:11:01 | 408 | 3260183 | 33 | Carrier B | San Francisco | Page |
| 3/4/1999 | 12:11:02 | 650 | 9727755 | 33 | Carrier A | San Francisco | Registration |
| 3/4/1999 | 12:11:02 | 650 | 3165225 | 33 | Carrier B | San Francisco | TC Assignment |
| 3/4/1999 | 12:11:02 | 650 | 7600203 | 33 | Carrier A | San Francisco | Page |
| 3/4/1999 | 12:11:02 | 510 | 2719321 | 33 | Carrier A | San Francisco | Registration |
| 3/4/1999 | 12:11:03 | 510 | 4140377 | 33 | Carrier B | San Francisco | Registration |
| 3/4/1999 | 12:11:03 | 925 | 8289139 | 33 | Carrier A | San Francisco | Page |
| 3/4/1999 | 12:11:03 | 925 | 8722863 | 33 | Carrier B | San Francisco | Registration |
| 3/4/1999 | 12:11:03 | 925 | 5312381 | 33 | Carrier A | San Francisco | TC Assignment |
| 3/4/1999 | 12:11:04 | 408 | 4075791 | 33 | Carrier B | San Francisco | Page |
| 3/4/1999 | 12:11:04 | 415 | 4651181 | 33 | Carrier B | San Francisco | Registration |
| 3/4/1999 | 12:11:04 | 415 | 7202077 | 33 | Carrier B | San Francisco | Registration |
| 3/4/1999 | 12:11:04 | 415 | 4995677 | 33 | Carrier A | San Francisco | Page |
| 3/4/1999 | 12:11:05 | 408 | 5048157 | 33 | Carrier A | San Francisco | Registration |
| 3/4/1999 | 12:11:05 | 650 | 4720249 | 33 | Carrier B | San Francisco | Registration |
| 3/4/1999 | 12:11:05 | 916 | 9485023 | 33 | Carrier A | San Francisco | TC Assignment |
| 3/4/1999 | 12:11:05 | 650 | 1099979 | 33 | Carrier B | San Francisco | Registration |
| 3/4/1999 | 12:11:06 | 650 | 2086803 | 33 | Carrier B | San Francisco | Page |
| 3/4/1999 | 12:11:06 | 510 | 4072269 | 33 | Carrier B | San Francisco | Registration |
| 3/4/1999 | 12:11:06 | 510 | 9719435 | 33 | Carrier B | San Francisco | TC Assignment |
| 3/4/1999 | 12:11:06 | 925 | 5318223 | 33 | Carrier B | San Francisco | Page |
| 3/4/1999 | 12:11:07 | 925 | 3972083 | 33 | Carrier B | San Francisco | Registration |
| 3/4/1999 | 12:11:07 | 925 | 8372834 | 33 | Carrier B | San Francisco | Registration |
| 3/4/1999 | 12:11:07 | 408 | 7070091 | 33 | Carrier A | San Francisco | Page |
| 3/4/1999 | 12:11:08 | 415 | 7203431 | 33 | Carrier B | San Francisco | Registration |
| 3/4/1999 | 12:11:08 | 415 | 9718063 | 33 | Carrier A | San Francisco | TC Assignment |
| 3/4/1999 | 12:11:08 | 415 | 9080547 | 33 | Carrier B | San Francisco | Page |
| 3/4/1999 | 12:11:08 | 408 | 9727755 | 33 | Carrier A | San Francisco | Registration |
| 3/4/1999 | 12:11:09 | 650 | 4140377 | 33 | Carrier B | San Francisco | Registration |
| 3/4/1999 | 12:11:09 | 650 | 8282141 | 33 | Carrier B | San Francisco | Page |
| 3/4/1999 | 12:11:09 | 650 | 8722863 | 33 | Carrier B | San Francisco | Registration |
| 3/4/1999 | 12:11:09 | 510 | 6728701 | 33 | Carrier A | San Francisco | TC Assignment |
| 3/4/1999 | 12:11:10 | 510 | 3283687 | 33 | Carrier B | San Francisco | Page |
| 3/4/1999 | 12:11:10 | 925 | 9120421 | 33 | Carrier B | San Francisco | Registration |
| 3/4/1999 | 12:11:10 | 214 | 8495065 | 33 | Carrier B | San Francisco | Page |
| 3/4/1999 | 12:11:10 | 925 | 4074175 | 33 | Carrier B | San Francisco | Registration |
| 3/4/1999 | 12:11:11 | 925 | 2649681 | 33 | Carrier B | San Francisco | Page |
| 3/4/1999 | 12:11:11 | 408 | 4949717 | 33 | Carrier B | San Francisco | Registration |
| 3/4/1999 | 12:11:11 | 415 | 7220981 | 33 | Carrier B | San Francisco | TC Assignment |
| 3/4/1999 | 12:11:11 | 415 | 4720249 | 33 | Carrier B | San Francisco | Page |
| 3/4/1999 | 12:11:12 | 415 | 2719321 | 33 | Carrier B | San Francisco | Registration |
| 3/4/1999 | 12:11:12 | 408 | 9140825 | 33 | Carrier A | San Francisco | Registration |
| 3/4/1999 | 12:11:12 | 650 | 4659877 | 33 | Carrier B | San Francisco | Page |
| 3/4/1999 | 12:11:12 | 412 | 3458569 | 33 | Carrier B | San Francisco | Registration |
| 3/4/1999 | 12:11:13 | 650 | 8040589 | 33 | Carrier A | San Francisco | Registration |
| 3/4/1999 | 12:11:13 | 650 | 4075813 | 33 | Carrier B | San Francisco | Page |
| 3/4/1999 | 12:11:13 | 510 | 8927489 | 33 | Carrier A | San Francisco | Page |
| 3/4/1999 | 12:11:13 | 510 | 9088217 | 33 | Carrier A | San Francisco | Page |
| 3/4/1999 | 12:11:14 | 925 | 5108465 | 33 | Carrier B | San Francisco | Page |
| 3/4/1999 | 12:11:14 | 925 | 7202099 | 33 | Carrier B | San Francisco | Page |
| 3/4/1999 | 12:11:14 | 925 | 8134855 | 33 | Carrier B | San Francisco | Page |
| 3/4/1999 | 12:11:15 | 408 | 5075719 | 33 | Carrier A | San Francisco | Page |

FIG. 6

ACTUAL PERIOD RAW DATA

| Date | Time | Area code | User ID | Cell site | Carrier | City | Type |
|---|---|---|---|---|---|---|---|
| 3/7/1999 | 22:13:53 | 415 | 2719319 | 33 | Carrier B | San Francisco | TC Assignment |
| 3/7/1999 | 22:13:53 | 415 | 3201811 | 33 | Carrier A | San Francisco | Registration |
| 3/7/1999 | 22:13:54 | 415 | 8043619 | 33 | Carrier B | San Francisco | Registration |
| 3/7/1999 | 22:13:54 | 408 | 6322325 | 33 | Carrier A | San Francisco | TC Assignment |
| 3/7/1999 | 22:13:54 | 650 | 3290199 | 33 | Carrier A | San Francisco | Page |
| 3/7/1999 | 22:13:54 | 650 | 5105339 | 33 | Carrier B | San Francisco | Page |
| 3/7/1999 | 22:13:55 | 650 | 8917481 | 33 | Carrier B | San Francisco | Page |
| 3/7/1999 | 22:13:55 | 510 | 5312379 | 33 | Carrier A | San Francisco | TC Assignment |
| 3/7/1999 | 22:13:55 | 510 | 4075789 | 33 | Carrier A | San Francisco | TC Assignment |
| 3/7/1999 | 22:13:55 | 925 | 6022623 | 33 | Carrier B | San Francisco | Page |
| 3/7/1999 | 22:13:56 | 925 | 7202075 | 33 | Carrier A | San Francisco | Page |
| 3/7/1999 | 22:13:56 | 925 | 4799757 | 33 | Carrier B | San Francisco | Page |
| 3/7/1999 | 22:13:56 | 408 | 3216875 | 33 | Carrier B | San Francisco | Registration |
| 3/7/1999 | 22:13:56 | 415 | 6912097 | 33 | Carrier A | San Francisco | TC Assignment |
| 3/7/1999 | 22:13:57 | 415 | 8839321 | 33 | Carrier A | San Francisco | Page |
| 3/7/1999 | 22:13:57 | 415 | 9719865 | 33 | Carrier B | San Francisco | Registration |
| 3/7/1999 | 22:13:57 | 408 | 5318625 | 33 | Carrier B | San Francisco | Registration |
| 3/7/1999 | 22:13:57 | 650 | 7203429 | 33 | Carrier A | San Francisco | Page |
| 3/7/1999 | 22:13:58 | 650 | 1099977 | 33 | Carrier B | San Francisco | Registration |
| 3/7/1999 | 22:13:58 | 650 | 8160865 | 33 | Carrier A | San Francisco | TC Assignment |
| 3/7/1999 | 22:13:58 | 510 | 3086349 | 33 | Carrier B | San Francisco | Page |
| 3/7/1999 | 22:13:58 | 510 | 4792791 | 33 | Carrier A | San Francisco | Registration |
| 3/7/1999 | 22:13:59 | 925 | 9837732 | 33 | Carrier A | San Francisco | Registration |
| 3/7/1999 | 22:13:59 | 925 | 3086349 | 33 | Carrier B | San Francisco | Page |
| 3/7/1999 | 22:13:59 | 925 | 4946647 | 33 | Carrier A | San Francisco | Registration |
| 3/7/1999 | 22:13:59 | 408 | 3081097 | 33 | Carrier A | San Francisco | TC Assignment |
| 3/7/1999 | 22:14:00 | 415 | 7070089 | 33 | Carrier B | San Francisco | Page |
| 3/7/1999 | 22:14:00 | 415 | 9718061 | 33 | Carrier B | San Francisco | Registration |
| 3/7/1999 | 22:14:00 | 415 | 9157919 | 33 | Carrier A | San Francisco | Registration |
| 3/7/1999 | 22:14:01 | 408 | 3260181 | 33 | Carrier B | San Francisco | Page |
| 3/7/1999 | 22:14:01 | 650 | 9727753 | 33 | Carrier A | San Francisco | Registration |
| 3/7/1999 | 22:14:01 | 650 | 3165223 | 33 | Carrier B | San Francisco | TC Assignment |
| 3/7/1999 | 22:14:01 | 650 | 7600201 | 33 | Carrier A | San Francisco | Page |
| 3/7/1999 | 22:14:02 | 510 | 2719319 | 33 | Carrier A | San Francisco | Registration |
| 3/7/1999 | 22:14:02 | 510 | 4140375 | 33 | Carrier B | San Francisco | Registration |
| 3/7/1999 | 22:14:02 | 925 | 8289137 | 33 | Carrier A | San Francisco | Page |
| 3/7/1999 | 22:14:02 | 925 | 8722861 | 33 | Carrier B | San Francisco | Registration |
| 3/7/1999 | 22:14:03 | 925 | 5312379 | 33 | Carrier A | San Francisco | TC Assignment |
| 3/7/1999 | 22:14:03 | 408 | 4075789 | 33 | Carrier B | San Francisco | Page |
| 3/7/1999 | 22:14:03 | 415 | 4651179 | 33 | Carrier B | San Francisco | Registration |
| 3/7/1999 | 22:14:03 | 415 | 7202075 | 33 | Carrier B | San Francisco | Registration |
| 3/7/1999 | 22:14:04 | 415 | 4995675 | 33 | Carrier A | San Francisco | Page |
| 3/7/1999 | 22:14:04 | 408 | 5048155 | 33 | Carrier A | San Francisco | Registration |
| 3/7/1999 | 22:14:04 | 650 | 4720247 | 33 | Carrier B | San Francisco | Registration |
| 3/7/1999 | 22:14:04 | 617 | 8493200 | 33 | Carrier A | San Francisco | Page |
| 3/7/1999 | 22:14:05 | 650 | 2086801 | 33 | Carrier B | San Francisco | Page |
| 3/7/1999 | 22:14:05 | 510 | 4072267 | 33 | Carrier B | San Francisco | Registration |
| 3/7/1999 | 22:14:05 | 510 | 9719433 | 33 | Carrier B | San Francisco | TC Assignment |
| 3/7/1999 | 22:14:05 | 925 | 5318221 | 33 | Carrier B | San Francisco | Page |
| 3/7/1999 | 22:14:06 | 925 | 3972081 | 33 | Carrier B | San Francisco | Registration |
| 3/7/1999 | 22:14:06 | 925 | 8372832 | 33 | Carrier B | San Francisco | Registration |
| 3/7/1999 | 22:14:06 | 408 | 7070089 | 33 | Carrier A | San Francisco | Page |
| 3/7/1999 | 22:14:06 | 415 | 7203429 | 33 | Carrier B | San Francisco | Registration |
| 3/7/1999 | 22:14:07 | 415 | 9718061 | 33 | Carrier A | San Francisco | TC Assignment |
| 3/7/1999 | 22:14:07 | 415 | 9080545 | 33 | Carrier B | San Francisco | Page |
| 3/7/1999 | 22:14:07 | 408 | 9727753 | 33 | Carrier A | San Francisco | Registration |
| 3/7/1999 | 22:14:08 | 650 | 4140375 | 33 | Carrier B | San Francisco | Registration |
| 3/7/1999 | 22:14:08 | 213 | 4929087 | 33 | Carrier A | San Francisco | Page |
| 3/7/1999 | 22:14:08 | 650 | 8282139 | 33 | Carrier B | San Francisco | Page |
| 3/7/1999 | 22:14:08 | 650 | 8722861 | 33 | Carrier B | San Francisco | Registration |
| 3/7/1999 | 22:14:09 | 510 | 6728699 | 33 | Carrier A | San Francisco | TC Assignment |
| 3/7/1999 | 22:14:09 | 510 | 3283685 | 33 | Carrier B | San Francisco | Page |
| 3/7/1999 | 22:14:09 | 925 | 9120419 | 33 | Carrier B | San Francisco | Registration |
| 3/7/1999 | 22:14:09 | 206 | 8473934 | 33 | Carrier A | San Francisco | TC Assignment |
| 3/7/1999 | 22:14:10 | 925 | 4074173 | 33 | Carrier B | San Francisco | Registration |
| 3/7/1999 | 22:14:10 | 925 | 2649679 | 33 | Carrier B | San Francisco | Page |
| 3/7/1999 | 22:14:10 | 408 | 4949715 | 33 | Carrier B | San Francisco | Registration |
| 3/7/1999 | 22:14:10 | 415 | 7220979 | 33 | Carrier B | San Francisco | TC Assignment |
| 3/7/1999 | 22:14:11 | 415 | 4720247 | 33 | Carrier B | San Francisco | Page |
| 3/7/1999 | 22:14:11 | 415 | 2719319 | 33 | Carrier B | San Francisco | Registration |
| 3/7/1999 | 22:14:11 | 408 | 4792791 | 33 | Carrier A | San Francisco | Registration |
| 3/7/1999 | 22:14:11 | 917 | 8393984 | 33 | Carrier B | San Francisco | Registration |
| 3/7/1999 | 22:14:12 | 650 | 9837732 | 33 | Carrier A | San Francisco | Page |
| 3/7/1999 | 22:14:12 | 650 | 3086349 | 33 | Carrier B | San Francisco | Registration |
| 3/7/1999 | 22:14:12 | 650 | 4946647 | 33 | Carrier A | San Francisco | Page |
| 3/7/1999 | 22:14:12 | 510 | 3081097 | 33 | Carrier A | San Francisco | Page |
| 3/7/1999 | 22:14:13 | 510 | 7070089 | 33 | Carrier B | San Francisco | Page |
| 3/7/1999 | 22:14:13 | 925 | 9157919 | 33 | Carrier A | San Francisco | Page |
| 3/7/1999 | 22:14:13 | 925 | 3260181 | 33 | Carrier B | San Francisco | Page |
| 3/7/1999 | 22:14:13 | 408 | 7070089 | 33 | Carrier B | San Francisco | Page |
| 3/7/1999 | 22:14:14 | 412 | 3458569 | 33 | Carrier B | San Francisco | Registration |

FIG. 7

MARKET SHARE MEASUREMENT
ACTUAL SUBSCRIBERS VS. MEASURED SUBSCRIBERS DURING A BASELINE PERIOD

| Actual Subs | | | Measured subs | | |
|---|---|---|---|---|---|
| 408 | 3216877 | Carrier B | 408 | 3216877 | Carrier B |
| 408 | 3260183 | Carrier B | 408 | 3260183 | Carrier B |
| 408 | 4075791 | Carrier B | 408 | 4075791 | Carrier B |
| *408* | *4075799* | *Carrier B* | | | |
| 408 | 4949717 | Carrier B | 408 | 4949717 | Carrier B |
| 408 | 5318627 | Carrier B | 408 | 5318627 | Carrier B |
| 415 | 2719321 | Carrier B | 415 | 2719321 | Carrier B |
| 415 | 4651181 | Carrier B | 415 | 4651181 | Carrier B |
| 415 | 4720249 | Carrier B | 415 | 4720249 | Carrier B |
| 415 | 7070091 | Carrier B | 415 | 7070091 | Carrier B |
| 415 | 7202077 | Carrier B | 415 | 7202077 | Carrier B |
| 415 | 7203431 | Carrier B | 415 | 7203431 | Carrier B |
| *415* | *7203435* | *Carrier B* | | | |
| 415 | 7220981 | Carrier B | 415 | 7220981 | Carrier B |
| 415 | 8043621 | Carrier B | 415 | 8043621 | Carrier B |
| 415 | 9080547 | Carrier B | 415 | 9080547 | Carrier B |
| 415 | 9718063 | Carrier B | 415 | 9718063 | Carrier B |
| 415 | 9719867 | Carrier B | 415 | 9719867 | Carrier B |
| 510 | 3086351 | Carrier B | 510 | 3086351 | Carrier B |
| 510 | 3283687 | Carrier B | 510 | 3283687 | Carrier B |
| 510 | 4072269 | Carrier B | 510 | 4072269 | Carrier B |
| 510 | 4140377 | Carrier B | 510 | 4140377 | Carrier B |
| 510 | 9719435 | Carrier B | 510 | 9719435 | Carrier B |
| *510* | *9719439* | *Carrier B* | | | |
| 650 | 1099979 | Carrier B | 650 | 1099979 | Carrier B |
| 650 | 2086803 | Carrier B | 650 | 2086803 | Carrier B |
| 650 | 3165225 | Carrier B | 650 | 3165225 | Carrier B |
| 650 | 4075813 | Carrier B | 650 | 4075813 | Carrier B |
| 650 | 4140377 | Carrier B | 650 | 4140377 | Carrier B |
| 650 | 4659877 | Carrier B | 650 | 4659877 | Carrier B |
| 650 | 4720249 | Carrier B | 650 | 4720249 | Carrier B |
| 650 | 5105341 | Carrier B | 650 | 5105341 | Carrier B |
| 650 | 8282141 | Carrier B | 650 | 8282141 | Carrier B |
| 650 | 8722863 | Carrier B | 650 | 8722863 | Carrier B |
| 650 | 8917483 | Carrier B | 650 | 8917483 | Carrier B |
| 925 | 2649681 | Carrier B | 925 | 2649681 | Carrier B |
| 925 | 3086351 | Carrier B | 925 | 3086351 | Carrier B |
| *925* | *3086354* | *Carrier B* | | | |
| 925 | 3972083 | Carrier B | 925 | 3972083 | Carrier B |
| 925 | 4074175 | Carrier B | 925 | 4074175 | Carrier B |
| 925 | 4799759 | Carrier B | 925 | 4799759 | Carrier B |
| 925 | 5108465 | Carrier B | 925 | 5108465 | Carrier B |
| 925 | 5318223 | Carrier B | 925 | 5318223 | Carrier B |
| 925 | 6022625 | Carrier B | 925 | 6022625 | Carrier B |
| 925 | 7202099 | Carrier B | 925 | 7202099 | Carrier B |
| *925* | *7202199* | *Carrier B* | | | |
| 925 | 8134855 | Carrier B | 925 | 8134855 | Carrier B |
| 925 | 8372834 | Carrier B | 925 | 8372834 | Carrier B |
| 925 | 8722863 | Carrier B | 925 | 8722863 | Carrier B |
| 925 | 9120421 | Carrier B | 925 | 9120421 | Carrier B |
| Total # | 50 | Carrier B | Total # | 45 | Carrier B |
| 408 | 3081099 | Carrier A | 408 | 3081099 | Carrier A |
| 408 | 5048157 | Carrier A | 408 | 5048157 | Carrier A |
| 408 | 5075719 | Carrier A | 408 | 5075719 | Carrier A |
| 408 | 6322327 | Carrier A | 408 | 6322327 | Carrier A |
| 408 | 7070091 | Carrier A | 408 | 7070091 | Carrier A |
| 408 | 9140825 | Carrier A | 408 | 9140825 | Carrier A |
| *408* | *9140827* | *Carrier A* | | | |
| 408 | 9727755 | Carrier A | 408 | 9727755 | Carrier A |
| 415 | 3201813 | Carrier A | 415 | 3201813 | Carrier A |
| 415 | 4995677 | Carrier A | 415 | 4995677 | Carrier A |
| 415 | 6912099 | Carrier A | 415 | 6912099 | Carrier A |
| *415* | *6912199* | *Carrier A* | | | |
| 415 | 8839323 | Carrier A | 415 | 8839323 | Carrier A |
| 415 | 9157921 | Carrier A | 415 | 9157921 | Carrier A |
| 510 | 2719321 | Carrier A | 510 | 2719321 | Carrier A |
| 510 | 4075791 | Carrier A | 510 | 4075791 | Carrier A |
| 510 | 4792793 | Carrier A | 510 | 4792793 | Carrier A |
| 510 | 5312381 | Carrier A | 510 | 5312381 | Carrier A |
| *510* | *5312383* | *Carrier A* | | | |
| 510 | 6728701 | Carrier A | 510 | 6728701 | Carrier A |
| 510 | 8927489 | Carrier A | 510 | 8927489 | Carrier A |
| 510 | 9088217 | Carrier A | 510 | 9088217 | Carrier A |
| 650 | 3290201 | Carrier A | 650 | 3290201 | Carrier A |
| *650* | *3290221* | *Carrier A* | | | |
| 650 | 7203431 | Carrier A | 650 | 7203431 | Carrier A |
| 650 | 7600203 | Carrier A | 650 | 7600203 | Carrier A |
| 650 | 8040589 | Carrier A | 650 | 8040589 | Carrier A |
| 650 | 8160867 | Carrier A | 650 | 8160867 | Carrier A |
| 650 | 9727755 | Carrier A | 650 | 9727755 | Carrier A |
| *650* | *9727765* | *Carrier A* | | | |
| 925 | 4946649 | Carrier A | 925 | 4946649 | Carrier A |
| 925 | 5312381 | Carrier A | 925 | 5312381 | Carrier A |
| *925* | *5312385* | *Carrier A* | | | |
| 925 | 7202077 | Carrier A | 925 | 7202077 | Carrier A |
| 925 | 8289139 | Carrier A | 925 | 8289139 | Carrier A |
| 925 | 9837734 | Carrier A | 925 | 9837734 | Carrier A |
| Total # | 36 | Carrier A | Total # | 30 | Carrier A |
| Total # | 86 | Both | Total # | 75 | Both |

FIG. 8

MARKET SHARE MEASUREMENT
SORTED DATA TO COUNT MEASURED SUBS FOR ACTUAL PERIOD

Measured subs

| | | |
|---|---|---|
| 408 | 3216875 | Carrier B |
| 408 | 3260181 | Carrier B |
| 408 | 4075789 | Carrier B |
| 408 | 4949715 | Carrier B |
| 408 | 5318625 | Carrier B |
| 408 | 7070089 | Carrier B |
| 415 | 2719319 | Carrier B |
| 415 | 4651179 | Carrier B |
| 415 | 4720247 | Carrier B |
| 415 | 7070089 | Carrier B |
| 415 | 7202075 | Carrier B |
| 415 | 7203429 | Carrier B |
| 415 | 7220979 | Carrier B |
| 415 | 8043619 | Carrier B |
| 415 | 9080545 | Carrier B |
| 415 | 9718061 | Carrier B |
| 415 | 9719865 | Carrier B |
| 510 | 3086349 | Carrier B |
| 510 | 3283685 | Carrier B |
| 510 | 4072267 | Carrier B |
| 510 | 4140375 | Carrier B |
| 510 | 7070089 | Carrier B |
| 510 | 9719433 | Carrier B |
| 650 | 2086801 | Carrier B |
| 650 | 3086349 | Carrier B |
| 650 | 3165223 | Carrier B |
| 650 | 4140375 | Carrier B |
| 650 | 4720247 | Carrier B |
| 650 | 5105339 | Carrier B |
| 650 | 8282139 | Carrier B |
| 650 | 8722861 | Carrier B |
| 650 | 8917481 | Carrier B |
| 925 | 2649679 | Carrier B |
| 925 | 3086349 | Carrier B |
| 925 | 3260181 | Carrier B |
| 925 | 3972081 | Carrier B |
| 925 | 4074173 | Carrier B |
| 925 | 4799757 | Carrier B |
| 925 | 5318221 | Carrier B |
| 925 | 6022623 | Carrier B |
| 925 | 8372832 | Carrier B |
| 925 | 8722861 | Carrier B |
| 925 | 9120419 | Carrier B |

Measured Carrier B    43

| | | |
|---|---|---|
| 408 | 3081097 | Carrier A |
| 408 | 4792791 | Carrier A |
| 408 | 5048155 | Carrier A |
| 408 | 6322325 | Carrier A |
| 408 | 7070089 | Carrier A |
| 408 | 9727753 | Carrier A |
| 415 | 3201811 | Carrier A |
| 415 | 4995675 | Carrier A |
| 415 | 6912097 | Carrier A |
| 415 | 8839321 | Carrier A |
| 415 | 9157919 | Carrier A |
| 415 | 9718061 | Carrier A |
| 510 | 2719319 | Carrier A |
| 510 | 3081097 | Carrier A |
| 510 | 4075789 | Carrier A |
| 510 | 4792791 | Carrier A |
| 510 | 5312379 | Carrier A |
| 510 | 6728699 | Carrier A |
| 650 | 3290199 | Carrier A |
| 650 | 4946647 | Carrier A |
| 650 | 7203429 | Carrier A |
| 650 | 7600201 | Carrier A |
| 650 | 8160865 | Carrier A |
| 650 | 9727753 | Carrier A |
| 650 | 9837732 | Carrier A |
| 925 | 4946647 | Carrier A |
| 925 | 5312379 | Carrier A |
| 925 | 7202075 | Carrier A |
| 925 | 8289137 | Carrier A |
| 925 | 9157919 | Carrier A |
| 925 | 9837732 | Carrier A |

Measured Carrier A    31

FIG. 9

*MARKET SHARE MEASUREMENT*
ALGORITHM FOR CALCULATING MARKET SHARE

Baseline period
Count the total number of Measured subscribers for each carrier during a baseline period (roamers excluded)
    Carrier A    30
    Carrier B    45

Compare to the Actual number of subscribers during baseline period
    Carrier A    36
    Carrier B    50

Calculate the gross up coefficient for each carrier for baseline period
    Carrier A    "=36/30"    1.2000
    Carrier B    "=50/45"    1.1111

Actual measurement period
Count the total number of Measured subscribers for each carrier during the actual period
    Carrier A    31
    Carrier B    43

Calculate the total number of subscribers using the gross up coefficients
    Tot # subs = 31*1.2000+43*1.1111 = 84.9773

Calculate the market share of each carrier for actual data
    Carrier A    "=31*1.2000/84.9773 = 43.78%
    Carrier B    "=43*1.1111/84.9773 = 56.22%

FIG. 10 inTeleShare – Subscriber share
December 1999 & trailing 12 months
Portland, Oregon

|  | Dec | Jan | Feb | Mar | Apr | May |
|---|---|---|---|---|---|---|
| Air Touch | | | | | | |
| Subscribers | 218,913 | 221,124 | 225,635 | 227,435 | 230,377 | 235,688 |
| Net Additions | N/A | 2,211 | 4,511 | 1,800 | 2,942 | 5,311 |
| % Change | N/A | 1.1% | 2.0% | 0.8% | 1.3% | 2.3% |
| Market Share | 43.8% | 43.9% | 43.7% | 43.1% | 43.0% | 43.3% |
| AT&T Wireless | | | | | | |
| Subscribers | 222,404 | 224,650 | 228,438 | 235,567 | 237,843 | 238,909 |
| Net Additions | N/A | 2,247 | 3,788 | 7,131 | 2,276 | 1,066 |
| % Change | N/A | 1.0% | 1.7% | 3.1% | 1.0% | 0.4% |
| Market Share | 44.5% | 44.8% | 44.2% | 44.6% | 44.4% | 43.9% |
| Nextel | | | | | | |
| Subscribers | 6,481 | 6,548 | 7,345 | 7,890 | 8,079 | 8,160 |
| Net Additions | N/A | 65 | 799 | 545 | 189 | 81 |
| % Change | N/A | 1.0% | 12.2% | 7.4% | 2.4% | 1.0% |
| Market Share | 1.3% | 1.3% | 1.4% | 1.5% | 1.5% | 1.5% |
| Sprint PCS | | | | | | |
| Subscribers | 26,545 | 27,678 | 30,045 | 31,050 | 32,540 | 33,487 |
| Net Additions | N/A | 1,133 | 2,367 | 1,005 | 1,490 | 947 |
| % Change | N/A | 4.3% | 8.6% | 3.3% | 4.8% | 2.9% |
| Market Share | 6.3% | 5.5% | 5.8% | 5.9% | 6.1% | 6.2% |
| USWest | | | | | | |
| Subscribers | 15,521 | 15,678 | 16,344 | 16,890 | 17,065 | 17,567 |
| Net Additions | N/A | 157 | 666 | 546 | 175 | 502 |
| % Change | N/A | 1.0% | 4.2% | 3.3% | 1.0% | 2.9% |
| Market Share | 3.1% | 3.1% | 3.2% | 3.2% | 3.2% | 3.2% |
| Western Wireless | | | | | | |
| Subscribers | 7,811 | 7,890 | 8,450 | 9,334 | 9,789 | 9,999 |
| Net Additions | N/A | 79 | 560 | 884 | 455 | 210 |
| % Change | N/A | 1.0% | 7.1% | 10.5% | 4.9% | 2.1% |
| Market Share | 1.6% | 1.6% | 1.5% | 1.5% | 1.5% | 1.5% |
| TOTAL | | | | | | |
| Subscribers | 498,530 | 503,568 | 516,255 | 528,166 | 535,693 | 543,810 |
| Net Additions | N/A | 5,038 | 12,689 | 11,911 | 7,527 | 8,117 |
| % Change | N/A | 1.0% | 2.5% | 2.3% | 1.4% | 1.5% |

FIG. 11A

EXAMPLE

| Jun | July | Aug | Sep | Oct | Nov | Dec | Trailing 12 months | |
|---|---|---|---|---|---|---|---|---|
| 237,899 | 241,234 | 245,678 | 243,678 | 241,345 | 240,657 | 245,678 | | |
| 2,211 | 3,335 | 4,444 | (2000) | (2333) | (688) | 5,021 | Net Adds | 26,765 |
| 0.9% | 1.4% | 1.8% | (0.8%) | (1.0%) | (0.3%) | 2.1% | CAGR | 12.2% |
| 43.3% | 43.2% | 43.0% | 42.1% | 41.1% | 40.4% | 40.1% | Share Gain | (3.8%) |
| 239,976 | 241,908 | 246,951 | 253,000 | 259,192 | 265,530 | 273,352 | | |
| 1,067 | 1,932 | 5,043 | 6,049 | 6,192 | 6,338 | 7,822 | Net Adds | 50,949 |
| 0.4% | 0.8% | 2.1% | 2.4% | 2.4% | 2.4% | 2.9% | CAGR | 22.9% |
| 43.5% | 43.3% | 43.2% | 43.7% | 44.2% | 44.9% | 44.5% | Share Gain | (0.0%) |
| 8,456 | 8,545 | 8,575 | 8,834 | 9,101 | 9,376 | 9,707 | | |
| 296 | 89 | 30 | 259 | 267 | 275 | 331 | Net Adds | 3,226 |
| 3.6% | 1.1% | 0.4% | 3.0% | 3.0% | 3.0% | 3.5% | CAGR | 49.8% |
| 1.5% | 1.5% | 1.5% | 1.5% | 1.6% | 1.6% | 1.6% | Share Gain | 0.3% |
| 35,640 | 37,890 | 39,234 | 40,124 | 42,300 | 43,345 | 44,235 | | |
| 2,153 | 2,250 | 1,344 | 890 | 2,176 | 1,045 | 891 | Net Adds | 17,691 |
| 6.4% | 6.3% | 3.5% | 2.3% | 5.4% | 2.5% | 2.1% | CAGR | 66.6% |
| 6.5% | 6.8% | 8.9% | 8.9% | 7.2% | 7.3% | 7.2% | Share Gain | 1.9% |
| 17,756 | 17,978 | 18,032 | 18,139 | 18,187 | 18,245 | 18,342 | | |
| 189 | 222 | 54 | 107 | 48 | 58 | 97 | Net Adds | 2,821 |
| 1.1% | 1.3% | 0.3% | 0.6% | 0.3% | 0.3% | 0.5% | CAGR | 15.2% |
| 3.2% | 3.2% | 3.2% | 3.1% | 3.1% | 3.1% | 3.0% | Share Gain | (0.1%) |
| 10,124 | 11,490 | 13,327 | 14,980 | 16,695 | 18,472 | 21,892 | | |
| 125 | 1,366 | 1,837 | 1,653 | 1,715 | 1,777 | 3,420 | Net Adds | 14,081 |
| 1.3% | 13.5% | 16.0% | 12.4% | 11.4% | 10.5% | 18.5% | CAGR | 160.3% |
| 1.6% | 2.1% | 2.3% | 2.8% | 2.8% | 5.1% | 3.6% | Share Gain | 2.0% |
| 549,821 | 559,045 | 571,797 | 577,756 | 583,820 | 592,625 | 610,207 | | |
| 6,041 | 9,194 | 12,752 | 5,959 | 6,065 | 8,805 | 17,582 | Net Adds | 114,577 |
| 1.1% | 1.7% | 2.3% | 1.2% | 1.4% | 1.5% | 3.0% | CAGR | 23.0% |

FIG. 11B

ACTUAL PERIOD #2 RAW DATA

| Date | Time | Area code | User ID | Cell site | Carrier | City | Type |
|---|---|---|---|---|---|---|---|
| 3/10/1999 | 22:13:53 | 415 | 9719865 | 33 | Carrier B | San Francisco | Page |
| 3/10/1999 | 22:13:53 | 408 | 5318625 | 33 | Carrier B | San Francisco | TC Assignment |
| 3/10/1999 | 22:13:54 | 650 | 7203429 | 33 | Carrier A | San Francisco | Registration |
| 3/10/1999 | 22:13:54 | 650 | 1099977 | 33 | Carrier B | San Francisco | TC Assignment |
| 3/10/1999 | 22:13:54 | 510 | 4075789 | 33 | Carrier A | San Francisco | Page |
| 3/10/1999 | 22:13:54 | 650 | 3290199 | 33 | Carrier A | San Francisco | Page |
| 3/10/1999 | 22:13:55 | 510 | 5312379 | 33 | Carrier A | San Francisco | Page |
| 3/10/1999 | 22:13:55 | 650 | 8917481 | 33 | Carrier B | San Francisco | TC Assignment |
| 3/10/1999 | 22:13:55 | 650 | 8160865 | 33 | Carrier A | San Francisco | Page |
| 3/10/1999 | 22:13:55 | 925 | 9837732 | 33 | Carrier A | San Francisco | Page |
| 3/10/1999 | 22:13:56 | 925 | 6022623 | 33 | Carrier B | San Francisco | TC Assignment |
| 3/10/1999 | 22:13:56 | 925 | 7202075 | 33 | Carrier A | San Francisco | Registration |
| 3/10/1999 | 22:13:56 | 925 | 4799757 | 33 | Carrier B | San Francisco | Registration |
| 3/10/1999 | 22:13:56 | 415 | 4405900 | 33 | Carrier B | San Francisco | Registration |
| 3/10/1999 | 22:13:57 | 510 | 1385683 | 33 | Carrier B | San Francisco | TC Assignment |
| 3/10/1999 | 22:13:57 | 925 | 4946647 | 33 | Carrier A | San Francisco | Page |
| 3/10/1999 | 22:13:57 | 415 | 6912097 | 33 | Carrier A | San Francisco | Registration |
| 3/10/1999 | 22:13:57 | 415 | 8839321 | 33 | Carrier A | San Francisco | TC Assignment |
| 3/10/1999 | 22:13:58 | 650 | 3165223 | 33 | Carrier B | San Francisco | Page |
| 3/10/1999 | 22:13:58 | 650 | 7600201 | 33 | Carrier A | San Francisco | Registration |
| 3/10/1999 | 22:13:58 | 510 | 2719319 | 33 | Carrier A | San Francisco | Registration |
| 3/10/1999 | 22:13:58 | 650 | 9727753 | 33 | Carrier A | San Francisco | Page |
| 3/10/1999 | 22:13:59 | 408 | 4075789 | 33 | Carrier B | San Francisco | Registration |
| 3/10/1999 | 22:13:59 | 408 | 2224892 | 33 | Carrier A | San Francisco | Registration |
| 3/10/1999 | 22:13:59 | 510 | 4792791 | 33 | Carrier A | San Francisco | TC Assignment |
| 3/10/1999 | 22:13:59 | 415 | 4995675 | 33 | Carrier A | San Francisco | Page |
| 3/10/1999 | 22:14:00 | 925 | 3086349 | 33 | Carrier B | San Francisco | Registration |
| 3/10/1999 | 22:14:00 | 415 | 8392034 | 33 | Carrier B | San Francisco | TC Assignment |
| 3/10/1999 | 22:14:00 | 408 | 3081097 | 33 | Carrier A | San Francisco | Page |
| 3/10/1999 | 22:14:01 | 415 | 7070089 | 33 | Carrier B | San Francisco | Registration |
| 3/10/1999 | 22:14:01 | 415 | 9718061 | 33 | Carrier B | San Francisco | Registration |
| 3/10/1999 | 22:14:01 | 415 | 9157919 | 33 | Carrier A | San Francisco | Page |
| 3/10/1999 | 22:14:01 | 408 | 3260181 | 33 | Carrier B | San Francisco | Registration |
| 3/10/1999 | 22:14:02 | 510 | 8492034 | 33 | Carrier B | San Francisco | TC Assignment |
| 3/10/1999 | 22:14:02 | 650 | 4720247 | 33 | Carrier B | San Francisco | Page |
| 3/10/1999 | 22:14:02 | 925 | 5318221 | 33 | Carrier B | San Francisco | Registration |
| 3/10/1999 | 22:14:02 | 415 | 8374852 | 33 | Carrier A | San Francisco | Registration |
| 3/10/1999 | 22:14:03 | 510 | 4140375 | 33 | Carrier B | San Francisco | Page |
| 3/10/1999 | 22:14:03 | 925 | 8289137 | 33 | Carrier A | San Francisco | Registration |
| 3/10/1999 | 22:14:03 | 925 | 8722861 | 33 | Carrier B | San Francisco | TC Assignment |
| 3/10/1999 | 22:14:03 | 925 | 5312379 | 33 | Carrier A | San Francisco | Page |
| 3/10/1999 | 22:14:04 | 925 | 3840234 | 33 | Carrier A | San Francisco | Registration |
| 3/10/1999 | 22:14:04 | 415 | 4651179 | 33 | Carrier B | San Francisco | Registration |
| 3/10/1999 | 22:14:04 | 415 | 7202075 | 33 | Carrier B | San Francisco | Page |
| 3/10/1999 | 22:14:04 | 510 | 8494532 | 33 | Carrier A | San Francisco | Registration |
| 3/10/1999 | 22:14:05 | 408 | 5048155 | 33 | Carrier A | San Francisco | Registration |
| 3/10/1999 | 22:14:05 | 408 | 8475892 | 33 | Carrier B | San Francisco | Page |
| 3/10/1999 | 22:14:05 | 510 | 8349523 | 33 | Carrier B | San Francisco | Page |
| 3/10/1999 | 22:14:05 | 650 | 2086801 | 33 | Carrier B | San Francisco | Registration |
| 3/10/1999 | 22:14:06 | 510 | 4072267 | 33 | Carrier B | San Francisco | TC Assignment |
| 3/10/1999 | 22:14:06 | 510 | 9719433 | 33 | Carrier B | San Francisco | Page |
| 3/10/1999 | 22:14:06 | 415 | 4934094 | 33 | Carrier A | San Francisco | Registration |
| 3/10/1999 | 22:14:06 | 925 | 3972081 | 33 | Carrier B | San Francisco | Registration |
| 3/10/1999 | 22:14:07 | 925 | 8372832 | 33 | Carrier B | San Francisco | Page |
| 3/10/1999 | 22:14:07 | 408 | 7070089 | 33 | Carrier A | San Francisco | Registration |
| 3/10/1999 | 22:14:07 | 415 | 7203429 | 33 | Carrier B | San Francisco | Registration |
| 3/10/1999 | 22:14:08 | 415 | 9718061 | 33 | Carrier A | San Francisco | Page |
| 3/10/1999 | 22:14:08 | 415 | 9080545 | 33 | Carrier B | San Francisco | Page |
| 3/10/1999 | 22:14:08 | 408 | 9727753 | 33 | Carrier A | San Francisco | Registration |
| 3/10/1999 | 22:14:08 | 650 | 4140375 | 33 | Carrier B | San Francisco | TC Assignment |
| 3/10/1999 | 22:14:09 | 415 | 2719319 | 33 | Carrier B | San Francisco | Page |
| 3/10/1999 | 22:14:09 | 212 | 3495063 | 33 | Carrier A | San Francisco | Registration |
| 3/10/1999 | 22:14:09 | 415 | 8043619 | 33 | Carrier B | San Francisco | TC Assignment |
| 3/10/1999 | 22:14:09 | 408 | 6322325 | 33 | Carrier A | San Francisco | Page |
| 3/10/1999 | 22:14:10 | 510 | 3283685 | 33 | Carrier B | San Francisco | Registration |
| 3/10/1999 | 22:14:10 | 925 | 9120419 | 33 | Carrier B | San Francisco | Registration |
| 3/10/1999 | 22:14:10 | 925 | 8394842 | 33 | Carrier B | San Francisco | Page |
| 3/10/1999 | 22:14:10 | 925 | 4074173 | 33 | Carrier B | San Francisco | Registration |
| 3/10/1999 | 22:14:11 | 925 | 2649679 | 33 | Carrier B | San Francisco | Page |
| 3/10/1999 | 22:14:11 | 408 | 4949715 | 33 | Carrier B | San Francisco | Page |
| 3/10/1999 | 22:14:11 | 415 | 7220979 | 33 | Carrier B | San Francisco | Page |
| 3/10/1999 | 22:14:11 | 415 | 4720247 | 33 | Carrier B | San Francisco | Registration |
| 3/10/1999 | 22:14:12 | 415 | 2719319 | 33 | Carrier B | San Francisco | Registration |
| 3/10/1999 | 22:14:12 | 408 | 4792791 | 33 | Carrier A | San Francisco | Page |
| 3/10/1999 | 22:14:12 | 917 | 8393984 | 33 | Carrier B | San Francisco | Page |
| 3/10/1999 | 22:14:12 | 650 | 9837732 | 33 | Carrier A | San Francisco | Page |
| 3/10/1999 | 22:14:13 | 703 | 8495056 | 33 | Carrier B | San Francisco | Page |
| 3/10/1999 | 22:14:13 | 650 | 4946647 | 33 | Carrier A | San Francisco | Registration |
| 3/10/1999 | 22:14:13 | 408 | 7070089 | 33 | Carrier B | San Francisco | TC Assignment |
| 3/10/1999 | 22:14:13 | 412 | 3458569 | 33 | Carrier B | San Francisco | Registration |
| 3/10/1999 | 22:14:14 | 925 | 9157919 | 33 | Carrier A | San Francisco | Page |
| 3/10/1999 | 22:14:14 | 925 | 3260181 | 33 | Carrier B | San Francisco | Registration |
| 3/10/1999 | 22:14:14 | 510 | 8439482 | 33 | Carrier A | San Francisco | TC Assignment |

FIG. 12

ADD & CHURN MEASUREMENT
SORTED DATA TO COUNT MEASURED SUBS FOR ACTUAL PERIOD #1 and #2

| Measured subs period #1 | | | Measured subs period #2 | | | | |
|---|---|---|---|---|---|---|---|
| | | Subs | | | Subs | Adds | Churns |
| 408 | 3216875 Carrier B | 1 | | | 0 | 0 | 1 |
| 408 | 3260181 Carrier B | 1 | 408 | 3260181 Carrier B | 1 | 0 | 0 |
| 408 | 4075789 Carrier B | 1 | 408 | 4075789 Carrier B | 1 | 0 | 0 |
| 408 | 4949715 Carrier B | 1 | 408 | 4949715 Carrier B | 1 | 0 | 0 |
| 408 | 5318625 Carrier B | 1 | 408 | 5318625 Carrier B | 1 | 0 | 0 |
| 408 | 7070089 Carrier B | 1 | 408 | 7070089 Carrier B | 1 | 0 | 0 |
| | | 0 | *408* | *8475892 Carrier B* | 1 | 1 | 0 |
| 415 | 2719319 Carrier B | 1 | 415 | 2719319 Carrier B | 1 | 0 | 0 |
| | | 0 | *415* | *4405900 Carrier B* | 1 | 1 | 0 |
| 415 | 4651179 Carrier B | 1 | 415 | 4651179 Carrier B | 1 | 0 | 0 |
| 415 | 4720247 Carrier B | 1 | 415 | 4720247 Carrier B | 1 | 0 | 0 |
| 415 | 7070089 Carrier B | 1 | 415 | 7070089 Carrier B | 1 | 0 | 0 |
| 415 | 7202075 Carrier B | 1 | 415 | 7202075 Carrier B | 1 | 0 | 0 |
| 415 | 7203429 Carrier B | 1 | 415 | 7203429 Carrier B | 1 | 0 | 0 |
| 415 | 7220979 Carrier B | 1 | 415 | 7220979 Carrier B | 1 | 0 | 0 |
| 415 | 8043619 Carrier B | 1 | 415 | 8043619 Carrier B | 1 | 0 | 0 |
| | | 0 | *415* | *8392034 Carrier B* | 1 | 1 | 0 |
| 415 | 9080545 Carrier B | 1 | 415 | 9080545 Carrier B | 1 | 0 | 0 |
| 415 | 9718061 Carrier B | 1 | 415 | 9718061 Carrier B | 1 | 0 | 0 |
| 415 | 9719865 Carrier B | 1 | 415 | 9719865 Carrier B | 1 | 0 | 0 |
| | | 0 | *510* | *1385683 Carrier B* | 1 | 1 | 0 |
| *510* | *3086349 Carrier B* | 1 | | | 0 | 0 | 1 |
| 510 | 3283685 Carrier B | 1 | 510 | 3283685 Carrier B | 1 | 0 | 0 |
| 510 | 4072267 Carrier B | 1 | 510 | 4072267 Carrier B | 1 | 0 | 0 |
| 510 | 4140375 Carrier B | 1 | 510 | 4140375 Carrier B | 1 | 0 | 0 |
| *510* | *7070089 Carrier B* | 1 | | | 0 | 0 | 1 |
| | | 0 | *510* | *8349523 Carrier B* | 1 | 1 | 0 |
| | | 0 | *510* | *8492034 Carrier B* | 1 | 1 | 0 |
| 510 | 9719433 Carrier B | 1 | 510 | 9719433 Carrier B | 1 | 0 | 0 |
| | | 0 | *650* | *1099977 Carrier B* | 1 | 1 | 0 |
| 650 | 2086801 Carrier B | 1 | 650 | 2086801 Carrier B | 1 | 0 | 0 |
| *650* | *3086349 Carrier B* | 1 | | | 0 | 0 | 1 |
| 650 | 3165223 Carrier B | 1 | 650 | 3165223 Carrier B | 1 | 0 | 0 |
| 650 | 4140375 Carrier B | 1 | 650 | 4140375 Carrier B | 1 | 0 | 0 |
| 650 | 4720247 Carrier B | 1 | 650 | 4720247 Carrier B | 1 | 0 | 0 |
| *650* | *5105339 Carrier B* | 1 | | | 0 | 0 | 1 |
| *650* | *8282139 Carrier B* | 1 | | | 0 | 0 | 1 |
| *650* | *8722861 Carrier B* | 1 | | | 0 | 0 | 1 |
| 650 | 8917481 Carrier B | 1 | 650 | 8917481 Carrier B | 1 | 0 | 0 |
| 925 | 2649679 Carrier B | 1 | 925 | 2649679 Carrier B | 1 | 0 | 0 |
| 925 | 3086349 Carrier B | 1 | 925 | 3086349 Carrier B | 1 | 0 | 0 |
| 925 | 3260181 Carrier B | 1 | 925 | 3260181 Carrier B | 1 | 0 | 0 |
| 925 | 3972081 Carrier B | 1 | 925 | 3972081 Carrier B | 1 | 0 | 0 |
| 925 | 4074173 Carrier B | 1 | 925 | 4074173 Carrier B | 1 | 0 | 0 |
| 925 | 4799757 Carrier B | 1 | 925 | 4799757 Carrier B | 1 | 0 | 0 |
| 925 | 5318221 Carrier B | 1 | 925 | 5318221 Carrier B | 1 | 0 | 0 |
| 925 | 6022623 Carrier B | 1 | 925 | 6022623 Carrier B | 1 | 0 | 0 |
| 925 | 8372832 Carrier B | 1 | 925 | 8372832 Carrier B | 1 | 0 | 0 |
| | | 0 | 925 | 8394842 Carrier B | 1 | 1 | 0 |
| 925 | 8722861 Carrier B | 1 | 925 | 8722861 Carrier B | 1 | 0 | 0 |
| 925 | 9120419 Carrier B | 1 | 925 | 9120419 Carrier B | 1 | 0 | 0 |
| Measured Period #1 Carrier B | | 43 | Measured Period #2 Carrier B | | 44 | 8 | 7 |
| | | Subs | | | Subs | Adds | Churns |
| | | 0 | 408 | 2224892 Carrier A | 1 | 1 | 0 |
| 408 | 3061097 Carrier A | 1 | 408 | 3061097 Carrier A | 1 | 0 | 0 |
| 408 | 4792791 Carrier A | 1 | 408 | 4792791 Carrier A | 1 | 0 | 0 |
| 408 | 5048155 Carrier A | 1 | 408 | 5048155 Carrier A | 1 | 0 | 0 |
| 408 | 6322325 Carrier A | 1 | 408 | 6322325 Carrier A | 1 | 0 | 0 |
| 408 | 7070089 Carrier A | 1 | 408 | 7070089 Carrier A | 1 | 0 | 0 |
| 408 | 9727753 Carrier A | 1 | 408 | 9727753 Carrier A | 1 | 0 | 0 |
| *415* | *3201811 Carrier A* | 1 | | | 0 | 0 | 1 |
| | | 0 | *415* | *4934094 Carrier A* | 1 | 1 | 0 |
| 415 | 4995675 Carrier A | 1 | 415 | 4995675 Carrier A | 1 | 0 | 0 |
| 415 | 6912097 Carrier A | 1 | 415 | 6912097 Carrier A | 1 | 0 | 0 |
| | | 0 | *415* | *8374852 Carrier A* | 1 | 1 | 0 |
| 415 | 8839321 Carrier A | 1 | 415 | 8839321 Carrier A | 1 | 0 | 0 |
| 415 | 9157919 Carrier A | 1 | 415 | 9157919 Carrier A | 1 | 0 | 0 |
| 415 | 9718061 Carrier A | 1 | 415 | 9718061 Carrier A | 1 | 0 | 0 |
| 510 | 2719319 Carrier A | 1 | 510 | 2719319 Carrier A | 1 | 0 | 0 |
| *510* | *3081097 Carrier A* | 1 | | | 0 | 0 | 1 |
| 510 | 4075789 Carrier A | 1 | 510 | 4075789 Carrier A | 1 | 0 | 0 |
| 510 | 4792791 Carrier A | 1 | 510 | 4792791 Carrier A | 1 | 0 | 0 |
| 510 | 5312379 Carrier A | 1 | 510 | 5312379 Carrier A | 1 | 0 | 0 |
| *510* | *6728699 Carrier A* | 1 | | | 0 | 0 | 1 |
| | | 0 | *510* | *8439482 Carrier A* | 1 | 1 | 0 |
| | | 0 | *510* | *8494532 Carrier A* | 1 | 1 | 0 |
| 650 | 3290199 Carrier A | 1 | 650 | 3290199 Carrier A | 1 | 0 | 0 |
| 650 | 4946647 Carrier A | 1 | 650 | 4946647 Carrier A | 1 | 0 | 0 |
| 650 | 7203429 Carrier A | 1 | 650 | 7203429 Carrier A | 1 | 0 | 0 |
| 650 | 7600201 Carrier A | 1 | 650 | 7600201 Carrier A | 1 | 0 | 0 |
| 650 | 8160865 Carrier A | 1 | 650 | 8160865 Carrier A | 1 | 0 | 0 |
| 650 | 9727753 Carrier A | 1 | 650 | 9727753 Carrier A | 1 | 0 | 0 |
| 650 | 9837732 Carrier A | 1 | 650 | 9837732 Carrier A | 1 | 0 | 0 |
| | | 0 | *925* | *3840234 Carrier A* | 1 | 1 | 0 |
| 925 | 4946647 Carrier A | 1 | 925 | 4946647 Carrier A | 1 | 0 | 0 |
| 925 | 5312379 Carrier A | 1 | 925 | 5312379 Carrier A | 1 | 0 | 0 |
| 925 | 7202075 Carrier A | 1 | 925 | 7202075 Carrier A | 1 | 0 | 0 |
| 925 | 8289137 Carrier A | 1 | 925 | 8289137 Carrier A | 1 | 0 | 0 |
| 925 | 9157919 Carrier A | 1 | 925 | 9157919 Carrier A | 1 | 0 | 0 |
| 925 | 9837732 Carrier A | 1 | 925 | 9837732 Carrier A | 1 | 0 | 0 |
| Measured Carrier A | | 31 | Measured Carrier A | | 34 | 6 | 3 |

FIG. 13

ALGORITHM FOR CALCULATING ADDS AND ADD SHARE

<u>Baseline period</u>
Count the total number of Measured subscribers for each carrier during a baseline period (roamers excluded)
    Carrier A       30
    Carrier B       45

Compare to the Actual number of subscribers during baseline period
    Carrier A       36
    Carrier B       50

Calculate the gross up coefficient for each carrier for baseline period
    Carrier A   "=36/30"    1.2000
    Carrier B   "=50/45"    1.1111

<u>Measurement period #1</u>
Count the total number of Measured subscribers for each carrier during the actual period #1
    Carrier A       31
    Carrier B       43

<u>Measurement period 2</u>
Count the total number of Measured subscribers for each carrier during the actual period #2
    Carrier A       34
    Carrier B       44

<u>Calculate new added subscribers for each carrier</u>
Sort and list the number of unique User IDs
Count the number of ID's for each carrier in period #2 that are new and did not exist in period #1
    Carrier A       6
    Carrier B       8

<u>Adjust numbers using baseline coefficients previously calculated</u>
Multiply measured adds for each carrier by the baseline coefficients for each carrier
    Carrier A   "6x1.2000    7.2000
    Carrier B   8x1.1111    8.8889
    Total                     16.0889

<u>Calculate share of new adds</u>
Divide adjusted numbers for each carrier by the adjusted total
    Carrier A   7.2000 /16.0889=    44.8%
    Carrier B   8.8889 /16.0889=    55.2%

FIG. 14

ALGORITHM FOR CALCULATING CHURN AND CHURN SHARE

<u>Baseline period</u>
Count the total number of Measured subscribers for each carrier during a baseline period (roamers excluded)
        Carrier A       30
        Carrier B       45

Compare to the Actual number of subscribers during baseline period
        Carrier A       36
        Carrier B       50

Calculate the gross up coefficient for each carrier for baseline period
        Carrier A   "=36/30"     1.2000
        Carrier B   "=50/45"     1.1111

<u>Measurement period #1</u>
Count the total number of Measured subscribers for each carrier during the actual period #1
        Carrier A       31
        Carrier B       43

<u>Measurement period 2</u>
Count the total number of Measured subscribers for each carrier during the actual period #2
        Carrier A       34
        Carrier B       44

<u>Calculate churned subscribers for each carrier</u>
Sort and list the number of unique User IDs
Count the number of ID's for each carrier in period #1 that do not exist in period #2
        Carrier A       3
        Carrier B       7

<u>Adjust numbers using baseline coefficients previously calculated</u>
Multiply measured churns for each carrier by the baseline coefficients for each carrier
        Carrier A   "3x1.2000     3.6000
        Carrier B   7x1.1111     7.7778
        Total                      11.3778

<u>Calculate share of churns</u>
Divide adjusted numbers for each carrier by the adjusted total
        Carrier A    3.6000 /11.3778=    31.6%
        Carrier B    7.7778 /11.3778=    68.4%

FIG. 15 inTeleShare – Gross Additions Subscriber share
December 1999 & trailing 12 months
*Portland, Oregon*

|  | Dec | Jan | Feb | Mar | Apr | May |
|---|---|---|---|---|---|---|
| Air Touch | | | | | | |
| Gross Additions | 2,408 | 3,425 | 5,345 | 3,765 | 3,789 | 6,578 |
| % Change | N/A | 42.2% | 56.1% | (29.4%) | 0.6% | 73.6% |
| Gross Additions Share | 27.3% | 38.4% | 34.3% | 24.1% | 31.4% | 31.3% |
| *Calls/Added Subscriber** | *27.3* | *25.6* | *29.3* | *30.3* | *31.3* | *32.4* |
| *Retention Rate*** | *95.7%* | *93.4%* | *87.4%* | *98.2%* | *94.4%* | *92.1%* |
| AT&T Wireless | | | | | | |
| Gross Additions | 3,054 | 3,878 | 5,456 | 8,234 | 4,234 | 3,378 |
| % Change | N/A | 27.0% | 40.7% | 50.9% | (48.8%) | (20.3%) |
| Gross Additions Share | 34.6% | 43.5% | 35.0% | 53.5% | 34.1% | 27.2% |
| *Calls/Added Subscriber** | *29.4* | *31.3* | *32.3* | *30.2* | *33.5* | *33.6* |
| *Retention Rate*** | *90.9%* | *88.7%* | *83.0%* | *81.4%* | *89.7%* | *87.6%* |
| Nextel | | | | | | |
| Gross Additions | 71 | 95 | 820 | 600 | 256 | 125 |
| % Change | N/A | 33.3% | 763.2% | (29.9%) | (57.3%) | (51.2%) |
| Gross Additions Share | 8.8% | 4.1% | 5.2% | 3.5% | 2.1% | 1.0% |
| *Calls/Added Subscriber** | *32.5* | *34.6* | *35.7* | *35.4* | *35.7* | *37.3* |
| *Retention Rate*** | *93.8%* | *99.4%* | *97.0%* | *94.3%* | *94.5%* | *94.5%* |
| Sprint PCS | | | | | | |
| Gross Additions | 1,234 | 1,246 | 2,604 | 1,108 | 2,739 | 1,042 |
| % Change | N/A | 1.0% | 108.9% | (57.5%) | 147.5% | (82.0%) |
| Gross Additions Share | 14.5% | 14.0% | 10.7% | 7.2% | 22.1% | 8.4% |
| *Calls/Added Subscriber** | *30.5* | *51.4* | *32.3* | *32* | *30.5* | *34.7* |
| *Retention Rate*** | *89.1%* | *96.5%* | *93.0%* | *89.6%* | *94.8%* | *94.5%* |
| USWest | | | | | | |
| Gross Additions | 171 | 172 | 733 | 601 | 193 | 552 |
| % Change | N/A | 1.0% | 324.8% | (18.0%) | (67.9%) | 185.9% |
| Gross Additions Share | 1.0% | 1.0% | 4.7% | 2.0% | 1.8% | 4.5% |
| *Calls/Added Subscriber** | *31.6* | *33.0* | *34.0* | *34.0* | *34.5* | *38.0* |
| *Retention Rate*** | *91.8%* | *96.5%* | *109.8%* | *82.4%* | *94.8%* | *84.5%* |
| Western Wireless | | | | | | |
| Gross Additions | 85 | 98 | 616 | 972 | 865 | 675 |
| % Change | N/A | 14.1% | 528.6% | 57.9% | (11.0%) | (22.0%) |
| Gross Additions Share | 1.0% | 1.1% | 4.0% | 6.4% | 7.2% | 8.5% |
| *Calls/Added Subscriber** | *30.5* | *30.3* | *30.2* | *33.3* | *34.1* | *35.4* |
| *Retention Rate*** | *87.3%* | *90.5%* | *104.2%* | *87.5%* | *94.8%* | *94.5%* |
| TOTAL | | | | | | |
| Gross Additions | 8,826 | 8,915 | 15,574 | 15,277 | 12,076 | 12,348 |
| % Change | N/A | 1.0% | 74.7% | (1.8%) | (21.0%) | 2.2% |
| *Calls/Added Subscriber** | *30.1* | *31.1* | *32.3* | *30.0* | *30.7* | *34.5* |
| *Retention Rate*** | *81.5%* | *85.2%* | *95.0%* | *91.9%* | *93.8%* | *92.9%* |

\* Rolling calculation based on aggregate monthly data, beginning with the subscriber's
\*\*Rolling percentage of gross subscribers added in that month that continue to receive
Note: Italics represent added (non-standard) report features

FIG. 16A

EXAMPLE

| Jun | July | Aug | Sep | Oct | Nov | Dec | Trailing 12 months | |
|---|---|---|---|---|---|---|---|---|
| 4,707 | 3,458 | 4,878 | 5.034 | 4,758 | 5,023 | 6,095 | Gross Adds | 58.962 |
| (27.5%) | (27.5%) | 41.2% | 3.2% | (4.9%) | 4.9% | 27.3% | | |
| 28.7% | 28.7% | 31.8% | 29.3% | 28.5% | 31.3% | 29.8% | Share | 32.4% |
| 33.6 | 34.5 | 36.7 | 36.3 | N/A | N/A | N/A | Calls /GA Sub | 32.3 |
| 97.8% | 94.6% | 97.6% | 98.2% | N/A | N/A | N/A | GA Sub Retention Ra | 94.7% |
| 3,675 | 3,756 | 6,545 | 7,877 | 6,811 | 6,972 | 8,604 | Gross Adds | 72,473 |
| 8.9% | 2.1% | 74.3% | 20.4% | (13.5%) | 2.4% | 23.4% | | |
| 30.2% | 28.0% | 42.3% | 48.2% | 40.6% | 43.4% | 41.8% | Share | 39.6% |
| 34.1 | 34.5 | 34.7 | 35.0 | N/A | N/A | N/A | Calls /GA Sub | 33.2 |
| 92.9% | 89.9% | 92.7% | 93.3% | N/A | N/A | N/A | GA Sub Retention Ra | 90.0% |
| 366 | 218 | 195 | 285 | 294 | 303 | 364 | Gross Adds | 4,014 |
| 211.2% | (44.0%) | (10.7%) | 46.3% | 3.1% | 3.0% | 20.4% | | |
| 3.2% | 1.7% | 1.3% | 1.7% | 1.7% | 1.9% | 1.2% | Share | 2.2% |
| 37.9 | 40.1 | 40.0 | 39.7 | N/A | N/A | N/A | Calls /GA Sub | 36.9 |
| 95.3% | 97.4% | 96.1% | 97.5% | N/A | N/A | N/A | GA Sub Retention Ra | 98.5% |
| 2,368 | 2,567 | 1,478 | 979 | 2,394 | 1,150 | 960 | Gross Adds | 21,808 |
| 127.5% | 8.4% | (42.4%) | (33.8%) | 144.5% | (52.0%) | (14.7%) | | |
| 10.5% | 10.8% | 9.8% | 8.8% | 14.2% | 7.2% | 4.8% | Share | 11.9% |
| 38.7 | 37.8 | 35.6 | 38.3 | N/A | N/A | N/A | Calls /GA Sub | 34.5 |
| 91.1% | 97.4% | 98.1% | 97.5% | N/A | N/A | N/A | GA Sub Retention Ra | 94.2% |
| 185 | 1,073 | 358 | 354 | 641 | 660 | 770 | Gross Adds | 5,693 |
| (66.5%) | 480.0% | (66.6%) | ( 0.0%) | 81.2% | 2.9% | 18.7% | | |
| 1.5% | 3.2% | 2.2% | 2.2% | 3.8% | 4.1% | 3.7% | Share | 3.6% |
| 37.5 | 39.0 | 39.3 | 39.0 | N/A | N/A | N/A | Calls /GA Sub | 38.8 |
| 93.9% | 97.4% | 95.1% | 97.5% | N/A | N/A | N/A | GA Sub Retention Ra | 96.7% |
| 765 | 1,878 | 2,021 | 1,818 | 1,887 | 1,955 | 3,782 | Gross Adds | 17,398 |
| 13.3% | 145.5% | 7.5% | (10.0%) | 3.8% | 3.6% | 92.6% | | |
| 9.8% | 14.5% | 13.1% | 11.1% | 11.2% | 12.2% | 14.3% | Share | 2.5% |
| 37.0 | 38.4 | 38.9 | 38.7 | N/A | N/A | N/A | Calls /GA Sub | 36.1 |
| 89.2% | 97.4% | 93.1% | 97.5% | N/A | N/A | N/A | GA Sub Retention Ra | 94.7% |
| 12,162 | 12,948 | 15,174 | 16,047 | 16,513 | 15,062 | 20,575 | Gross Adds | 181,497 |
| (1.6%) | 6.5% | 18.5% | 5.6% | 2.9% | (4.5%) | 28.1% | | |
| 35.2 | 37.6 | 38.1 | 38.6 | N/A | N/A | N/A | Calls /GA Sub | 34.4 |
| 93.5% | 95.7% | 97.1% | 98.9% | N/A | N/A | N/A | GA Sub Retention Ra | 94.4% | fourth month of service
wireless service from that carrier (calculation requires at least four months of service)

FIG. 16B inTeleShare – Dropped Subscriber share
December 1999 (Data through September 1999 & trailing 9 months)
*Portland, Oregon*

| | Dec | Jan | Feb | Mar | Apr | May |
|---|---|---|---|---|---|---|
| Air Touch | | | | | | |
| Dropped Subscribers | 1,024 | 1,214 | 835 | 1,965 | 847 | 1,265 |
| % Change | N/A | 18.5% | (31.2%) | 135.3% | (56.9%) | 49.4% |
| Dropped Share | 34.2% | 40.2% | 28.0% | 51.4% | 11.0% | 20.0% |
| *Calls/Dropped Subscriber** | *33.4* | *34.2* | *35.2* | *36.4* | *37.6* | *38.9* |
| *Churn Rate*** | *0.8%* | *0.5%* | *0.4%* | *0.9%* | *0.4%* | *0.5%* |
| AT&T Wireless | | | | | | |
| Dropped Subscribers | 1,584 | 1,632 | 1,670 | 1,103 | 1,958 | 2,310 |
| % Change | N/A | 4.3% | 2.4% | (34.0%) | 77.5% | 18.0% |
| Dropped Share | 51.1% | 54.9% | 57.9% | 32.8% | 43.0% | 54.9% |
| *Calls/Dropped Subscriber** | *36.8* | *39.1* | *42.4* | *41.5* | *41.9* | *42.0* |
| *Churn Rate*** | *0.7%* | *0.7%* | *0.7%* | *0.5%* | *0.8%* | *1.0%* |
| Nextel | | | | | | |
| Dropped Subscribers | 18 | 30 | 21 | 54 | 67 | 44 |
| % Change | N/A | 64.7% | (28.8%) | 159.5% | 22.9% | (34.3%) |
| Dropped Share | 0.0% | 1.0% | 0.7% | 1.0% | 1.1% | 1.0% |
| *Calls/Dropped Subscriber** | *38.0* | *38.3* | *38.6* | *39.2* | *39.5* | *41.3* |
| *Churn Rate*** | *0.3%* | *0.5%* | *0.3%* | *0.7%* | *0.4%* | *0.5%* |
| Sprint PCS | | | | | | |
| Dropped Subscribers | 105 | 113 | 237 | 101 | 1,249 | 95 |
| % Change | N/A | 6.9% | 108.9% | (57.5%) | 1142.8% | (92.4%) |
| Dropped Share | 2.5% | 2.7% | 8.2% | 3.0% | 27.5% | 2.2% |
| *Calls/Dropped Subscriber** | *33.7* | *34.5* | *35.5* | *35.9* | *38.9* | *38.2* |
| *Churn Rate*** | *0.4%* | *0.4%* | *0.8%* | *0.3%* | *3.8%* | *0.3%* |
| USWest | | | | | | |
| Dropped Subscribers | 32 | 16 | 67 | 55 | 18 | 50 |
| % Change | N/A | (51.0%) | 324.8% | (15.0%) | (67.9%) | 168.9% |
| Dropped Share | 1.1% | 0.5% | 2.2% | 1.1% | 0.4% | 1.1% |
| *Calls/Dropped Subscriber** | *34.8* | *38.4* | *37.5* | *37.5* | *38.2* | *39.7* |
| *Churn Rate*** | *0.2%* | *0.1%* | *0.4%* | *0.3%* | *0.1%* | *0.3%* |
| Western Wireless | | | | | | |
| Dropped Subscribers | 26 | 19 | 56 | 88 | 410 | 465 |
| % Change | N/A | (26.5%) | 193.2% | 57.9% | 365.8% | 13.4% |
| Dropped Share | 0.0% | 0.0% | 1.0% | 2.0% | 0.0% | 11.0% |
| *Calls/Dropped Subscriber** | *34.2* | *35.8* | *30.5* | *38.7* | *37.5* | *39.0* |
| *Churn Rate*** | *0.3%* | *0.2%* | *0.7%* | *0.9%* | *4.2%* | *4.7%* |
| TOTAL | | | | | | |
| Dropped Subscribers | 2,993 | 3,023 | 2,835 | 3,366 | 4,549 | 4,229 |
| % Change | N/A | 1.0% | (4.6%) | 18.7% | 35.1% | (7.0%) |
| *Calls/Dropped Subscriber** | *34.5* | *38.4* | *37.4* | *37.9* | *38.6* | *39.8* |
| *Churn Rate*** | *0.4%* | *0.4%* | *0.5%* | *0.6%* | *1.7%* | *1.2%* |

* Rolling calculation based on aggregate monthly data, beginning with the subscriber's
**Percentage of gross drops vs. total installed subscriber base for that month (Calculat-
Note: Italics represent added (non-standard) report features

FIG. 17A

EXAMPLE

| Jun | July | Aug | Sep | Oct | Nov | Dec | Trailing 9 months | |
|---|---|---|---|---|---|---|---|---|
| 2,558 | 121 | 435 | 7,034 | N/A | N/A | N/A | Gross Drops | 17,298 |
| 102.1% | (95.0%) | 259.5% | 1517.0% | N/A | N/A | N/A | | |
| 41.5% | 2.2% | 10.0% | 74.1% | N/A | N/A | N/A | Share | 40.2% |
| 40.3 | 41.4 | 44.0 | 48.0 | N/A | N/A | N/A | Calls/Dropped Sub | 38.7 |
| 1.1% | 0.1% | 0.2% | 2.8% | N/A | N/A | N/A | Annualized Churn Ret | 9.5% |
| 2,611 | 1,824 | 1,502 | 1,826 | N/A | N/A | N/A | Gross Drops | 18,002 |
| 13.0% | (30.1%) | (17.7%) | 21.7% | N/A | N/A | N/A | | |
| 42.5% | 48.9% | 55.2% | 19.5% | N/A | N/A | N/A | Share | 41.1% |
| 42.6 | 43.1 | 43.4 | 43.8 | N/A | N/A | N/A | Calls/Dropped Sub | 41.5 |
| 1.1% | 0.5% | 0.8% | 0.7% | N/A | N/A | N/A | Annualized Churn Ret | 9.5% |
| 93 | 126 | 165 | 26 | N/A | N/A | N/A | Gross Drops | 547 |
| 111.4% | 35.7% | 27.7% | (84.3%) | N/A | N/A | N/A | | |
| 1.5% | 1.4% | 0.1% | 0.1% | N/A | N/A | N/A | Share | 1.5% |
| 42.0 | 44.4 | 44.5 | 44.0 | N/A | N/A | N/A | Calls/Dropped Sub | 40.9 |
| 1.1% | 1.6% | 1.9% | 0.3% | N/A | N/A | N/A | Annualized Churn Ret | 9.8% |
| 215 | 317 | 134 | 89 | N/A | N/A | N/A | Gross Drops | 2,655 |
| 127.3% | 47.2% | (57.6%) | (33.8%) | N/A | N/A | N/A | | |
| 3.5% | 5.4% | 4.9% | 0.0% | N/A | N/A | N/A | Share | 6.7% |
| 40.4 | 41.6 | 42.4 | 42.1 | N/A | N/A | N/A | Calls/Dropped Sub | 38.1 |
| 0.6% | 0.3% | 0.3% | 0.2% | N/A | N/A | N/A | Annualized Churn Ret | 8.8% |
| 27 | 661 | 302 | 247 | N/A | N/A | N/A | Gross Drops | 1,475 |
| (48.2%) | 3051.0% | (54.5%) | (18.2%) | N/A | N/A | N/A | | |
| 0.4% | 22.7% | 11.1% | 2.0% | N/A | N/A | N/A | Share | 3.5% |
| 41.2 | 43.0 | 43.3 | 43.1 | N/A | N/A | N/A | Calls/Dropped Sub | 38.5 |
| 0.2% | 4.7% | 1.7% | 1.4% | N/A | N/A | N/A | Annualized Churn Ret | 12.2% |
| 640 | 512 | 184 | 163 | N/A | N/A | N/A | Gross Drops | 2,558 |
| 37.6% | (20.0%) | (64.1%) | (10.0%) | N/A | N/A | N/A | | |
| 10.4% | 12.0% | 0.7% | 1.0% | N/A | N/A | N/A | Share | 12.0% |
| 40.8 | 42.3 | 42.8 | 42.8 | N/A | N/A | N/A | Calls/Dropped Sub | 33.3 |
| 6.3% | 4.5% | 1.4% | 1.1% | N/A | N/A | N/A | Annualized Churn Ret | 22.5% |
| 6,142 | 3,754 | 2,722 | 9,385 | N/A | N/A | N/A | Gross Drops | 42,998 |
| 45.2% | (38.9%) | (27.5%) | 245.0% | N/A | N/A | N/A | | |
| 41.2 | 42.0 | 43.4 | 43.6 | N/A | N/A | N/A | Calls/Dropped Sub | 38.8 |
| 1.7% | 2.1% | 1.0% | 1.1% | N/A | N/A | N/A | Annualized Churn Ret | 10.8% | fourth month of service
ion of gross drops requires at least four months of non-service)

FIG. 17B

ROAMER MEASUREMENT
ACTUAL ROAMERS VS. MEASURED ROAMERS DURING A BASELINE PERIOD

| Actual Roamers | | | Measured Roamers | | |
|---|---|---|---|---|---|
| 214 | 8495065 | Carrier B | 214 | 8495065 | Carrier B |
| *212* | *4563453* | *Carrier B* | | | |
| 412 | 3458569 | Carrier B | 412 | 3458569 | Carrier B |
| 917 | 8393984 | Carrier B | 917 | 8393984 | Carrier B |
| *202* | *3450902* | *Carrier A* | | | |
| 206 | 8473934 | Carrier A | 206 | 8473934 | Carrier A |
| 213 | 4929087 | Carrier A | 213 | 4929087 | Carrier A |
| 916 | 9485023 | Carrier A | 916 | 9485023 | Carrier A |
| *Total #* | 8 | *Both* | *Total #* | 6 | *Both* |

FIG. 18

ROAMER MEASUREMENT
SORTED DATA TO COUNT MEASURED SUBS FOR ACTUAL PERIOD

| Roamers | | |
|---|---|---|
| 617 | 8493200 | Carrier A |
| 206 | 8473934 | Carrier A |
| 213 | 4929087 | Carrier A |
| 412 | 3458569 | Carrier B |
| 917 | 8393984 | Carrier B |
| Measured | | 5 |

FIG. 19

ROAMER MEASUREMENT
ALGORITHM FOR CALCULATING ROAMING SHARE

Baseline period
Count the total number of Measured roamers for each carrier during a baseline period
        Carrier A        3
        Carrier B        3

Compare to the Actual number of roamers during baseline period
        Carrier A        4
        Carrier B        4

Calculate the gross up coefficient for each carrier for baseline period
        Carrier A    "=4/3=        1.3333
        Carrier B    "=4/3=        1.3333

Actual measurement period
Count the total number of Measured roamers for each carrier during the actual period
        Carrier A        3
        Carrier B        2

Calculate the total number of roamers using the gross up coefficients
        Carrier A    "=3*1.3333    4.0000
        Carrier B    "=2*1.3333    2.6667
        Tot # roamers = 3*1.3333+2*1.3333 = 6.6667

Calculate the roamer share of each carrier for actual data
        Carrier A    "=3*1.3333/6.6667 =    60.0%
        Carrier B    "=2*1.3333/6.6667 =    40.0%

FIG. 20

| FIG. 21A | FIG. 21B |
|---|---|

FIG. 21 inTeleShare – Roamer Activity Report
December 1999 & trailing 12 months
*Portland, Oregon*

|  | Dec | Jan | Feb | Mar | Apr | May |
|---|---|---|---|---|---|---|
| Air Touch | | | | | | |
| Roamers | 37,215 | 37,581 | 38,358 | 38,064 | 39,104 | 40,067 |
| % Change | N/A | 1.0% | 2.0% | 0.8% | 1.3% | 2.3% |
| Share of Roamers | 41.1% | 41.0% | 40.2% | 40.2% | 40.1% | 40.4% |
| Roamer Calls (000's) | 518 | 524 | 578 | 623 | 673 | 724 |
| % Change | N/A | 1.0% | 10.2% | 7.9% | 7.0% | 7.5% |
| Share of Roaming Calls | 42.2% | 42.2% | 40.5% | 40.5% | 44.5% | 45.3% |
| Roaming Calls/Roamer | 13.9 | 13.9 | 15.1 | 16.1 | 17.2 | 18.1 |
| Roamer Statistics By Home Location | | | | | | |
| Seattle Roamers | 8,932 | 10,160 | 9,589 | 10,826 | 10,183 | 9,215 |
| % Change | N/A | 13.8% | (5.5%) | 12.9% | (5.9%) | (9.5%) |
| Seattle Roamer Share | 41.8% | 42.3% | 37.5% | 43.0% | 42.0% | 29.0% |
| All Other Roamers* | 28,284 | 27,441 | 28,768 | 27,838 | 28,981 | 30,852 |
| % Change | N/A | (3.0%) | 4.8% | (3.2%) | 4.1% | 0.6% |
| All Other Roamer Share | 40.3% | 40.5% | 41.8% | 38.0% | 39.5% | 40.5% |
| AT&T Wireless | | | | | | |
| Roamers | 42,257 | 42,684 | 43,403 | 44,758 | 45,190 | 45,383 |
| % Change | N/A | 1.0% | 1.7% | 3.1% | 1.0% | 0.4% |
| Share of Roamers | 48.7% | 46.8% | 45.2% | 44.6% | 44.3% | 45.3% |
| Roamer Calls (000's) | 574 | 580 | 592 | 627 | 652 | 667 |
| % Change | N/A | 1.0% | 2.1% | 5.9% | 4.0% | 2.3% |
| Share of Roaming Calls | 48.7% | 40.7% | 44.8% | 43.0% | 42.1% | 41.7% |
| Roaming Calls/Roamer | 13.8 | 13.8 | 13.8 | 14.0 | 14.4 | 14.7 |
| Roamer Statistics By Home Location | | | | | | |
| Seattle Roamers | 8,874 | 9,817 | 11,719 | 9,399 | 9,942 | 10,884 |
| % Change | N/A | 10.6% | 19.4% | (19.5%) | 5.8% | 9.8% |
| Seattle Roamer Share | 41.5% | 40.9% | 40.3% | 37.8% | 41.9% | 40.1% |
| All Other Roamers* | 33,383 | 32,886 | 31,884 | 35,359 | 32,248 | 34,498 |
| % Change | N/A | (1.5%) | (3.0%) | 11.6% | (0.3%) | (2.1%) |
| All Other Roamer Share | 48.3% | 48.8% | 48.2% | 48.5% | 48.0% | 48.3% |
| Nextel | | | | | | |
| Roamers | 972 | 982 | 1,102 | 1,184 | 1,212 | 1,224 |
| % Change | N/A | 1.0% | 12.2% | 7.4% | 2.4% | 1.0% |
| Share of Roamers | 1.1% | 1.1% | 1.2% | 1.2% | 1.2% | 1.2% |
| Roamer Calls (000's) | 19 | 19 | 24 | 27 | 27 | 33 |
| % Change | N/A | 1.0% | 23.2% | 11.4% | 2.7% | 20.4% |
| Share of Roaming Calls | 1.8% | 1.8% | 1.8% | 1.8% | 1.8% | 2.1% |
| Roaming Calls/Roamer | 19.8 | 19.8 | 21.7 | 22.5 | 22.8 | 28.9 |
| Roamer Statistics By Home Location | | | | | | |
| Seattle Roamers | 204 | 314 | 386 | 320 | 267 | 343 |
| % Change | N/A | 53.9% | 22.7% | (17.1%) | (16.6%) | 28.6% |
| Seattle Roamer Share | 1.0% | 1.3% | 1.5% | 1.3% | 1.1% | 1.5% |
| All Other Roamers* | 768 | 668 | 718 | 864 | 945 | 861 |
| % Change | N/A | (13.1%) | 7.3% | 20.6% | 9.4% | (8.8%) |
| All Other Roamer Share | 1.1% | 1.0% | 1.0% | 1.2% | 1.1% | 1.2% |

FIG. 21A

EXAMPLE

| Jun | July | Aug | Sep | Oct | Nov | Dec | Trailing 12 months | |
|---|---|---|---|---|---|---|---|---|
| 40,443 | 41,010 | 41,763 | 41,425 | 41,089 | 40,912 | 41,765 | | |
| 0.9% | 1.4% | 1.8% | (0.8%) | (1.0%) | (0.3%) | 2.1% | Roamer CAGR | 12.2% |
| 40.3% | 40.2% | 40.0% | 30.1% | 32.1% | 37.4% | 37.0% | Roamer Share Gain | (4.1%) |
| 741 | 748 | 782 | 817 | 858 | 900 | 988 | | |
| 2.3% | 1.0% | 4.6% | 4.5% | 5.0% | 4.9% | 9.8% | Roamer Call CAGR | 90.5% |
| 45.0% | 43.2% | 42.1% | 41.0% | 41.2% | 41.2% | 42.1% | Roamer Call Share Gain | (0.11%) |
| 18.3 | 18.2 | 18.7 | 19.7 | 20.9 | 22.0 | 23.7 | Roamer Calls/Roamer | 10.1 |
| 12,942 | 13,533 | 15,453 | 14,085 | 11,078 | 12,883 | 13,783 | | |
| 40.4% | 4.6% | 14.2% | (8.9%) | (21.3%) | 14.5% | 9.7% | Seattle Roamer CAGR | 54.3% |
| 42.8% | 34.5% | 42.8% | 42.8% | 38.8% | 35.6% | 40.8% | Seattle Roamer Share Gain | (1.3%) |
| 27,501 | 27,477 | 26,312 | 27,341 | 29,951 | 28,229 | 27,983 | | |
| (10.9%) | (0.1%) | (1.2%) | 3.9% | 9.5% | (5.7%) | (0.9%) | All Other Roamer Call CAGR | (1.1%) |
| 38.3% | 33.3% | 30.0% | 27.5% | 39.1% | 38.1% | 35.8% | All Other Share Gain | (5.4%) |
| 45,693 | 45,983 | 46,921 | 48,070 | 49,240 | 50,451 | 51,937 | | |
| 0.4% | 0.8% | 2.1% | 2.4% | 2.4% | 2.4% | 2.9% | Roamer CAGR | 22.9% |
| 45.6% | 45.0% | 44.2% | 46.4% | 41.7% | 46.1% | 46.1% | Roamer Share Gain | (0.8%) |
| 689 | 752 | 825 | 880 | 910 | 943 | 1,033 | | |
| 3.3% | 9.2% | 9.7% | 6.7% | 3.3% | 3.8% | 9.5% | Roamer Call CAGR | 50.1% |
| 41.5% | 43.4% | 44.4% | 44.8% | 44.4% | 43.8% | 44.6% | Roamer Call Share Gain | (2.7%) |
| 15.1 | 16.4 | 17.6 | 18.3 | 18.5 | 15.7 | 19.9 | Roamer Calls/Roamer | 18.0 |
| 12,767 | 11,950 | 14,078 | 13,460 | 15,268 | 17,163 | 14,023 | | |
| 17.2% | (9.4%) | 17.8% | (4.4%) | 13.4% | 12.4% | (18.2%) | Seattle Roamer CAGR | 58.0% |
| 42.1% | 39.4% | 39.5% | 40.5% | 40.1% | 48.5% | 41.2% | Seattle Roamer Share Gain | (0.3%) |
| 32,829 | 34,012 | 32,844 | 34,610 | 33,980 | 33,297 | 37,914 | | |
| (4.8%) | 3.6% | (3.4%) | 5.4% | (1.8%) | (2.0%) | 13.2% | All Other Roamer Call CAGR | 13.6% |
| 46.3% | 47.4% | 47.4% | 47.5% | 44.4% | 45.0% | 48.2% | All Other Share Gain | (9.1%) |
| 1,268 | 1,282 | 1,286 | 1,325 | 1,365 | 1,406 | 1,456 | | |
| 3.6% | 1.1% | 0.4% | 3.0% | 3.0% | 3.0% | 3.5% | Roamer CAGR | 49.8% |
| 1.2% | 1.3% | 1.2% | 1.5% | 1.3% | 1.5% | 1.3% | Roamer Share Gain | 0.2% |
| 35 | 36 | 38 | 41 | 43 | 44 | 46 | | |
| 8.3% | 1.6% | 7.6% | 7.2% | 4.0% | 3.6% | 4.4% | Roamer Call CAGR | 140.6% |
| 2.1% | 2.1% | 2.1% | 2.1% | 2.1% | 2.1% | 2.0% | Roamer Call Share Gain | 0.4% |
| 27.8 | 27.7 | 29.7 | 30.9 | 31.4 | 31.5 | 31.5 | Roamer Calls/Roamer | 26.5 |
| 482 | 295 | 386 | 384 | 437 | 365 | 437 | | |
| 40.6% | (38.5%) | 30.9% | (0.4%) | 13.7% | (16.3%) | 19.5% | Seattle Roamer CAGR | 114.0% |
| 1.6% | 1.0% | 1.1% | 1.2% | 1.4% | 1.0% | 1.3% | Seattle Roamer Share Gain | 0.3% |
| 768 | 987 | 900 | 941 | 928 | 1,041 | 1,019 | | |
| (10.8%) | 28.5% | (8.8%) | 4.5% | (1.3%) | 12.1% | (2.1%) | All Other Roamer Call CAGR | 32.7% |
| 1.1% | 1.4% | 1.3% | 1.3% | 1.2% | 1.4% | 1.3% | All Other Share Gain | 0.2% |

FIG. 21B

*CALL SHARE MEASUREMENT*
ACTUAL SUBSCRIBERS VS. MEASURED SUBSCRIBERS DURING A BASELINE PERIOD

| Actual Calls - Carrier B | | | | Measured Calls - Carrier B | | | |
|---|---|---|---|---|---|---|---|
| | 408 | 3216877 Carrier B | TC Assignment | | | | |
| | 408 | 5048157 Carrier B | TC Assignment | | | | |
| | 408 | 5048157 Carrier B | TC Assignment | | | | |
| | 415 | 2719321 Carrier B | TC Assignment | | | | |
| | 415 | 2719321 Carrier B | TC Assignment | | 415 | 2719321 Carrier B | TC Assignment |
| | 415 | 4651181 Carrier B | TC Assignment | | | | |
| | 415 | 4995677 Carrier B | TC Assignment | | | | |
| | 415 | 4995677 Carrier B | TC Assignment | | | | |
| | 415 | 7202077 Carrier B | TC Assignment | | | | |
| | 415 | 7220981 Carrier B | TC Assignment | | 415 | 7220981 Carrier B | TC Assignment |
| | 510 | 9719435 Carrier B | TC Assignment | | 510 | 9719435 Carrier B | TC Assignment |
| | 510 | 9719435 Carrier B | TC Assignment | | 510 | 9719435 Carrier B | TC Assignment |
| | 650 | 2086803 Carrier B | TC Assignment | | | | |
| | 650 | 3165225 Carrier B | TC Assignment | | 650 | 3165225 Carrier B | TC Assignment |
| | 650 | 4720249 Carrier B | TC Assignment | | | | |
| | 917 | 8393984 Carrier B | TC Assignment | | | | |
| | 925 | 4799759 Carrier B | TC Assignment | | | | |
| | 925 | 4799759 Carrier B | TC Assignment | | | | |
| | 925 | 7202077 Carrier B | TC Assignment | | | | |
| Total # | | 19 Carrier B | | Total # | | 5 Carrier B | |
| Total non roamers # | | 18 | | | | 5 | |

| Actual Calls - Carrier B | | | | Measured Calls - Carrier B | | | |
|---|---|---|---|---|---|---|---|
| | 206 | 8473934 Carrier A | TC Assignment | | 206 | 8473934 Carrier A | TC Assignment |
| | 213 | 4929087 Carrier A | TC Assignment | | | | |
| | 408 | 3081099 Carrier A | TC Assignment | | 408 | 3081099 Carrier A | TC Assignment |
| | 408 | 3260181 Carrier A | TC Assignment | | | | |
| | 408 | 5048155 Carrier A | TC Assignment | | | | |
| | 408 | 6322327 Carrier A | TC Assignment | | 408 | 6322327 Carrier A | TC Assignment |
| | 408 | 9727753 Carrier A | TC Assignment | | | | |
| | 415 | 4651179 Carrier A | TC Assignment | | | | |
| | 415 | 4995675 Carrier A | TC Assignment | | | | |
| | 415 | 6912099 Carrier A | TC Assignment | | 415 | 6912099 Carrier A | TC Assignment |
| | 415 | 7070089 Carrier A | TC Assignment | | | | |
| | 415 | 7202075 Carrier A | TC Assignment | | | | |
| | 415 | 9157919 Carrier A | TC Assignment | | | | |
| | 415 | 9718061 Carrier A | TC Assignment | | | | |
| | 415 | 9718063 Carrier A | TC Assignment | | 415 | 9718063 Carrier A | TC Assignment |
| | 510 | 2719319 Carrier A | TC Assignment | | | | |
| | 510 | 4072267 Carrier A | TC Assignment | | | | |
| | 510 | 4072267 Carrier A | TC Assignment | | | | |
| | 510 | 4072267 Carrier A | TC Assignment | | | | |
| | 510 | 4075791 Carrier A | TC Assignment | | 510 | 4075791 Carrier A | TC Assignment |
| | 510 | 4140375 Carrier A | TC Assignment | | | | |
| | 510 | 4792791 Carrier A | TC Assignment | | | | |
| | 510 | 5312381 Carrier A | TC Assignment | | 510 | 5312381 Carrier A | TC Assignment |
| | 510 | 5312381 Carrier A | TC Assignment | | | | |
| | 510 | 6728701 Carrier A | TC Assignment | | 510 | 6728701 Carrier A | TC Assignment |
| | 617 | 8493200 Carrier A | TC Assignment | | | | |
| | 650 | 2086801 Carrier A | TC Assignment | | | | |
| | 650 | 4140375 Carrier A | TC Assignment | | | | |
| | 650 | 4720247 Carrier A | TC Assignment | | | | |
| | 650 | 7600201 Carrier A | TC Assignment | | | | |
| | 650 | 8160867 Carrier A | TC Assignment | | 650 | 8160867 Carrier A | TC Assignment |
| | 650 | 8160867 Carrier A | TC Assignment | | | | |
| | 650 | 8282139 Carrier A | TC Assignment | | | | |
| | 650 | 8282139 Carrier A | TC Assignment | | | | |
| | 650 | 8722861 Carrier A | TC Assignment | | | | |
| | 650 | 9727753 Carrier A | TC Assignment | | | | |
| | 916 | 9485023 Carrier A | TC Assignment | | 916 | 9485023 Carrier A | TC Assignment |
| | 925 | 3086349 Carrier A | TC Assignment | | | | |
| | 925 | 4946647 Carrier A | TC Assignment | | | | |
| | 925 | 5312381 Carrier A | TC Assignment | | 925 | 5312381 Carrier A | TC Assignment |
| | 925 | 8289137 Carrier A | TC Assignment | | | | |
| | 925 | 8722861 Carrier A | TC Assignment | | | | |
| | 925 | 9837732 Carrier A | TC Assignment | | | | |
| Total # | | 43 Carrier A | | Total # | | 11 Carrier A | |
| Total non roamers # | | 39 | | | | 10 | |

| Total # | | 62 Both | | Total # | | 16 Both | |

FIG. 22

*CALL SHARE MEASUREMENT*
SORTED DATA TO COUNT MEASURED CALLS FOR ACTUAL PERIOD (SHOWS TC ASSIGNMENTS ONLY)

Measured TC Assignments - Carrier B

| | | | |
|---|---|---|---|
| 415 | 2719319 | Carrier B | TC Assignment |
| 415 | 7220979 | Carrier B | TC Assignment |
| 510 | 9719433 | Carrier B | TC Assignment |
| 650 | 3165223 | Carrier B | TC Assignment |

*Measured Carrier B*     *4*
*Non-roaming*     *4*

Measured TC Assignments - Carrier B

| | | | |
|---|---|---|---|
| 206 | 8473934 | Carrier A | TC Assignment |
| 408 | 6322325 | Carrier A | TC Assignment |
| 408 | 3081097 | Carrier A | TC Assignment |
| 415 | 6912097 | Carrier A | TC Assignment |
| 415 | 9718061 | Carrier A | TC Assignment |
| 510 | 5312379 | Carrier A | TC Assignment |
| 510 | 4075789 | Carrier A | TC Assignment |
| 510 | 6728699 | Carrier A | TC Assignment |
| 650 | 8160865 | Carrier A | TC Assignment |
| 925 | 5312379 | Carrier A | TC Assignment |

*Measured Carrier A*     *10*
*Non-roaming*     *9*

FIG. 23

*CALL SHARE MEASUREMENT*
ALGORITHM FOR CALCULATING CALL SHARE

Baseline period
Count the total number of Measured calls for each carrier during a baseline period (roamers excluded)
    Carrier A    11
    Carrier B    5

Compare to the Actual number of calls during baseline period
    Carrier A    43
    Carrier B    19

Calculate the gross up coefficient for each carrier for baseline period
    Carrier A    "=43/11"    3.9091
    Carrier B    "=19/5"    3.8000

Actual measurement period
Count the total number of Measured calls for each carrier during the actual period
    Carrier A    10
    Carrier B    4

Calculate estimate of actual number of calls
Calculate the estimate of actual number of calls for each carrier during the actual period using gross up coefficients
    Carrier A    "=10*3.9091"    39.0909
    Carrier B    "=4*3.8000"    15.2000

Calculate caller share
Calculate the total number of calls using the gross up coefficients
    Tot # calls =10*3.9091+4*3.8000=    54.2909

Calculate the market share of each carrier for actual data
    Carrier A    =39.0909/54.2909=    72.0%
    Carrier B    =15.2000/54.2909=    28.0%

CALCULATE THE SAME EXCLUDING ROAMING CALLS

Baseline period
Count the total number of Measured calls for each carrier during a baseline period (roamers excluded)
    Carrier A    10
    Carrier B    5

Compare to the Actual number of calls during baseline period
    Carrier A    39
    Carrier B    18

Calculate the gross up coefficient for each carrier for baseline period
    Carrier A    "=39/10"    3.9000
    Carrier B    "=18/5"    3.6000

Actual measurement period
Count the total number of Measured calls for each carrier during the actual period
    Carrier A    9
    Carrier B    4

Calculate estimate of actual number of calls
Calculate the estimate of actual number of calls for each carrier during the actual period using gross up coefficients
    Carrier A    "=9*3.9091"    35.1000
    Carrier B    "=4*3.6000"    14.4000

Calculate caller share
Calculate the total number of calls using the gross up coefficients
    Tot # calls =9*3.9091+4*3.6000=    49.5000

Calculate the market share of each carrier for actual data
    Carrier A    =35.1000/49.5000=    70.9%
    Carrier B    =14.4000/49.5000=    29.1%

FIG. 24

| FIG. 25A | FIG. 25B |

FIG. 25 inTeleShare – Call share
December 1999 & trailing 12 months
Portland, Oregon

|  | Dec | Jan | Feb | Mar | Apr | May |
|---|---|---|---|---|---|---|
| Air Touch | | | | | | |
| Number of Calls(000's) | 5,188.2 | 5,240.8 | 5,778.3 | 6,231.7 | 6,727.0 | 7,240.1 |
| % Change | N/A | 1.0% | 10.2% | 7.9% | 7.9% | 7.6% |
| Share of calls | 42.2% | 42.2% | 43.5% | 43.7% | 44.5% | 45.3% |
| Share of calls: net gain (loss) | N/A | 0.0% | 1.3% | 0.1% | 0.8% | 0.8% |
| Calls/Subscriber | 23.7 | 23.7 | 25.8 | 27.4 | 29.2 | 31.5 |
| AT&T Wireless | | | | | | |
| Number of Calls(000's) | 5,378.0 | 5,796.0 | 5,918.5 | 6,286.1 | 6,518.9 | 6,66.6 |
| % Change | N/A | 1.0% | 2.1% | 5.9% | 4.0% | 2.3% |
| Share of calls | 45.7% | 46.7% | 44.6% | 43.9% | 43.1% | 41.7% |
| Share of calls: net gain (loss) | N/A | 0.0% | (2.1%) | (0.7%) | (0.8%) | (1.4%) |
| Calls/Subscriber | 25.8 | 25.8 | 25.9 | 26.6 | 27.4 | 27.9 |
| Nextel | | | | | | |
| Number of Calls(000's) | 192.5 | 194.4 | 239.4 | 266.7 | 273.9 | 329.7 |
| % Change | N/A | 1.0% | 23.2% | 11.4% | 2.7% | 20.4% |
| Share of calls | 1.6% | 1.6% | 1.8% | 1.9% | 1.8% | 2.1% |
| Share of calls: net gain (loss) | N/A | 0.0% | 0.2% | 0.1% | (0.1%) | 0.3% |
| Calls/Subscriber | 29.7 | 29.7 | 32.6 | 33.8 | 33.9 | 40.4 |
| Sprint PCS | | | | | | |
| Number of Calls(000's) | 616.5 | 653.0 | 711.3 | 802.2 | 850.4 | 979.5 |
| % Change | N/A | 1.0% | 8.9% | 12.5% | 6.0% | 15.2% |
| Share of calls | 5.3% | 5.3% | 5.4% | 5.6% | 5.8% | 5.1% |
| Share of calls: net gain (loss) | N/A | 0.0% | 0.1% | 0.3% | 0.0% | 0.5% |
| Calls/Subscriber | 24.8 | 24.6 | 25.7 | 26.7 | 28.3 | 30.1 |
| USWest | | | | | | |
| Number of Calls(000's) | 353.9 | 357.5 | 407.0 | 457.7 | 484.8 | 496.0 |
| % Change | N/A | 1.0% | 13.8% | 12.6% | 5.9% | 2.3% |
| Share of calls | 2.9% | 2.9% | 3.1% | 3.2% | 3.2% | 3.1% |
| Share of calls: net gain (loss) | N/A | 0.0% | 0.2% | 0.1% | (0.0%) | (0.1%) |
| Calls/Subscriber | 22.8 | 22.6 | 24.9 | 27.1 | 28.4 | 30.0 |
| Western Wireless | | | | | | |
| Number of Calls(000's) | 176.5 | 178.3 | 217.2 | 245.5 | 263.4 | 272.6 |
| % Change | N/A | 1.0% | 21.8% | 13.0% | 7.3% | 3.5% |
| Share of calls | 1.4% | 1.4% | 1.6% | 1.7% | 1.7% | 1.7% |
| Share of calls: net gain (loss) | N/A | (0.0%) | 0.2% | 0.1% | 0.0% | (0.0%) |
| Calls/Subscriber | 22.8 | 22.6 | 25.7 | 26.3 | 26.7 | 26.9 |
| TOTAL | | | | | | |
| Number of Calls(000's) | 12,295.8 | 12,419.8 | 13,287.7 | 14,299.9 | 15,118.3 | 15,983.3 |
| % Change | N/A | 1.0% | 6.8% | 7.6% | 5.9% | 5.7% |
| Calls/Subscriber | 24.5 | 24.7 | 25.0 | 27.1 | 20.3 | 29.0 |

FIG. 25A

EXAMPLE

| Jun | July | Aug | Sep | Oct | Nov | Dec | Trailing 12 months | |
|---|---|---|---|---|---|---|---|---|
| 7,408.7 | 7,481.0 | 7,822.4 | 8,173.4 | 8,562.5 | 9,003.5 | 9,884.2 | CAGR | 58.8% |
| 2.3% | 1.0% | 4.6% | 4.5% | 5.0% | 4.9% | 9.6% | | |
| 45.0% | 43.2% | 42.1% | 41.8% | 41.8% | 41.9% | 42.1% | Share Gain | (0.1%) |
| (0.3%) | (1.8%) | (1.1%) | (0.5%) | 0.2% | 0.1% | 0.1% | Net Share Gain | 15.7 |
| 32.3 | 32.7 | 33.6 | 34.5 | 35.6 | 36.7 | 39.4 | Call/Sub. Gain | 15.7 |
| 6,867.3 | 7,520.5 | 8,246.2 | 8,804.4 | 9,097.6 | 9,426.3 | 10,332.7 | CAGR | 78.3% |
| 3.3% | 9.2% | 9.7% | 6.7% | 3.3% | 3.6% | 9.5% | | |
| 41.8% | 43.4% | 44.4% | 44.8% | 44.4% | 43.9% | 44.0% | Share Gain | (2.7%) |
| 0.1% | 1.6% | 0.9% | 0.5% | (0.5%) | (0.4%) | 0.1% | Net Share Gain | 12.0 |
| 28.7 | 31.2 | 33.4 | 34.8 | 35.1 | 35.5 | 37.8 | Call/Sub. Gain | 12.0 |
| 350.3 | 355.4 | 382.4 | 409.0 | 428.7 | 443.5 | 463.0 | CAGR | 138.2% |
| 6.3% | 1.5% | 7.6% | 7.2% | 4.6% | 3.5% | 4.4% | | |
| 2.1% | 2.1% | 2.1% | 2.1% | 2.1% | 2.1% | 2.0% | Share Gain | 0.4% |
| 0.1% | (0.1%) | 0.0% | 0.0% | 0.0% | (0.0%) | (0.1%) | Net Share Gain | 16.0 |
| 42.5 | 42.7 | 44.6 | 48.4 | 47.1 | 47.3 | 47.7 | Call/Sub. Gain | 16.0 |
| 1,048.1 | 1,154.7 | 1,246.8 | 1,306.5 | 1,330.2 | 1,459.4 | 1,525.7 | CAGR | 133.6% |
| 7.0% | 10.2% | 8.0% | 4.8% | 4.1% | 7.3% | 4.5% | | |
| 5.4% | 6.7% | 6.7% | 6.7% | 6.6% | 5.8% | 6.5% | Share Gain | 1.2% |
| 0.2% | 0.3% | 0.0% | (0.1%) | (0.0%) | 0.2% | (0.3%) | Net Share Gain | 10.8 |
| 31.3 | 32.4 | 32.9 | 33.3 | 33.9 | 34.5 | 35.2 | Call/Sub. Gain | 10.8 |
| 502.3 | 491.8 | 502.6 | 500.3 | 522.9 | 559.2 | 598.5 | CAGR | 67.5% |
| 1.3% | (2.1%) | 2.2% | (0.4%) | 4.5% | 6.9% | 7.0% | | |
| 3.0% | 2.8% | 2.7% | 2.5% | 2.5% | 2.5% | 2.5% | Share Gain | (0.3%) |
| (0.1%) | (0.2%) | (0.1%) | (0.2%) | 0.0% | 0.1% | (0.1%) | Net Share Gain | 12.7 |
| 31.4 | 31.8 | 33.0 | 33.4 | 33.6 | 34.6 | 35.5 | Call/Sub. Gain | 12.7 |
| 280.8 | 320.3 | 391.6 | 448.4 | 518.2 | 578.9 | 621.8 | CAGR | 288.0% |
| 3.0% | 14.1% | 22.6% | 10.9% | 10.9% | 11.1% | 10.6% | | |
| 1.7% | 1.8% | 2.1% | 2.3% | 2.5% | 2.7% | 2.9% | Share Gain | 1.5% |
| (0.0%) | 0.1% | 0.3% | 0.2% | 0.3% | 0.2% | 0.3% | Net Share Gain | 9.0 |
| 27.0 | 27.3 | 29.4 | 29.8 | 31.1 | 31.2 | 31.8 | Call/Sub. Gain | 9.0 |
| 16,475.6 | 17,323.8 | 18,584.0 | 19,840.9 | 20,511.2 | 21,485.6 | 23,498.1 | CAGR | 52.2% |
| 3.1% | 5.1% | 7.3% | 5.8% | 4.4% | 4.7% | 9.4% | | |
| 30.7 | 32.0 | 33.5 | 34.6 | 35.3 | 38.0 | 33.1 | Call/Sub. Gain | 10.7 |

FIG. 25B

BASE SUBSCRIBER PROFILING
Actual raw data

| Date | Time | Area code | User ID | Cell site | Carrier | City | Type |
|---|---|---|---|---|---|---|---|
| 2/1/1999 | 12:00:00 | 415 | 2719321 | 33 | Carrier B | San Francisco | TC Assignment |
| 2/1/1999 | 12:00:00 | 415 | 3201813 | 33 | Carrier A | San Francisco | Registration |
| 2/1/1999 | 12:00:00 | 415 | 8043621 | 33 | Carrier B | San Francisco | Registration |
| 2/1/1999 | 12:00:01 | 408 | 6322327 | 33 | Carrier A | San Francisco | TC Assignment |
| 2/1/1999 | 12:00:01 | 650 | 3290201 | 33 | Carrier A | San Francisco | Page |
| 2/1/1999 | 12:00:01 | 213 | 4929087 | 33 | Carrier A | San Francisco | Page |
| 2/1/1999 | 12:00:01 | 650 | 5105341 | 33 | Carrier B | San Francisco | Page |
| 2/1/1999 | 12:00:02 | 650 | 8917483 | 33 | Carrier B | San Francisco | Page |
| 2/1/1999 | 12:00:02 | 510 | 5312381 | 33 | Carrier A | San Francisco | TC Assignment |
| 2/1/1999 | 12:00:02 | 510 | 4075791 | 33 | Carrier A | San Francisco | TC Assignment |
| 2/1/1999 | 12:00:02 | 925 | 6022625 | 33 | Carrier B | San Francisco | Page |
| 2/1/1999 | 12:00:03 | 925 | 7202077 | 33 | Carrier A | San Francisco | Page |
| 2/1/1999 | 12:00:03 | 925 | 4799759 | 33 | Carrier B | San Francisco | Page |
| 2/1/1999 | 12:00:03 | 917 | 8393984 | 33 | Carrier B | San Francisco | Registration |
| 2/1/1999 | 12:00:03 | 408 | 3216877 | 33 | Carrier B | San Francisco | Registration |
| 2/1/1999 | 12:00:04 | 415 | 6912099 | 33 | Carrier A | San Francisco | TC Assignment |
| 2/1/1999 | 12:00:04 | 415 | 8839323 | 33 | Carrier A | San Francisco | Page |
| 2/1/1999 | 12:00:04 | 415 | 9719867 | 33 | Carrier B | San Francisco | Registration |
| 2/1/1999 | 12:00:04 | 408 | 5318627 | 33 | Carrier B | San Francisco | Registration |
| 2/1/1999 | 12:00:05 | 650 | 7203431 | 33 | Carrier A | San Francisco | Page |
| 2/1/1999 | 12:00:05 | 650 | 1099979 | 33 | Carrier B | San Francisco | Registration |
| 2/1/1999 | 12:00:05 | 650 | 8160867 | 33 | Carrier A | San Francisco | TC Assignment |
| 2/1/1999 | 12:00:06 | 510 | 3086351 | 33 | Carrier B | San Francisco | Page |
| 2/1/1999 | 12:00:06 | 510 | 4792793 | 33 | Carrier A | San Francisco | Registration |
| 2/1/1999 | 12:00:06 | 925 | 9837734 | 33 | Carrier A | San Francisco | Registration |
| 2/1/1999 | 12:00:06 | 925 | 3086351 | 33 | Carrier B | San Francisco | Page |
| 2/1/1999 | 12:00:07 | 925 | 4946649 | 33 | Carrier A | San Francisco | Registration |
| 2/1/1999 | 12:00:07 | 206 | 8473934 | 33 | Carrier A | San Francisco | TC Assignment |
| 2/1/1999 | 12:00:07 | 408 | 3081099 | 33 | Carrier A | San Francisco | TC Assignment |
| 2/1/1999 | 12:00:07 | 415 | 7070091 | 33 | Carrier B | San Francisco | Page |
| 2/1/1999 | 12:00:08 | 415 | 9718063 | 33 | Carrier B | San Francisco | Registration |
| 2/1/1999 | 12:00:08 | 415 | 9157921 | 33 | Carrier A | San Francisco | Registration |
| 2/1/1999 | 12:00:08 | 408 | 3260183 | 33 | Carrier B | San Francisco | Page |
| 2/1/1999 | 12:00:08 | 650 | 9727755 | 33 | Carrier A | San Francisco | Registration |
| 2/1/1999 | 12:00:09 | 650 | 3165225 | 33 | Carrier B | San Francisco | TC Assignment |
| 2/1/1999 | 12:00:09 | 650 | 7600203 | 33 | Carrier A | San Francisco | Page |
| 2/1/1999 | 12:00:09 | 510 | 2719321 | 33 | Carrier A | San Francisco | Registration |
| 2/1/1999 | 12:00:09 | 510 | 4140377 | 33 | Carrier B | San Francisco | Registration |
| 2/1/1999 | 12:00:10 | 925 | 8289139 | 33 | Carrier A | San Francisco | Page |
| 2/1/1999 | 12:00:10 | 925 | 8722863 | 33 | Carrier B | San Francisco | Registration |
| 2/1/1999 | 12:00:10 | 925 | 5312381 | 33 | Carrier A | San Francisco | TC Assignment |
| 2/1/1999 | 12:00:10 | 408 | 4075791 | 33 | Carrier B | San Francisco | Page |
| 2/1/1999 | 12:00:11 | 415 | 4651181 | 33 | Carrier B | San Francisco | Registration |
| 2/1/1999 | 12:00:11 | 415 | 7202077 | 33 | Carrier B | San Francisco | Registration |
| 2/1/1999 | 12:00:11 | 415 | 4995677 | 33 | Carrier A | San Francisco | Page |
| 2/1/1999 | 12:00:11 | 408 | 5048157 | 33 | Carrier A | San Francisco | Registration |
| 2/1/1999 | 12:00:12 | 650 | 4720249 | 33 | Carrier B | San Francisco | Registration |

Thousands of records, but abreviated for space

| Date | Time | Area code | User ID | Cell site | Carrier | City | Type |
|---|---|---|---|---|---|---|---|
| 2/28/1999 | 11:59:50 | 916 | 9485023 | 33 | Carrier A | San Francisco | TC Assignment |
| 2/28/1999 | 11:59:51 | 650 | 1099979 | 33 | Carrier B | San Francisco | Registration |
| 2/28/1999 | 11:59:51 | 650 | 2086803 | 33 | Carrier B | San Francisco | Page |
| 2/28/1999 | 11:59:51 | 510 | 4072269 | 33 | Carrier B | San Francisco | Registration |
| 2/28/1999 | 11:59:52 | 510 | 9719435 | 33 | Carrier B | San Francisco | TC Assignment |
| 2/28/1999 | 11:59:52 | 925 | 5318223 | 33 | Carrier B | San Francisco | Page |
| 2/28/1999 | 11:59:52 | 925 | 3972083 | 33 | Carrier B | San Francisco | Registration |
| 2/28/1999 | 11:59:52 | 925 | 8372834 | 33 | Carrier B | San Francisco | Registration |
| 2/28/1999 | 11:59:53 | 408 | 7070091 | 33 | Carrier A | San Francisco | Page |
| 2/28/1999 | 11:59:53 | 415 | 7203431 | 33 | Carrier B | San Francisco | Registration |
| 2/28/1999 | 11:59:53 | 415 | 9718063 | 33 | Carrier A | San Francisco | TC Assignment |
| 2/28/1999 | 11:59:53 | 415 | 9080547 | 33 | Carrier B | San Francisco | Page |
| 2/28/1999 | 11:59:54 | 408 | 9727755 | 33 | Carrier A | San Francisco | Registration |
| 2/28/1999 | 11:59:54 | 650 | 4140377 | 33 | Carrier B | San Francisco | Registration |
| 2/28/1999 | 11:59:54 | 650 | 8282141 | 33 | Carrier B | San Francisco | Page |
| 2/28/1999 | 11:59:54 | 650 | 8722863 | 33 | Carrier B | San Francisco | Registration |
| 2/28/1999 | 11:59:55 | 510 | 6728701 | 33 | Carrier A | San Francisco | TC Assignment |
| 2/28/1999 | 11:59:55 | 510 | 3283687 | 33 | Carrier B | San Francisco | Page |
| 2/28/1999 | 11:59:55 | 925 | 9120421 | 33 | Carrier B | San Francisco | Registration |
| 2/28/1999 | 11:59:55 | 214 | 8495065 | 33 | Carrier B | San Francisco | Page |
| 2/28/1999 | 11:59:56 | 925 | 4074175 | 33 | Carrier B | San Francisco | Registration |
| 2/28/1999 | 11:59:56 | 925 | 2649681 | 33 | Carrier B | San Francisco | Page |
| 2/28/1999 | 11:59:56 | 408 | 4949717 | 33 | Carrier B | San Francisco | Registration |
| 2/28/1999 | 11:59:56 | 415 | 7220981 | 33 | Carrier B | San Francisco | TC Assignment |
| 2/28/1999 | 11:59:57 | 415 | 4720249 | 33 | Carrier B | San Francisco | Page |
| 2/28/1999 | 11:59:57 | 415 | 2719321 | 33 | Carrier B | San Francisco | Registration |
| 2/28/1999 | 11:59:57 | 408 | 9140825 | 33 | Carrier A | San Francisco | Registration |
| 2/28/1999 | 11:59:57 | 650 | 4659877 | 33 | Carrier B | San Francisco | Page |
| 2/28/1999 | 11:59:58 | 412 | 3458569 | 33 | Carrier B | San Francisco | Registration |
| 2/28/1999 | 11:59:58 | 650 | 8040589 | 33 | Carrier A | San Francisco | Registration |
| 2/28/1999 | 11:59:58 | 650 | 4075813 | 33 | Carrier B | San Francisco | Page |
| 2/28/1999 | 11:59:59 | 510 | 8927489 | 33 | Carrier A | San Francisco | Page |
| 2/28/1999 | 11:59:59 | 510 | 9068217 | 33 | Carrier A | San Francisco | Page |
| 2/28/1999 | 11:59:59 | 925 | 5108465 | 33 | Carrier B | San Francisco | Page |
| 2/28/1999 | 11:59:59 | 925 | 7202099 | 33 | Carrier B | San Francisco | Page |
| 3/1/1999 | 12:00:00 | 925 | 8134855 | 33 | Carrier B | San Francisco | Page |
| 3/1/1999 | 12:00:00 | 408 | 5075719 | 33 | Carrier A | San Francisco | Page |

FIG. 26

BASE SUBSCRIBER PROFILING
SORTED DATA TO COUNT MEASURED SUBS FOR ACTUAL PERIOD

Measured subs

| Area code | User ID | Carrier | Number of TC Assignments |
|---|---|---|---|
| 408 | 2459872 | Carrier B | 186 |
| 408 | 3216875 | Carrier B | 0 |
| 408 | 3260181 | Carrier B | 4 |
| 408 | 4075789 | Carrier B | 28 |
| 408 | 4949715 | Carrier B | 18 |
| 408 | 5318625 | Carrier B | 15 |
| 408 | 5598825 | Carrier B | 0 |
| 408 | 6729342 | Carrier B | 65 |
| 408 | 7070089 | Carrier B | 82 |
| 408 | 9263089 | Carrier B | 4 |
| 415 | 2719319 | Carrier B | 38 |
| 415 | 3954234 | Carrier B | 72 |
| 415 | 4651179 | Carrier B | 2 |
| 415 | 4720247 | Carrier B | 24 |
| 415 | 7070089 | Carrier B | 74 |
| 415 | 7202075 | Carrier B | 17 |
| 415 | 7203429 | Carrier B | 134 |
| 415 | 7220979 | Carrier B | 69 |
| 415 | 8043619 | Carrier B | 102 |
| 415 | 9080545 | Carrier B | 65 |
| 415 | 9718061 | Carrier B | 110 |
| 415 | 9719865 | Carrier B | 88 |
| 510 | 3086349 | Carrier B | 4 |
| 510 | 3263685 | Carrier B | 68 |
| 510 | 4072267 | Carrier B | 10 |
| 510 | 4140375 | Carrier B | 50 |
| 510 | 4759234 | Carrier B | 18 |
| 510 | 5063474 | Carrier B | 63 |
| 510 | 5763484 | Carrier B | 38 |
| 510 | 5833453 | Carrier B | 73 |
| 510 | 7070089 | Carrier B | 28 |
| 510 | 8374527 | Carrier B | 9 |
| 510 | 9719433 | Carrier B | 88 |
| 650 | 2086801 | Carrier B | 0 |
| 650 | 3086349 | Carrier B | 0 |
| 650 | 3165223 | Carrier B | 5 |
| 650 | 4140375 | Carrier B | 20 |
| 650 | 4720247 | Carrier B | 33 |
| 650 | 5105339 | Carrier B | 82 |
| 650 | 6739423 | Carrier B | 1 |
| 650 | 7923734 | Carrier B | 10 |
| 650 | 8137454 | Carrier B | 65 |
| 650 | 8282139 | Carrier B | 160 |
| 650 | 8722861 | Carrier B | 61 |
| 650 | 8917481 | Carrier B | 166 |
| 925 | 2649679 | Carrier B | 20 |
| 925 | 3086349 | Carrier B | 26 |
| 925 | 3260181 | Carrier B | 92 |
| 925 | 3972081 | Carrier B | 42 |
| 925 | 4074173 | Carrier B | 0 |
| 925 | 4799757 | Carrier B | 0 |
| 925 | 5318221 | Carrier B | 10 |
| 925 | 6022623 | Carrier B | 0 |
| 925 | 8372832 | Carrier B | 62 |
| 925 | 8722861 | Carrier B | 136 |
| 925 | 9120419 | Carrier B | 60 |
| Measured Carrier B | | 56 | 2717 |

| | | | |
|---|---|---|---|
| 408 | 2104583 | Carrier A | 2 |
| 408 | 2568344 | Carrier A | 84 |
| 408 | 3023844 | Carrier A | 36 |
| 408 | 3045823 | Carrier A | 26 |
| 408 | 3081097 | Carrier A | 70 |
| 408 | 3435863 | Carrier A | 2 |
| 408 | 4792791 | Carrier A | 12 |
| 408 | 5048155 | Carrier A | 0 |
| 408 | 5680234 | Carrier A | 168 |
| 408 | 6322325 | Carrier A | 4 |
| 408 | 6934212 | Carrier A | 130 |
| 408 | 7070089 | Carrier A | 11 |
| 408 | 9727753 | Carrier A | 108 |
| 415 | 2834055 | Carrier A | 24 |
| 415 | 3201811 | Carrier A | 24 |
| 415 | 4995675 | Carrier A | 0 |
| 415 | 6912097 | Carrier A | 68 |
| 415 | 8839321 | Carrier A | 3 |
| 415 | 9157919 | Carrier A | 110 |
| 415 | 9718061 | Carrier A | 38 |
| 510 | 2719319 | Carrier A | 2 |
| 510 | 2958345 | Carrier A | 1 |
| 510 | 3081097 | Carrier A | 2 |
| 510 | 4075789 | Carrier A | 30 |
| 510 | 4792791 | Carrier A | 2 |
| 510 | 5128340 | Carrier A | 5 |
| 510 | 5312379 | Carrier A | 26 |
| 510 | 6728699 | Carrier A | 5 |
| 650 | 3290199 | Carrier A | 12 |
| 650 | 4946647 | Carrier A | 2 |
| 650 | 5869302 | Carrier A | 54 |
| 650 | 7203429 | Carrier A | 32 |
| 650 | 7600201 | Carrier A | 76 |
| 650 | 8160865 | Carrier A | 49 |
| 650 | 9727753 | Carrier A | 176 |
| 650 | 9778330 | Carrier A | 81 |
| 650 | 9837732 | Carrier A | 62 |
| 925 | 4946647 | Carrier A | 8 |
| 925 | 5312379 | Carrier A | 0 |
| 925 | 6574932 | Carrier A | 4 |
| 925 | 7202075 | Carrier A | 118 |
| 925 | 8289137 | Carrier A | 46 |
| 925 | 9157919 | Carrier A | 24 |
| 925 | 9837732 | Carrier A | 26 |
| Measured Carrier A | | 44 | 1763 |

FIG. 27

BASE SUBSCRIBER PROFILING
SORTED DATA TO COUNT MEASURED SUBS FOR ACTUAL PERIOD

Measured subs

| Sort # | Area code | User ID | Carrier | Number of TC Assignments | Carrier A count | Carrier B count |
|---|---|---|---|---|---|---|
| 1 | 408 | 2459872 | Carrier A | 186 | 1 | 0 |
| 2 | 650 | 9727753 | Carrier B | 176 | 0 | 1 |
| 3 | 408 | 5680234 | Carrier B | 168 | 0 | 1 |
| 4 | 650 | 8917481 | Carrier A | 166 | 1 | 0 |
| 5 | 650 | 8282139 | Carrier A | 160 | 1 | 0 |
| 6 | 925 | 8722861 | Carrier A | 136 | 1 | 0 |
| 7 | 415 | 7203429 | Carrier A | 134 | 1 | 0 |
| 8 | 408 | 6934212 | Carrier B | 130 | 0 | 1 |
| 9 | 925 | 7202075 | Carrier B | 118 | 0 | 1 |
| 10 | 415 | 9718061 | Carrier A | 110 | 1 | 0 |
| 11 | 415 | 9157919 | Carrier B | 110 | 0 | 1 |
| 12 | 408 | 9727753 | Carrier B | 108 | 0 | 1 |
| 13 | 415 | 8043619 | Carrier A | 102 | 1 | 0 |
| 14 | 925 | 3260181 | Carrier A | 92 | 1 | 0 |
| 15 | 415 | 9719865 | Carrier A | 88 | 1 | 0 |
| 16 | 510 | 9719433 | Carrier A | 88 | 1 | 0 |
| 17 | 408 | 6729342 | Carrier A | 85 | 1 | 0 |
| 18 | 408 | 2568344 | Carrier B | 84 | 0 | 1 |
| 19 | 408 | 7070089 | Carrier A | 82 | 1 | 0 |
| 20 | 650 | 5105339 | Carrier A | 82 | 1 | 0 |
| 21 | 650 | 9778330 | Carrier B | 81 | 0 | 1 |
| 22 | 650 | 7600201 | Carrier B | 76 | 0 | 1 |
| 23 | 415 | 7070089 | Carrier A | 74 | 1 | 0 |
| 24 | 510 | 5833453 | Carrier A | 73 | 1 | 0 |
| 25 | 415 | 3954234 | Carrier A | 72 | 1 | 0 |
| 26 | 408 | 3081097 | Carrier B | 70 | 0 | 1 |
| 27 | 415 | 7220979 | Carrier A | 69 | 1 | 0 |
| 28 | 510 | 3283685 | Carrier A | 68 | 1 | 0 |
| 29 | 415 | 6912097 | Carrier B | 68 | 0 | 1 |
| 30 | 415 | 9080545 | Carrier A | 65 | 1 | 0 |
| 31 | 650 | 8137454 | Carrier A | 65 | 1 | 0 |
| 32 | 510 | 5083474 | Carrier A | 63 | 1 | 0 |
| 33 | 925 | 8372832 | Carrier A | 62 | 1 | 0 |
| 34 | 650 | 9837732 | Carrier B | 62 | 0 | 1 |
| 35 | 650 | 8722861 | Carrier A | 61 | 1 | 0 |
| 36 | 925 | 9120419 | Carrier A | 60 | 1 | 0 |
| 37 | 650 | 5869302 | Carrier B | 54 | 0 | 1 |
| 38 | 510 | 4140375 | Carrier A | 50 | 1 | 0 |
| 39 | 650 | 8160865 | Carrier B | 49 | 0 | 1 |
| 40 | 925 | 8289137 | Carrier B | 46 | 0 | 1 |
| 41 | 925 | 3972081 | Carrier A | 42 | 1 | 0 |
| 42 | 415 | 2719319 | Carrier A | 38 | 1 | 0 |
| 43 | 510 | 5763484 | Carrier A | 38 | 1 | 0 |
| 44 | 415 | 9718061 | Carrier B | 38 | 0 | 1 |
| 45 | 408 | 3023844 | Carrier B | 36 | 0 | 1 |
| 46 | 650 | 4720247 | Carrier A | 33 | 1 | 0 |
| 47 | 650 | 7203429 | Carrier B | 32 | 0 | 1 |
| 48 | 510 | 4075789 | Carrier B | 30 | 0 | 1 |
| 49 | 408 | 4075789 | Carrier A | 28 | 1 | 0 |
| 50 | 510 | 7070089 | Carrier A | 28 | 1 | 0 |
| 51 | 925 | 3086349 | Carrier A | 26 | 1 | 0 |
| 52 | 408 | 3045823 | Carrier B | 26 | 0 | 1 |
| 53 | 510 | 5312379 | Carrier B | 26 | 0 | 1 |
| 54 | 925 | 9837732 | Carrier B | 26 | 0 | 1 |
| 55 | 415 | 4720247 | Carrier A | 24 | 1 | 0 |
| 56 | 415 | 2834055 | Carrier B | 24 | 0 | 1 |
| 57 | 415 | 3201811 | Carrier B | 24 | 0 | 1 |
| 58 | 925 | 9157919 | Carrier B | 24 | 0 | 1 |
| 59 | 650 | 4140375 | Carrier A | 20 | 1 | 0 |
| 60 | 925 | 2649679 | Carrier A | 20 | 1 | 0 |
| 61 | 408 | 4949715 | Carrier A | 18 | 1 | 0 |
| 62 | 510 | 4759234 | Carrier A | 18 | 1 | 0 |
| 63 | 415 | 7202075 | Carrier A | 17 | 1 | 0 |
| 64 | 408 | 5318625 | Carrier A | 15 | 1 | 0 |
| 65 | 408 | 4792791 | Carrier B | 12 | 0 | 1 |
| 66 | 650 | 3290199 | Carrier B | 12 | 0 | 1 |
| 67 | 408 | 7070089 | Carrier B | 11 | 0 | 1 |
| 68 | 510 | 4072267 | Carrier A | 10 | 1 | 0 |
| 69 | 650 | 7923734 | Carrier A | 10 | 1 | 0 |
| 70 | 925 | 5318221 | Carrier A | 10 | 1 | 0 |
| 71 | 510 | 8374527 | Carrier A | 9 | 1 | 0 |
| 72 | 925 | 4946647 | Carrier B | 8 | 0 | 1 |
| 73 | 650 | 3165223 | Carrier A | 5 | 1 | 0 |
| 74 | 510 | 5128340 | Carrier B | 5 | 0 | 1 |
| 75 | 510 | 6728699 | Carrier B | 5 | 0 | 1 |
| 76 | 408 | 3260181 | Carrier A | 4 | 1 | 0 |
| 77 | 408 | 9263089 | Carrier A | 4 | 1 | 0 |
| 78 | 510 | 3086349 | Carrier A | 4 | 1 | 0 |
| 79 | 408 | 6322325 | Carrier B | 4 | 0 | 1 |
| 80 | 925 | 6574932 | Carrier B | 4 | 0 | 1 |
| 81 | 415 | 8839321 | Carrier B | 3 | 0 | 1 |
| 82 | 415 | 4651179 | Carrier A | 2 | 1 | 0 |
| 83 | 408 | 2104583 | Carrier B | 2 | 0 | 1 |
| 84 | 408 | 3435853 | Carrier B | 2 | 0 | 1 |
| 85 | 510 | 2719319 | Carrier B | 2 | 0 | 1 |
| 86 | 510 | 3081097 | Carrier B | 2 | 0 | 1 |
| 87 | 510 | 4792791 | Carrier B | 2 | 0 | 1 |
| 88 | 650 | 4946647 | Carrier B | 2 | 0 | 1 |
| 89 | 650 | 6739423 | Carrier A | 1 | 1 | 0 |
| 90 | 510 | 2958345 | Carrier B | 1 | 0 | 1 |
| 91 | 408 | 3216875 | Carrier A | 0 | 1 | 0 |
| 92 | 408 | 5598825 | Carrier A | 0 | 1 | 0 |
| 93 | 650 | 2086801 | Carrier A | 0 | 1 | 0 |
| 94 | 650 | 3086349 | Carrier A | 0 | 1 | 0 |
| 95 | 925 | 4074173 | Carrier A | 0 | 1 | 0 |
| 96 | 925 | 4799757 | Carrier A | 0 | 1 | 0 |
| 97 | 925 | 6022623 | Carrier A | 0 | 1 | 0 |
| 98 | 408 | 5048155 | Carrier B | 0 | 0 | 1 |
| 99 | 415 | 4995675 | Carrier B | 0 | 0 | 1 |
| 100 | 925 | 5312379 | Carrier B | 0 | 0 | 1 |
| | | | | | 56 | 44 |

FIG. 28

BASE SUBSCRIBER PROFILING
SORTED DATA TO COUNT MEASURED SUBS FOR ACTUAL PERIOD

Measured subs

| Sort # | Area code | User ID | Carrier | Number of TC Assignments | Carrier A count | Carrier B count |
|---|---|---|---|---|---|---|
| First Quartile | | | | | | |
| 1 | 408 | 2459872 | Carrier A | 186 | 1 | 0 |
| 2 | 650 | 9727753 | Carrier B | 176 | 0 | 1 |
| 3 | 408 | 5680234 | Carrier B | 168 | 0 | 1 |
| 4 | 650 | 8917481 | Carrier A | 166 | 1 | 0 |
| 5 | 650 | 8282139 | Carrier A | 160 | 1 | 0 |
| 6 | 925 | 8722861 | Carrier A | 136 | 1 | 0 |
| 7 | 415 | 7203429 | Carrier A | 134 | 1 | 0 |
| 8 | 408 | 6934212 | Carrier B | 130 | 0 | 1 |
| 9 | 925 | 7202075 | Carrier B | 116 | 0 | 1 |
| 10 | 415 | 9718061 | Carrier A | 110 | 1 | 0 |
| 11 | 415 | 9157919 | Carrier B | 110 | 0 | 1 |
| 12 | 408 | 9727753 | Carrier B | 108 | 0 | 1 |
| 13 | 415 | 8043619 | Carrier A | 102 | 1 | 0 |
| 14 | 925 | 3260181 | Carrier A | 92 | 1 | 0 |
| 15 | 415 | 9719865 | Carrier A | 88 | 1 | 0 |
| 16 | 510 | 9719433 | Carrier A | 88 | 1 | 0 |
| 17 | 408 | 6729342 | Carrier A | 85 | 1 | 0 |
| 18 | 408 | 2568344 | Carrier B | 84 | 0 | 1 |
| 19 | 408 | 7070089 | Carrier A | 82 | 1 | 0 |
| 20 | 650 | 5105339 | Carrier A | 82 | 1 | 0 |
| 21 | 650 | 9778330 | Carrier B | 81 | 0 | 1 |
| 22 | 650 | 7600201 | Carrier B | 76 | 0 | 1 |
| 23 | 415 | 7070089 | Carrier A | 74 | 1 | 0 |
| 24 | 510 | 5833453 | Carrier A | 73 | 1 | 0 |
| 25 | 415 | 3954234 | Carrier A | 72 | 1 | 0 |
| | | | | First quartile totals | 16 | 9 |
| Second Quartile | | | | | | |
| 26 | 408 | 3081097 | Carrier B | 70 | 0 | 1 |
| 27 | 415 | 7220979 | Carrier A | 69 | 1 | 0 |
| 28 | 510 | 3283685 | Carrier A | 68 | 1 | 0 |
| 29 | 415 | 6912097 | Carrier B | 68 | 0 | 1 |
| 30 | 415 | 9080545 | Carrier A | 65 | 1 | 0 |
| 31 | 650 | 8137454 | Carrier A | 65 | 1 | 0 |
| 32 | 510 | 5083474 | Carrier A | 63 | 1 | 0 |
| 33 | 925 | 8372832 | Carrier A | 62 | 1 | 0 |
| 34 | 650 | 9837732 | Carrier B | 62 | 0 | 1 |
| 35 | 650 | 8722861 | Carrier A | 61 | 1 | 0 |
| 36 | 925 | 9120419 | Carrier A | 60 | 1 | 0 |
| 37 | 650 | 5869302 | Carrier B | 54 | 0 | 1 |
| 38 | 510 | 4140375 | Carrier A | 50 | 1 | 0 |
| 39 | 650 | 8160865 | Carrier B | 49 | 0 | 1 |
| 40 | 925 | 8289137 | Carrier B | 46 | 0 | 1 |
| 41 | 925 | 3972081 | Carrier A | 42 | 1 | 0 |
| 42 | 415 | 2719319 | Carrier A | 38 | 1 | 0 |
| 43 | 510 | 5763484 | Carrier A | 38 | 1 | 0 |
| 44 | 415 | 9718061 | Carrier B | 38 | 0 | 1 |
| 45 | 408 | 3023844 | Carrier B | 36 | 0 | 1 |
| 46 | 650 | 4720247 | Carrier A | 33 | 1 | 0 |
| 47 | 650 | 7203429 | Carrier B | 32 | 0 | 1 |
| 48 | 510 | 4075789 | Carrier B | 30 | 0 | 1 |
| 49 | 408 | 4075789 | Carrier A | 28 | 1 | 0 |
| 50 | 510 | 7070089 | Carrier A | 28 | 1 | 0 |
| | | | | Second quartile totals | 15 | 10 |
| Third Quartile | | | | | | |
| 51 | 925 | 3086349 | Carrier A | 26 | 1 | 0 |
| 52 | 408 | 3045823 | Carrier B | 26 | 0 | 1 |
| 53 | 510 | 5312379 | Carrier B | 26 | 0 | 1 |
| 54 | 925 | 9837732 | Carrier B | 26 | 0 | 1 |
| 55 | 415 | 4720247 | Carrier A | 24 | 1 | 0 |
| 56 | 415 | 2834055 | Carrier B | 24 | 0 | 1 |
| 57 | 415 | 3201811 | Carrier B | 24 | 0 | 1 |
| 58 | 925 | 9157919 | Carrier B | 24 | 0 | 1 |
| 59 | 650 | 4140375 | Carrier A | 20 | 1 | 0 |
| 60 | 925 | 2649679 | Carrier A | 20 | 1 | 0 |
| 61 | 408 | 4949715 | Carrier A | 18 | 1 | 0 |
| 62 | 510 | 4759234 | Carrier A | 18 | 1 | 0 |
| 63 | 415 | 7202075 | Carrier A | 17 | 1 | 0 |
| 64 | 408 | 5318625 | Carrier A | 15 | 1 | 0 |
| 65 | 408 | 4792791 | Carrier B | 12 | 0 | 1 |
| 66 | 650 | 3290199 | Carrier B | 12 | 0 | 1 |
| 67 | 408 | 7070089 | Carrier B | 11 | 0 | 1 |
| 68 | 510 | 4072267 | Carrier A | 10 | 1 | 0 |
| 69 | 650 | 7923734 | Carrier A | 10 | 1 | 0 |
| 70 | 925 | 5318221 | Carrier A | 10 | 1 | 0 |
| 71 | 510 | 8374527 | Carrier A | 9 | 1 | 0 |
| 72 | 925 | 4946647 | Carrier B | 8 | 0 | 1 |
| 73 | 650 | 3165223 | Carrier A | 5 | 1 | 0 |
| 74 | 510 | 5128340 | Carrier B | 5 | 0 | 1 |
| 75 | 510 | 6728699 | Carrier B | 5 | 0 | 1 |
| | | | | Third quartile totals | 13 | 12 |
| Fourth Quartile | | | | | | |
| 76 | 408 | 3260181 | Carrier A | 4 | 1 | 0 |
| 77 | 408 | 9263089 | Carrier A | 4 | 1 | 0 |
| 78 | 510 | 3086349 | Carrier A | 4 | 1 | 0 |
| 79 | 408 | 6322325 | Carrier B | 4 | 0 | 1 |
| 80 | 925 | 6574932 | Carrier B | 4 | 0 | 1 |
| 81 | 415 | 8839321 | Carrier B | 3 | 0 | 1 |
| 82 | 415 | 4651179 | Carrier A | 2 | 1 | 0 |
| 83 | 408 | 2104583 | Carrier B | 2 | 0 | 1 |
| 84 | 408 | 3435863 | Carrier B | 2 | 0 | 1 |
| 85 | 510 | 2719319 | Carrier B | 2 | 0 | 1 |
| 86 | 510 | 3081097 | Carrier B | 2 | 0 | 1 |
| 87 | 510 | 4792791 | Carrier B | 2 | 0 | 1 |
| 88 | 650 | 4946647 | Carrier B | 2 | 0 | 1 |
| 89 | 650 | 6739423 | Carrier A | 1 | 1 | 0 |
| 90 | 510 | 2958345 | Carrier B | 1 | 0 | 1 |
| 91 | 408 | 3216875 | Carrier A | 0 | 1 | 0 |
| 92 | 408 | 6598825 | Carrier A | 0 | 1 | 0 |
| 93 | 650 | 2086801 | Carrier A | 0 | 1 | 0 |
| 94 | 650 | 3086349 | Carrier A | 0 | 1 | 0 |
| 95 | 925 | 4074173 | Carrier A | 0 | 1 | 0 |
| 96 | 925 | 4799757 | Carrier A | 0 | 1 | 0 |
| 97 | 925 | 6022623 | Carrier A | 0 | 1 | 0 |
| 98 | 408 | 5046155 | Carrier B | 0 | 0 | 1 |
| 99 | 415 | 4995875 | Carrier B | 0 | 0 | 1 |
| 100 | 925 | 6312379 | Carrier B | 0 | 0 | 1 |
| | | | | Fourth quartile totals | 12 | 13 |

FIG. 29

BASE SUBSCRIBER PROFILING
ALGORITHM FOR PROFILING BASE SUBSCRIBERS

|  | Carrier A | Carrier B |
|---|---|---|
| First quartile | 16 | 9 |
| Second quartile | 15 | 10 |
| Third quartile | 13 | 12 |
| Fourth quartile | 12 | 13 |

Calculate the market share of each quartile using the following formulas

First quartile
- Carrier A =16/(16+9) 64.0%
- Carrier B =9/(16+9) 36.0%

Second quartile
- Carrier A =15/(15+10) 60.0%
- Carrier B =10/(15+10) 40.0%

Third quartile
- Carrier A =13/(13+12) 52.0%
- Carrier B =12/(13+12) 48.0%

Fourth quartile
- Carrier A =12/(13+12) 48.0%
- Carrier B =13/(13+12) 52.0%

FIG. 30

ADDED SUBSCRIBER PROFILING
Actual raw data period #1

| Date | Time | Area code | User ID | Cell site | Carrier | City | Type |
|---|---|---|---|---|---|---|---|
| 1/1/1999 | 12:00:00 | 650 | 3290201 | 33 | Carrier B | San Francisco | Page |
| 1/1/1999 | 12:00:00 | 650 | 8917483 | 33 | Carrier A | San Francisco | Page |
| 1/1/1999 | 12:00:00 | 510 | 5312381 | 33 | Carrier B | San Francisco | Page |
| 1/1/1999 | 12:00:01 | 415 | 2719321 | 33 | Carrier A | San Francisco | Registration |
| 1/1/1999 | 12:00:01 | 415 | 3201813 | 33 | Carrier A | San Francisco | Registration |
| 1/1/1999 | 12:00:01 | 415 | 8043621 | 33 | Carrier A | San Francisco | TC Assignment |
| 1/1/1999 | 12:00:01 | 408 | 6322327 | 33 | Carrier B | San Francisco | Page |
| 1/1/1999 | 12:00:02 | 925 | 7202077 | 33 | Carrier B | San Francisco | Page |
| 1/1/1999 | 12:00:02 | 213 | 4929087 | 33 | Carrier A | San Francisco | Page |
| 1/1/1999 | 12:00:02 | 650 | 5105341 | 33 | Carrier A | San Francisco | Page |
| 1/1/1999 | 12:00:02 | 650 | 4075813 | 33 | Carrier B | San Francisco | TC Assignment |
| 1/1/1999 | 12:00:03 | 510 | 8927489 | 33 | Carrier A | San Francisco | Registration |
| 1/1/1999 | 12:00:03 | 510 | 9088217 | 33 | Carrier B | San Francisco | Registration |
| 1/1/1999 | 12:00:03 | 925 | 5108465 | 33 | Carrier B | San Francisco | TC Assignment |
| 1/1/1999 | 12:00:03 | 925 | 7202099 | 33 | Carrier B | San Francisco | TC Assignment |
| 1/1/1999 | 12:00:04 | 925 | 8134855 | 33 | Carrier A | San Francisco | TC Assignment |
| 1/1/1999 | 12:00:04 | 510 | 3086351 | 33 | Carrier A | San Francisco | Page |
| 1/1/1999 | 12:00:04 | 510 | 4792793 | 33 | Carrier B | San Francisco | Registration |
| 1/1/1999 | 12:00:04 | 925 | 9837734 | 33 | Carrier B | San Francisco | Registration |
| 1/1/1999 | 12:00:05 | 925 | 3086351 | 33 | Carrier A | San Francisco | Page |
| 1/1/1999 | 12:00:05 | 925 | 4946649 | 33 | Carrier B | San Francisco | Registration |
| 1/1/1999 | 12:00:05 | 206 | 8473934 | 33 | Carrier A | San Francisco | TC Assignment |
| 1/1/1999 | 12:00:06 | 408 | 3081099 | 33 | Carrier B | San Francisco | Page |
| 1/1/1999 | 12:00:06 | 415 | 7070091 | 33 | Carrier A | San Francisco | Registration |
| 1/1/1999 | 12:00:06 | 415 | 9718063 | 33 | Carrier A | San Francisco | Registration |
| 1/1/1999 | 12:00:06 | 415 | 9157921 | 33 | Carrier B | San Francisco | Page |
| 1/1/1999 | 12:00:07 | 408 | 3260183 | 33 | Carrier A | San Francisco | Registration |
| 1/1/1999 | 12:00:07 | 408 | 5318627 | 33 | Carrier A | San Francisco | TC Assignment |
| 1/1/1999 | 12:00:07 | 650 | 7203431 | 33 | Carrier A | San Francisco | TC Assignment |
| 1/1/1999 | 12:00:07 | 650 | 1099979 | 33 | Carrier B | San Francisco | Page |
| 1/1/1999 | 12:00:08 | 650 | 8160867 | 33 | Carrier B | San Francisco | Registration |
| 1/1/1999 | 12:00:08 | 650 | 9727755 | 33 | Carrier A | San Francisco | Registration |
| 1/1/1999 | 12:00:08 | 650 | 3165225 | 33 | Carrier B | San Francisco | Page |
| 1/1/1999 | 12:00:08 | 650 | 7600203 | 33 | Carrier A | San Francisco | Registration |
| 1/1/1999 | 12:00:09 | 510 | 4075791 | 33 | Carrier B | San Francisco | TC Assignment |
| 1/1/1999 | 12:00:09 | 925 | 6022625 | 33 | Carrier A | San Francisco | Page |
| 1/1/1999 | 12:00:09 | 415 | 6912099 | 33 | Carrier A | San Francisco | Registration |
| 1/1/1999 | 12:00:09 | 925 | 4799759 | 33 | Carrier B | San Francisco | Registration |
| 1/1/1999 | 12:00:10 | 917 | 8393984 | 33 | Carrier A | San Francisco | Page |
| 1/1/1999 | 12:00:10 | 408 | 3216877 | 33 | Carrier B | San Francisco | Registration |
| 1/1/1999 | 12:00:10 | 925 | 8722863 | 33 | Carrier A | San Francisco | Registration |
| 1/1/1999 | 12:00:10 | 415 | 8839323 | 33 | Carrier B | San Francisco | Page |
| 1/1/1999 | 12:00:11 | 415 | 9719867 | 33 | Carrier B | San Francisco | Registration |
| 1/1/1999 | 12:00:11 | 510 | 2719321 | 33 | Carrier B | San Francisco | Registration |
| 1/1/1999 | 12:00:11 | 510 | 4140377 | 33 | Carrier A | San Francisco | Page |
| 1/1/1999 | 12:00:11 | 925 | 8289139 | 33 | Carrier A | San Francisco | Registration |
| 1/1/1999 | 12:00:12 | 510 | 4072269 | 33 | Carrier B | San Francisco | TC Assignment |

Thousands of records, but abreviated for space

| 1/31/1999 | 11:59:50 | 925 | 5312381 | 33 | Carrier A | San Francisco | Page |
|---|---|---|---|---|---|---|---|
| 1/31/1999 | 11:59:51 | 408 | 4075791 | 33 | Carrier B | San Francisco | Registration |
| 1/31/1999 | 11:59:51 | 415 | 4651181 | 33 | Carrier B | San Francisco | Registration |
| 1/31/1999 | 11:59:51 | 415 | 7202077 | 33 | Carrier B | San Francisco | Page |
| 1/31/1999 | 11:59:52 | 415 | 4995677 | 33 | Carrier B | San Francisco | Registration |
| 1/31/1999 | 11:59:52 | 408 | 5048157 | 33 | Carrier B | San Francisco | TC Assignment |
| 1/31/1999 | 11:59:52 | 650 | 4720249 | 33 | Carrier B | San Francisco | TC Assignment |
| 1/31/1999 | 11:59:52 | 916 | 9485023 | 33 | Carrier B | San Francisco | Registration |
| 1/31/1999 | 11:59:53 | 650 | 1099979 | 33 | Carrier A | San Francisco | Page |
| 1/31/1999 | 11:59:53 | 650 | 2086803 | 33 | Carrier B | San Francisco | Registration |
| 1/31/1999 | 11:59:53 | 415 | 2719321 | 33 | Carrier A | San Francisco | TC Assignment |
| 1/31/1999 | 11:59:53 | 408 | 9140825 | 33 | Carrier B | San Francisco | Page |
| 1/31/1999 | 11:59:54 | 650 | 4659877 | 33 | Carrier A | San Francisco | Registration |
| 1/31/1999 | 11:59:54 | 412 | 3458569 | 33 | Carrier B | San Francisco | Registration |
| 1/31/1999 | 11:59:54 | 650 | 8040589 | 33 | Carrier B | San Francisco | TC Assignment |
| 1/31/1999 | 11:59:54 | 408 | 9727755 | 33 | Carrier B | San Francisco | Page |
| 1/31/1999 | 11:59:55 | 650 | 4140377 | 33 | Carrier A | San Francisco | Registration |
| 1/31/1999 | 11:59:55 | 650 | 8282141 | 33 | Carrier B | San Francisco | Page |
| 1/31/1999 | 11:59:55 | 650 | 8722863 | 33 | Carrier B | San Francisco | Registration |
| 1/31/1999 | 11:59:55 | 510 | 6728701 | 33 | Carrier B | San Francisco | Page |
| 1/31/1999 | 11:59:56 | 925 | 8372834 | 33 | Carrier B | San Francisco | Registration |
| 1/31/1999 | 11:59:56 | 408 | 7070091 | 33 | Carrier B | San Francisco | Page |
| 1/31/1999 | 11:59:56 | 415 | 7203431 | 33 | Carrier B | San Francisco | Registration |
| 1/31/1999 | 11:59:56 | 415 | 9718063 | 33 | Carrier B | San Francisco | Page |
| 1/31/1999 | 11:59:57 | 415 | 9080547 | 33 | Carrier B | San Francisco | Registration |
| 1/31/1999 | 11:59:57 | 925 | 4074175 | 33 | Carrier B | San Francisco | TC Assignment |
| 1/31/1999 | 11:59:57 | 925 | 2649681 | 33 | Carrier A | San Francisco | Registration |
| 1/31/1999 | 11:59:57 | 408 | 4949717 | 33 | Carrier B | San Francisco | Page |
| 1/31/1999 | 11:59:58 | 415 | 7220981 | 33 | Carrier B | San Francisco | Registration |
| 1/31/1999 | 11:59:58 | 510 | 3283687 | 33 | Carrier A | San Francisco | TC Assignment |
| 1/31/1999 | 11:59:58 | 925 | 9120421 | 33 | Carrier B | San Francisco | Page |
| 1/31/1999 | 11:59:59 | 214 | 8495065 | 33 | Carrier A | San Francisco | Page |
| 1/31/1999 | 11:59:59 | 415 | 4720249 | 33 | Carrier A | San Francisco | Registration |
| 1/31/1999 | 11:59:59 | 925 | 5108465 | 33 | Carrier B | San Francisco | Page |
| 1/31/1999 | 11:59:59 | 925 | 7202099 | 33 | Carrier B | San Francisco | Page |
| 2/1/1999 | 12:00:00 | 925 | 8134855 | 33 | Carrier B | San Francisco | TC Assignment |
| 2/1/1999 | 12:00:00 | 408 | 5075719 | 33 | Carrier A | San Francisco | TC Assignment |

FIG. 31

ADDED SUBSCRIBER PROFILING
Actual raw data period #2

| Date | Time | Area code | User ID | Cell site | Carrier | City | Type |
|---|---|---|---|---|---|---|---|
| 2/1/1999 | 12:00:00 | 415 | 2719321 | 33 | Carrier B | San Francisco | TC Assignment |
| 2/1/1999 | 12:00:00 | 415 | 3201813 | 33 | Carrier A | San Francisco | Registration |
| 2/1/1999 | 12:00:00 | 415 | 8043621 | 33 | Carrier B | San Francisco | Registration |
| 2/1/1999 | 12:00:01 | 408 | 6322327 | 33 | Carrier A | San Francisco | TC Assignment |
| 2/1/1999 | 12:00:01 | 650 | 3290201 | 33 | Carrier A | San Francisco | Page |
| 2/1/1999 | 12:00:01 | 213 | 4929087 | 33 | Carrier A | San Francisco | Page |
| 2/1/1999 | 12:00:01 | 650 | 5105341 | 33 | Carrier B | San Francisco | Page |
| 2/1/1999 | 12:00:02 | 650 | 8917483 | 33 | Carrier B | San Francisco | Page |
| 2/1/1999 | 12:00:02 | 510 | 5312381 | 33 | Carrier B | San Francisco | TC Assignment |
| 2/1/1999 | 12:00:02 | 510 | 4075791 | 33 | Carrier A | San Francisco | TC Assignment |
| 2/1/1999 | 12:00:02 | 925 | 6022625 | 33 | Carrier B | San Francisco | Page |
| 2/1/1999 | 12:00:03 | 925 | 7202077 | 33 | Carrier A | San Francisco | Page |
| 2/1/1999 | 12:00:03 | 925 | 4799759 | 33 | Carrier B | San Francisco | Page |
| 2/1/1999 | 12:00:03 | 917 | 8393984 | 33 | Carrier B | San Francisco | Registration |
| 2/1/1999 | 12:00:03 | 408 | 3216877 | 33 | Carrier B | San Francisco | Registration |
| 2/1/1999 | 12:00:04 | 415 | 6912099 | 33 | Carrier A | San Francisco | TC Assignment |
| 2/1/1999 | 12:00:04 | 415 | 8839323 | 33 | Carrier A | San Francisco | Page |
| 2/1/1999 | 12:00:04 | 415 | 9719867 | 33 | Carrier B | San Francisco | Registration |
| 2/1/1999 | 12:00:04 | 408 | 5318627 | 33 | Carrier B | San Francisco | Registration |
| 2/1/1999 | 12:00:05 | 650 | 7203431 | 33 | Carrier A | San Francisco | Page |
| 2/1/1999 | 12:00:05 | 650 | 1099979 | 33 | Carrier B | San Francisco | Registration |
| 2/1/1999 | 12:00:05 | 650 | 8160867 | 33 | Carrier A | San Francisco | TC Assignment |
| 2/1/1999 | 12:00:06 | 510 | 3086351 | 33 | Carrier B | San Francisco | Page |
| 2/1/1999 | 12:00:06 | 510 | 4792793 | 33 | Carrier A | San Francisco | Registration |
| 2/1/1999 | 12:00:06 | 925 | 9837734 | 33 | Carrier A | San Francisco | Registration |
| 2/1/1999 | 12:00:06 | 925 | 3086351 | 33 | Carrier B | San Francisco | Page |
| 2/1/1999 | 12:00:07 | 925 | 4946649 | 33 | Carrier A | San Francisco | Registration |
| 2/1/1999 | 12:00:07 | 206 | 8473934 | 33 | Carrier A | San Francisco | TC Assignment |
| 2/1/1999 | 12:00:07 | 408 | 3081099 | 33 | Carrier A | San Francisco | TC Assignment |
| 2/1/1999 | 12:00:07 | 415 | 7070091 | 33 | Carrier B | San Francisco | Page |
| 2/1/1999 | 12:00:08 | 415 | 9718063 | 33 | Carrier B | San Francisco | Registration |
| 2/1/1999 | 12:00:08 | 415 | 9157921 | 33 | Carrier A | San Francisco | Registration |
| 2/1/1999 | 12:00:08 | 408 | 3260183 | 33 | Carrier B | San Francisco | Page |
| 2/1/1999 | 12:00:08 | 650 | 9727755 | 33 | Carrier A | San Francisco | Registration |
| 2/1/1999 | 12:00:09 | 650 | 3165225 | 33 | Carrier B | San Francisco | TC Assignment |
| 2/1/1999 | 12:00:09 | 650 | 7600203 | 33 | Carrier A | San Francisco | Page |
| 2/1/1999 | 12:00:09 | 510 | 2719321 | 33 | Carrier A | San Francisco | Registration |
| 2/1/1999 | 12:00:09 | 510 | 4140377 | 33 | Carrier B | San Francisco | Registration |
| 2/1/1999 | 12:00:10 | 925 | 8289139 | 33 | Carrier A | San Francisco | Page |
| 2/1/1999 | 12:00:10 | 925 | 8722863 | 33 | Carrier B | San Francisco | Registration |
| 2/1/1999 | 12:00:10 | 925 | 5312381 | 33 | Carrier A | San Francisco | TC Assignment |
| 2/1/1999 | 12:00:10 | 408 | 4075791 | 33 | Carrier B | San Francisco | Page |
| 2/1/1999 | 12:00:11 | 415 | 4651181 | 33 | Carrier B | San Francisco | Registration |
| 2/1/1999 | 12:00:11 | 415 | 7202077 | 33 | Carrier B | San Francisco | Registration |
| 2/1/1999 | 12:00:11 | 415 | 4995677 | 33 | Carrier A | San Francisco | Page |
| 2/1/1999 | 12:00:11 | 408 | 5048157 | 33 | Carrier A | San Francisco | Registration |
| 2/1/1999 | 12:00:12 | 650 | 4720249 | 33 | Carrier B | San Francisco | Registration |

Thousands of records, but abreviated for space

| Date | Time | Area code | User ID | Cell site | Carrier | City | Type |
|---|---|---|---|---|---|---|---|
| 2/28/1999 | 11:59:50 | 916 | 9485023 | 33 | Carrier A | San Francisco | TC Assignment |
| 2/28/1999 | 11:59:51 | 650 | 1099979 | 33 | Carrier B | San Francisco | Registration |
| 2/28/1999 | 11:59:51 | 650 | 2086803 | 33 | Carrier B | San Francisco | Page |
| 2/28/1999 | 11:59:51 | 510 | 4072269 | 33 | Carrier B | San Francisco | Registration |
| 2/28/1999 | 11:59:52 | 510 | 9719435 | 33 | Carrier B | San Francisco | TC Assignment |
| 2/28/1999 | 11:59:52 | 925 | 5318223 | 33 | Carrier B | San Francisco | Page |
| 2/28/1999 | 11:59:52 | 925 | 3972083 | 33 | Carrier B | San Francisco | Registration |
| 2/28/1999 | 11:59:52 | 925 | 8372834 | 33 | Carrier B | San Francisco | Registration |
| 2/28/1999 | 11:59:53 | 408 | 7070091 | 33 | Carrier A | San Francisco | Page |
| 2/28/1999 | 11:59:53 | 415 | 7203431 | 33 | Carrier B | San Francisco | Registration |
| 2/28/1999 | 11:59:53 | 415 | 9718063 | 33 | Carrier A | San Francisco | TC Assignment |
| 2/28/1999 | 11:59:53 | 415 | 9080547 | 33 | Carrier B | San Francisco | Page |
| 2/28/1999 | 11:59:54 | 408 | 9727755 | 33 | Carrier A | San Francisco | Registration |
| 2/28/1999 | 11:59:54 | 650 | 4140377 | 33 | Carrier B | San Francisco | Registration |
| 2/28/1999 | 11:59:54 | 650 | 8282141 | 33 | Carrier B | San Francisco | Page |
| 2/28/1999 | 11:59:54 | 650 | 8722863 | 33 | Carrier B | San Francisco | Registration |
| 2/28/1999 | 11:59:55 | 510 | 6728701 | 33 | Carrier A | San Francisco | TC Assignment |
| 2/28/1999 | 11:59:55 | 510 | 3283687 | 33 | Carrier B | San Francisco | Page |
| 2/28/1999 | 11:59:55 | 925 | 9120421 | 33 | Carrier B | San Francisco | Registration |
| 2/28/1999 | 11:59:55 | 214 | 8495065 | 33 | Carrier B | San Francisco | Page |
| 2/28/1999 | 11:59:56 | 925 | 4074175 | 33 | Carrier B | San Francisco | Registration |
| 2/28/1999 | 11:59:56 | 925 | 2649681 | 33 | Carrier B | San Francisco | Page |
| 2/28/1999 | 11:59:56 | 408 | 4949717 | 33 | Carrier B | San Francisco | Registration |
| 2/28/1999 | 11:59:56 | 415 | 7220981 | 33 | Carrier B | San Francisco | TC Assignment |
| 2/28/1999 | 11:59:57 | 415 | 4720249 | 33 | Carrier B | San Francisco | Page |
| 2/28/1999 | 11:59:57 | 415 | 2719321 | 33 | Carrier B | San Francisco | Registration |
| 2/28/1999 | 11:59:57 | 408 | 9140825 | 33 | Carrier A | San Francisco | Registration |
| 2/28/1999 | 11:59:57 | 650 | 4659877 | 33 | Carrier B | San Francisco | Page |
| 2/28/1999 | 11:59:58 | 412 | 3458569 | 33 | Carrier B | San Francisco | Registration |
| 2/28/1999 | 11:59:58 | 650 | 8040589 | 33 | Carrier A | San Francisco | Registration |
| 2/28/1999 | 11:59:58 | 650 | 4075813 | 33 | Carrier B | San Francisco | Page |
| 2/28/1999 | 11:59:59 | 510 | 8927489 | 33 | Carrier A | San Francisco | Page |
| 2/28/1999 | 11:59:59 | 510 | 9088217 | 33 | Carrier A | San Francisco | Page |
| 2/28/1999 | 11:59:59 | 925 | 5108465 | 33 | Carrier B | San Francisco | Page |
| 2/28/1999 | 11:59:59 | 925 | 7202099 | 33 | Carrier B | San Francisco | Page |
| 3/1/1999 | 12:00:00 | 925 | 8134855 | 33 | Carrier B | San Francisco | Page |
| 3/1/1999 | 12:00:00 | 408 | 5075719 | 33 | Carrier A | San Francisco | Page |

*ADDED SUBSCRIBER PROFILING*
SORTED DATA TO COUNT MEASURED SUBS FOR ACTUAL PERIOD

Added subs

| Count | Area code | User ID | Carrier | Number of TC Assignments |
|---|---|---|---|---|
| 1 | 408 | 2459999 | Carrier A | 186 |
| 2 | 408 | 3125342 | Carrier A | 0 |
| 3 | 408 | 4284754 | Carrier A | 4 |
| 4 | 408 | 5234565 | Carrier A | 28 |
| 5 | 408 | 6456834 | Carrier A | 18 |
| 6 | 408 | 6834125 | Carrier A | 15 |
| 7 | 408 | 9837234 | Carrier A | 0 |
| 8 | 415 | 3459759 | Carrier A | 85 |
| 9 | 415 | 4712845 | Carrier A | 82 |
| 10 | 415 | 7074832 | Carrier A | 4 |
| 11 | 415 | 7218473 | Carrier A | 38 |
| 12 | 415 | 7219473 | Carrier A | 72 |
| 13 | 415 | 7237453 | Carrier A | 2 |
| 14 | 415 | 9718753 | Carrier A | 24 |
| 15 | 415 | 3184477 | Carrier A | 74 |
| 16 | 510 | 4405853 | Carrier A | 17 |
| 17 | 510 | 5818450 | Carrier A | 134 |
| 18 | 510 | 8569023 | Carrier A | 69 |
| 19 | 650 | 3129384 | Carrier A | 102 |
| 20 | 650 | 4859603 | Carrier A | 65 |
| 21 | 650 | 8028449 | Carrier A | 110 |
| 22 | 650 | 8147586 | Carrier A | 88 |
| 23 | 650 | 8839475 | Carrier A | 4 |
| 24 | 925 | 2784753 | Carrier A | 68 |
| 25 | 925 | 3346573 | Carrier A | 10 |
| 26 | 925 | 4796784 | Carrier A | 50 |
| 27 | 925 | 5473842 | Carrier A | 18 |
| 28 | 925 | 8574534 | Carrier A | 63 |
| 29 | 408 | 2158949 | Carrier B | 38 |
| 30 | 408 | 3048865 | Carrier B | 73 |
| 31 | 408 | 4858694 | Carrier B | 28 |
| 32 | 408 | 5689483 | Carrier B | 9 |
| 33 | 408 | 7071234 | Carrier B | 88 |
| 34 | 415 | 3203845 | Carrier B | 0 |
| 35 | 415 | 9158934 | Carrier B | 0 |
| 36 | 510 | 3093849 | Carrier B | 5 |
| 37 | 510 | 4798694 | Carrier B | 20 |
| 38 | 510 | 5495834 | Carrier B | 33 |
| 39 | 510 | 5504853 | Carrier B | 82 |
| 40 | 650 | 5873844 | Carrier B | 1 |
| 41 | 650 | 8178934 | Carrier B | 10 |
| 42 | 650 | 9938445 | Carrier B | 65 |
| 43 | 925 | 8129345 | Carrier B | 160 |
| 44 | 925 | 8129903 | Carrier B | 3 |
| 44 | | | | 2045 |

FIG. 34

*ADDED SUBSCRIBER PROFILING*
SORTED DATA TO COUNT MEASURED ADDED SUBS FOR ACTUAL PERIOD

Measured subs

| Sort # | Area code | User ID | Carrier | Number of TC Assignments | Carrier A count | Carrier B count |
|---|---|---|---|---|---|---|
| 1 | 408 | 2459999 | Carrier A | 186 | 1 | 0 |
| 2 | 925 | 8129345 | Carrier B | 160 | 0 | 1 |
| 3 | 510 | 5818450 | Carrier A | 134 | 1 | 0 |
| 4 | 650 | 8028449 | Carrier A | 110 | 1 | 0 |
| 5 | 650 | 3129384 | Carrier A | 102 | 1 | 0 |
| 6 | 650 | 8147586 | Carrier A | 88 | 1 | 0 |
| 7 | 408 | 7071234 | Carrier B | 88 | 0 | 1 |
| 8 | 415 | 3459759 | Carrier A | 85 | 1 | 0 |
| 9 | 415 | 4712845 | Carrier A | 82 | 1 | 0 |
| 10 | 510 | 5504853 | Carrier B | 82 | 0 | 1 |
| 11 | 415 | 3184477 | Carrier A | 74 | 1 | 0 |
| 12 | 408 | 3048865 | Carrier B | 73 | 0 | 1 |
| 13 | 415 | 7219473 | Carrier A | 72 | 1 | 0 |
| 14 | 510 | 8569023 | Carrier A | 69 | 1 | 0 |
| 15 | 925 | 2784753 | Carrier A | 68 | 1 | 0 |
| 16 | 650 | 4859603 | Carrier A | 65 | 1 | 0 |
| 17 | 650 | 9938445 | Carrier B | 65 | 0 | 1 |
| 18 | 925 | 8574534 | Carrier A | 63 | 1 | 0 |
| 19 | 925 | 4796784 | Carrier A | 50 | 1 | 0 |
| 20 | 415 | 7218473 | Carrier A | 38 | 1 | 0 |
| 21 | 408 | 2158949 | Carrier B | 38 | 0 | 1 |
| 22 | 510 | 5495834 | Carrier B | 33 | 0 | 1 |
| 23 | 408 | 5234565 | Carrier A | 28 | 1 | 0 |
| 24 | 408 | 4858694 | Carrier B | 28 | 0 | 1 |
| 25 | 415 | 9718753 | Carrier A | 24 | 1 | 0 |
| 26 | 510 | 4798694 | Carrier B | 20 | 0 | 1 |
| 27 | 408 | 6456834 | Carrier A | 18 | 1 | 0 |
| 28 | 925 | 5473842 | Carrier A | 18 | 1 | 0 |
| 29 | 510 | 4405853 | Carrier A | 17 | 1 | 0 |
| 30 | 408 | 6834125 | Carrier A | 15 | 1 | 0 |
| 31 | 925 | 3346573 | Carrier A | 10 | 1 | 0 |
| 32 | 650 | 8178934 | Carrier B | 10 | 0 | 1 |
| 33 | 408 | 5689483 | Carrier B | 9 | 0 | 1 |
| 34 | 510 | 3093849 | Carrier B | 5 | 0 | 1 |
| 35 | 408 | 4284754 | Carrier A | 4 | 1 | 0 |
| 36 | 415 | 7074832 | Carrier A | 4 | 1 | 0 |
| 37 | 650 | 8839475 | Carrier A | 4 | 1 | 0 |
| 38 | 925 | 8129903 | Carrier B | 3 | 0 | 1 |
| 39 | 415 | 7237453 | Carrier A | 2 | 1 | 0 |
| 40 | 650 | 5873844 | Carrier B | 1 | 0 | 1 |
| 41 | 408 | 3125342 | Carrier A | 0 | 1 | 0 |
| 42 | 408 | 9837234 | Carrier A | 0 | 1 | 0 |
| 43 | 415 | 3203845 | Carrier B | 0 | 0 | 1 |
| 44 | 415 | 9158934 | Carrier B | 0 | 0 | 1 |
| | | | | | 28 | 16 |

FIG. 35

*ADDED SUBSCRIBER PROFILING*
SORTED DATA TO COUNT MEASURED ADDED SUBS FOR ACTUAL PERIOD

Measured subs

| Sort # | Area code | User ID | Carrier | Number of TC Assignments | Carrier A count | Carrier B count |
|---|---|---|---|---|---|---|
| First Quartile | | | | | | |
| 1 | 408 | 2459999 | Carrier A | 186 | 1 | 0 |
| 2 | 925 | 8129345 | Carrier B | 160 | 0 | 1 |
| 3 | 510 | 5818450 | Carrier A | 134 | 1 | 0 |
| 4 | 650 | 8028449 | Carrier A | 110 | 1 | 0 |
| 5 | 650 | 3129384 | Carrier A | 102 | 1 | 0 |
| 6 | 650 | 8147586 | Carrier A | 88 | 1 | 0 |
| 7 | 408 | 7071234 | Carrier B | 88 | 0 | 1 |
| 8 | 415 | 3459759 | Carrier A | 85 | 1 | 0 |
| 9 | 415 | 4712845 | Carrier A | 82 | 1 | 0 |
| 10 | 510 | 5504853 | Carrier B | 82 | 0 | 1 |
| 11 | 415 | 3184477 | Carrier A | 74 | 1 | 0 |
| | | | *First quartile totals* | | 8 | 3 |
| Second Quartile | | | | | | |
| 12 | 408 | 3048865 | Carrier B | 73 | 0 | 1 |
| 13 | 415 | 7219473 | Carrier A | 72 | 1 | 0 |
| 14 | 510 | 8569023 | Carrier A | 69 | 1 | 0 |
| 15 | 925 | 2784753 | Carrier A | 68 | 1 | 0 |
| 16 | 650 | 4859603 | Carrier A | 65 | 1 | 0 |
| 17 | 650 | 9938445 | Carrier B | 65 | 0 | 1 |
| 18 | 925 | 8574534 | Carrier A | 63 | 1 | 0 |
| 19 | 925 | 4796784 | Carrier A | 50 | 1 | 0 |
| 20 | 415 | 7218473 | Carrier A | 38 | 1 | 0 |
| 21 | 408 | 2158949 | Carrier B | 38 | 0 | 1 |
| 22 | 510 | 5495834 | Carrier B | 33 | 0 | 1 |
| | | | *Second quartile totals* | | 7 | 4 |
| Third Quartile | | | | | | |
| 23 | 408 | 5234565 | Carrier A | 28 | 1 | 0 |
| 24 | 408 | 4858694 | Carrier B | 28 | 0 | 1 |
| 25 | 415 | 9718753 | Carrier A | 24 | 1 | 0 |
| 26 | 510 | 4798694 | Carrier B | 20 | 0 | 1 |
| 27 | 408 | 6456834 | Carrier A | 18 | 1 | 0 |
| 28 | 925 | 5473842 | Carrier A | 18 | 1 | 0 |
| 29 | 510 | 4405853 | Carrier A | 17 | 1 | 0 |
| 30 | 408 | 6834125 | Carrier A | 15 | 1 | 0 |
| 31 | 925 | 3346573 | Carrier A | 10 | 1 | 0 |
| 32 | 650 | 8178934 | Carrier B | 10 | 0 | 1 |
| 33 | 408 | 5689483 | Carrier B | 9 | 0 | 1 |
| | | | *Third quartile totals* | | 7 | 4 |
| Fourth Quartile | | | | | | |
| 34 | 510 | 3093849 | Carrier B | 5 | 0 | 1 |
| 35 | 408 | 4284754 | Carrier A | 4 | 1 | 0 |
| 36 | 415 | 7074832 | Carrier A | 4 | 1 | 0 |
| 37 | 650 | 8839475 | Carrier A | 4 | 1 | 0 |
| 38 | 925 | 8129903 | Carrier B | 3 | 0 | 1 |
| 39 | 415 | 7237453 | Carrier A | 2 | 1 | 0 |
| 40 | 650 | 5873844 | Carrier B | 1 | 0 | 1 |
| 41 | 408 | 3125342 | Carrier A | 0 | 1 | 0 |
| 42 | 408 | 9837234 | Carrier A | 0 | 1 | 0 |
| 43 | 415 | 3203845 | Carrier B | 0 | 0 | 1 |
| 44 | 415 | 9158934 | Carrier B | 0 | 0 | 1 |
| | | | *Fourth quartile totals* | | 6 | 5 |

FIG. 36

ADDED SUBSCRIBER PROFILING
ALGORITHM FOR PROFILING ADDED SUBSCRIBERS

|  | Carrier A | Carrier B |
|---|---|---|
| First quartile | 8 | 3 |
| Second quartile | 7 | 4 |
| Third quartile | 7 | 4 |
| Fourth quartile | 6 | 5 |

Calculate the market share of each quartile using the following formulas

First quartile
- Carrier A   =8/(8+3)   72.7%
- Carrier B   =3/(8+3)   27.3%

Second quartile
- Carrier A   =7/(7+4)   63.6%
- Carrier B   =4/(7+4)   36.4%

Third quartile
- Carrier A   =7/(7+4)   63.6%
- Carrier B   =4/(7+4)   36.4%

Fourth quartile
- Carrier A   =6/(6+5)   54.5%
- Carrier B   =5/(6+5)   45.5%

FIG. 37

CHURNED SUBSCRIBER PROFILING
SORTED DATA TO COUNT MEASURED SUBS FOR ACTUAL PERIOD

Churned subs

| Count | Area code | User ID | Carrier | Number of TC Assignments |
|---|---|---|---|---|
| 1 | 408 | 4075789 | Carrier A | 186 |
| 2 | 408 | 5598825 | Carrier A | 0 |
| 3 | 415 | 3954234 | Carrier A | 4 |
| 4 | 415 | 9080545 | Carrier A | 28 |
| 5 | 510 | 4140375 | Carrier A | 18 |
| 6 | 510 | 8374527 | Carrier A | 15 |
| 7 | 650 | 4140375 | Carrier A | 0 |
| 8 | 650 | 8282139 | Carrier A | 85 |
| 9 | 925 | 4074173 | Carrier A | 82 |
| 10 | 925 | 8372832 | Carrier A | 4 |
| 11 | 408 | 3023844 | Carrier B | 38 |
| 12 | 408 | 3435863 | Carrier B | 72 |
| 13 | 408 | 5680234 | Carrier B | 2 |
| 14 | 415 | 2834055 | Carrier B | 24 |
| 15 | 415 | 6912097 | Carrier B | 74 |
| 16 | 510 | 2719319 | Carrier B | 17 |
| 17 | 510 | 4792791 | Carrier B | 134 |
| 18 | 650 | 4946647 | Carrier B | 69 |
| 19 | 650 | 7600201 | Carrier B | 102 |
| 20 | 650 | 9778330 | Carrier B | 65 |
| 21 | 925 | 7202075 | Carrier B | 110 |
| 22 | 925 | 8289137 | Carrier B | 0 |
| 23 | 925 | 9157919 | Carrier B | 22 |
| 24 | 925 | 9837732 | Carrier B | 333 |
| 24 | | | | 1484 |

FIG. 38

CHURNED SUBSCRIBER PROFILING
SORTED DATA TO COUNT MEASURED SUBS FOR ACTUAL PERIOD

Measured subs

| Sort # | Area code | User ID | Carrier | Number of TC Assignments | Carrier A count | Carrier B count |
|---|---|---|---|---|---|---|
| 1 | 925 | 9837732 | Carrier B | 333 | 0 | 1 |
| 2 | 408 | 4075789 | Carrier A | 186 | 1 | 0 |
| 3 | 510 | 4792791 | Carrier B | 134 | 0 | 1 |
| 4 | 925 | 7202075 | Carrier B | 110 | 0 | 1 |
| 5 | 650 | 7600201 | Carrier B | 102 | 0 | 1 |
| 6 | 650 | 8282139 | Carrier A | 85 | 1 | 0 |
| 7 | 925 | 4074173 | Carrier A | 82 | 1 | 0 |
| 8 | 415 | 6912097 | Carrier B | 74 | 0 | 1 |
| 9 | 408 | 3435863 | Carrier B | 72 | 0 | 1 |
| 10 | 650 | 4946647 | Carrier B | 69 | 0 | 1 |
| 11 | 650 | 9778330 | Carrier B | 65 | 0 | 1 |
| 12 | 408 | 3023844 | Carrier B | 38 | 0 | 1 |
| 13 | 415 | 9080545 | Carrier A | 28 | 1 | 0 |
| 14 | 415 | 2834055 | Carrier B | 24 | 0 | 1 |
| 15 | 925 | 9157919 | Carrier B | 22 | 0 | 1 |
| 16 | 510 | 4140375 | Carrier A | 18 | 1 | 0 |
| 17 | 510 | 2719319 | Carrier B | 17 | 0 | 1 |
| 18 | 510 | 8374527 | Carrier A | 15 | 1 | 0 |
| 19 | 415 | 3954234 | Carrier A | 4 | 1 | 0 |
| 20 | 925 | 8372832 | Carrier A | 4 | 1 | 0 |
| 21 | 408 | 5680234 | Carrier B | 2 | 0 | 1 |
| 22 | 408 | 5598825 | Carrier A | 0 | 1 | 0 |
| 23 | 650 | 4140375 | Carrier A | 0 | 1 | 0 |
| 24 | 925 | 8289137 | Carrier B | 0 | 0 | 1 |
| | | | | | 10 | 14 |

FIG. 39

CHURNED SUBSCRIBER PROFILING
SORTED DATA TO COUNT MEASURED ADDED SUBS FOR ACTUAL PERIOD

Measured subs

| Sort # | Area code | User ID | Carrier | Number of TC Assignments | Carrier A count | Carrier B count |
|---|---|---|---|---|---|---|
| First Quartile | | | | | | |
| 1 | 925 | 9837732 | Carrier B | 333 | 0 | 1 |
| 2 | 408 | 4075789 | Carrier A | 186 | 1 | 0 |
| 3 | 510 | 4792791 | Carrier B | 134 | 0 | 1 |
| 4 | 925 | 7202075 | Carrier B | 110 | 0 | 1 |
| 5 | 650 | 7600201 | Carrier B | 102 | 0 | 1 |
| 6 | 650 | 8282139 | Carrier A | 85 | 1 | 0 |
| | | | | *First quartile totals* | *2* | *4* |
| Second Quartile | | | | | | |
| 7 | 925 | 4074173 | Carrier A | 82 | 1 | 0 |
| 8 | 415 | 6912097 | Carrier B | 74 | 0 | 1 |
| 9 | 408 | 3435863 | Carrier B | 72 | 0 | 1 |
| 10 | 650 | 4946647 | Carrier B | 69 | 0 | 1 |
| 11 | 650 | 9778330 | Carrier B | 65 | 0 | 1 |
| 12 | 408 | 3023844 | Carrier B | 38 | 0 | 1 |
| | | | | *Second quartile totals* | *1* | *5* |
| Third Quartile | | | | | | |
| 13 | 415 | 9080545 | Carrier A | 28 | 1 | 0 |
| 14 | 415 | 2834055 | Carrier B | 24 | 0 | 1 |
| 15 | 925 | 9157919 | Carrier B | 22 | 0 | 1 |
| 16 | 510 | 4140375 | Carrier A | 18 | 1 | 0 |
| 17 | 510 | 2719319 | Carrier B | 17 | 0 | 1 |
| 18 | 510 | 8374527 | Carrier A | 15 | 1 | 0 |
| | | | | *Third quartile totals* | *3* | *3* |
| Fourth Quartile | | | | | | |
| 19 | 415 | 3954234 | Carrier A | 4 | 1 | 0 |
| 20 | 925 | 8372832 | Carrier A | 4 | 1 | 0 |
| 21 | 408 | 5680234 | Carrier B | 2 | 0 | 1 |
| 22 | 408 | 5598825 | Carrier A | 0 | 1 | 0 |
| 23 | 650 | 4140375 | Carrier A | 0 | 1 | 0 |
| 24 | 925 | 8289137 | Carrier B | 0 | 0 | 1 |
| | | | | *Fourth quartile totals* | *4* | *2* |

FIG. 40

CHURNED SUBSCRIBER PROFILING
ALGORITHM FOR PROFILING ADDED SUBSCRIBERS

|  | Carrier A | Carrier B |
|---|---|---|
| First quartile | 2 | 4 |
| Second quartile | 1 | 5 |
| Third quartile | 3 | 3 |
| Fourth quartile | 4 | 2 |

Calculate the market share of each quartile using the following formulas

First quartile
- Carrier A =2/(2+4)  33.3%
- Carrier B =4/(2+4)  66.7%

Second quartile
- Carrier A =1/(1+5)  16.7%
- Carrier B =5/(1+5)  83.3%

Third quartile
- Carrier A =3/(3+3)  50.0%
- Carrier B =3/(3+3)  50.0%

Fourth quartile
- Carrier A =4/(4+2)  66.7%
- Carrier B =2/(4+2)  33.3%

FIG. 41

SYSTEM AND METHOD FOR GATHERING DATA FROM WIRELESS COMMUNICATIONS NETWORKS

BACKGROUND OF THE INVENTION

1. Field of the Invention

This invention relates generally to data gathering systems and, in particular, to systems and related methods for simultaneously gathering data from multiple wireless communication networks.

2. Description of the Related Art

The basic structure and operation of wireless communication networks, including cellular, paging, wireless local loop, and satellite communication networks are well known. A typical cellular communication network essentially consists of a plurality of mobile subscriber units (MSUs), a plurality of cell sites with base station equipment, a plurality of base station controllers (BSCs), which may be associated with each base station, or may be centralized to provide control for a plurality of base stations, a mobile telephone switching office (MTSO or Mobile Switching Center (MSC)) and various local or networked databases which may include a home location register (HLR), visitor location register (VLR), authentication center (AuC) and equipment identity register (EIR).

A typical cellular communication network is characterized by the concepts of frequency reuse and handoff. In some cellular systems, a frequency is reused at many sites which are geographically separated from each other by a distance sufficient to ensure that the interference from other sites utilizing the same frequency is low enough to permit a quality signal from the primary serving site. Handoffs are the process of changing the serving site as a subscriber moves from the primary service area of one site to that of another.

Ordinarily, cellular systems are initially designed with a set of cell sites that provide partial overlapping RF coverage over a market area of interest. In order to provide increased capacity, additional cell sites are constructed between the initial cell sites. The coverage area of each cell site is reduced through a combination of antenna system design and transmitter power reduction in order to provide limited overlap of individual coverage areas while maintaining contiguous coverage. In some cellular systems, capacity within each cell is limited by the available spectrum and the number of frequency assignments that can be assigned for that cell without violating the interference constraints of the common air interface standard employed for the network. Capacity can also be reused through the use of "sectored" sites, in which a single site is equipped with antenna systems and transceivers to permit multiple cells to be created from a single site. A common sectoring approach utilizes three sectors per site, each providing primary coverage in a different 120°-wide sector around the site, while partially overlapping with the other two sectors. Common frequency reuse patterns range from a reuse pattern of twenty-one, in which the frequency assignments are reused over a pattern of seven tri-sectored sites in Frequency Division Multiple Access (FDMA) systems, to reuse patterns of one, in which the same frequency assignment is reused in every cell in Code Division Multiple Access (CDMA) systems.

There are various common air interface (CAI) standards that are used in the radio communications link between the MSU and the cell site. The earliest type in common use is known as Frequency Division Multiple Access (FDMA), in which each communications channel consists of a single narrowband carrier, generally employing analog frequency modulation. Digital systems generally provide multiple communications channels within a single frequency assignment. In Time Division Multiple Access (TDMA) systems, a carrier is modulated with a binary signal, with channels cyclically assigned to unique timeslots. The number of channels available for a carrier frequency assignment varies with the particular TDMA standard, typically ranging from three to eight with current full rate vocoders. Another type of digital modulation in common use, Code Division Multiple Access (CDMA), typically differentiates up to sixty-four spread spectrum modulation channels using orthogonal spreading codes within a single wideband frequency assignment.

Channels that are transmitted from the base stations and received by MSUs are known as forward channels, while those that are transmitted from the MSU and received by the base station are known as reverse channels. Channels are further differentiated by their function. Those that are generally used for signaling between the MSU and the base station are known as control channels, while those that are generally used to carry voice or data signals are known as traffic channels. Generally, some limited forms of signaling are available when a call is in progress on a traffic channel to permit control of the call in progress or to support system requirements such as handoffs.

In certain cellular systems, when an MSU is in an idle mode, it may select a forward control channel (FCC) to monitor for signaling information. If the MSU is required to transmit information to the base station, it will do so on a corresponding reverse control channel (RCC). The protocols for the various common air interfaces determine which FCC-RCC pair is to be used. FCCs are used to send two types of messages. Overhead messages provide information to all MSU units monitoring the channel, and may include system and cell site identifiers, and information regarding the system configuration (e.g. neighbor lists). The FCC also provides information for specific users, including pages and short data messages. Absent any means of determining which cell is being monitored by a particular MSU, such messages would need to be broadcast over all the FCCs of all cells within a network in order to ensure that the MSU receives the message. This is practical in smaller systems, but in systems with more than a few tens of thousands of subscribers, it is desirable to subdivide the network into location areas (LAs) in order to avoid exceeding the data throughput capacity of the FCC. Subscriber messages can then be broadcast through the FCC of all the cells in the LA in which the MSU is monitoring a FCC.

Cellular systems ordinarily use a process known as registration in order to determine which LA serves a MSU. Generally, when an MSU is first turned on, it will initially monitor the strongest available FCC. It will then register in accordance with information contained within the FCC overhead data. This is accomplished by exchanging prescribed messages, including the subscriber identity, over the FCC-RCC pair. The VLR stores the information regarding the most current LA is then stored in the system VLR and the MSU. If the MSU later determines that the LA identifier included in the FCC no longer matches the data it has stored, it will initiate a location update that will repeat the registration process with the new LA identifier. Re-registration may also occur in response to system requests. In systems in which LAs are utilized, subscriber messages are initially sent only to cells within the system which correspond to the LA information for the MSU that is stored in the VLR.

Generally, when a call is made to a registered MSU, the network sends a page from the base station to the MSU by broadcasting a paging message on the FCC of the cells within the LA. If received, the MSU responds by sending its identifying information once again to the network along with a message confirming that it received the page. The network then sends a traffic channel assignment to the MSU on the forward control channel.

Ordinarily, when an MSU originates a call, the MSU initiates a signaling sequence which includes its identity and the called number using the RCC that corresponds to the monitored FCC. After verifying that the MSU corresponds to a valid subscriber record, the MSU is assigned to a traffic channel and the MTSO completes the call to the called number.

For a given geographic area, there are typically several competing service providers operating wireless communication networks. Each will have certain licensed frequency assignments, or bands of licensed frequencies, that it is permitted to use within its network. Each will have a common air interface, generally an industry standard, but occasionally a proprietary system developed by a particular vendor and not subjected to an industry standards process.

In the past, equipment has been developed to test the operation of, and characterize the quality of, the individual networks. Test equipment has been developed that allow the simultaneous testing of multiple networks at a single location. When coupled with navigation and data recording and analysis capabilities, they permit characterizing the comparative quality of various networks over a given set of geographical points, one location at a time (generally referred to as a drive route, since the test equipment is ordinarily installed in a vehicle and driven throughout a market area.)

However, such equipment typically is limited to gathering information from the portions of the networks that are in the vicinity of the test equipment. In major cellular system market area, this may mean the equipment is limited to gathering information from a small subset of the active cells at any given moment in time. In addition, since a purpose of the equipment is to test the operation and the quality of the wireless communication networks, the data processing capabilities of such equipment generally are not designed to gather data to make market share, usage comparisons, or user profiles for the different wireless communication networks.

Current methods of gathering information about subjects such as market share, usage, and user profile data often have been limited to telephone surveys, generally conducted by telemarketing research firms. This type of information is critical to wireless communications operators, who may expend significant resources on advertising and promotions to attract customers and need metrics to judge the effectiveness of these expenditures. But the accuracy and reliability of such telephone surveys sometimes is limited as they provide only anecdotal data and may use an insufficient statistical sample. Furthermore, in some cases these methods result in unsolicited charges to wireless customers. As a result, there has been a need for more comprehensive data gathering systems and related methods for gathering marketing information about wireless communication networks.

SUMMARY OF THE INVENTION

The present invention encompasses data gathering systems and related methods for gathering data from wireless communication networks. For a given geographic area, there may be several service providers operating wireless communication networks utilizing various types of common air interface standards. One data gathering system in accordance with the invention gathers data from each wireless communication network simultaneously. The system comprises a plurality of data gathering nodes deployed in a sampling network, and a control center that provides management of the data collection processes of each node, data collection from each of the nodes, error detection, management of the collected data, and overall administration of the network.

A data gathering node may comprise multiple receivers, a minimum of one for each wireless communication network. Each receiver employs a sampling algorithm to gather data from cell sites surrounding the data gathering node. The data gathered from each data gathering node is periodically sent to a control center where it is stored.

Later, a data mining application may be run on the gathered data to generate marketing and usage information for each of the wireless communication networks.

The present invention is explained in more detail below with reference to the drawings.

BRIEF DESCRIPTION OF THE DRAWINGS

FIG. 6 is a sample excerpt of a baselining period data file.

FIG. 7 is a sample excerpt of a data file from which marketing and usage characterization information is to be generated.

FIG. 8 is a comparison between actual subscribers and measured subscribers used in calculating the subscriber share gross-up coefficient.

FIG. 9 is a sort of the data found in FIG. 7 to count the number of measured subscribers.

FIG. 10 shows the calculation of the subscriber share gross-up coefficients and the market share percentage of each wireless communication network.

FIG. 12 is a sample excerpt of a second data file from which marketing and usage characterization information is to be generated.

FIG. 13 is a comparison of different subscribers between the data file shown in FIG. 7 and a second data file shown in FIG. 12 used to determine new and churning subscribers.

FIG. 14 shows the calculation of the new subscriber gross-up coefficients and the market share percentage of new subscribers for each wireless communication network.

FIG. 15 shows the calculation of the churning subscriber gross-up coefficients and the market share percentage of churning subscribers for each wireless communication network.

FIG. 18 is a comparison of actual roamers to roamers measured during a baseline period used to calculate the roamer gross-up coefficient.

FIG. 19 is a data sort of the data file of FIG. 7 counting the number of roamers.

FIG. 20 shows the calculation of the roamer gross-up coefficient and the share of roamers for each wireless communication network.

FIG. 21 is a sample report containing information on roamer share.

FIG. 22 is a comparison of actual calls and measured calls during a baseline period used to calculate the call share gross-up coefficient.

FIG. 23 is a data sort of the file in FIG. 7 counting the number of traffic channel assignments made for each wireless communication network.

FIG. 24 shows the calculation of the call share gross-up coefficient and the call share for each wireless communication network.

FIG. 25 is a sample report containing information on call share.

FIG. 26 is a sample excerpt of a data file from which base subscriber profiling information is to be generated.

FIG. 27 is a data sort of the file shown in FIG. 26 to identify the number of traffic channel assignments made to different subscribers.

FIG. 28 is a data sort of the file shown in FIG. 27 arranging subscribers by number of traffic channel assignments.

FIG. 29 is a data sort of the file shown in FIG. 28 dividing the data into quartiles and counting the number of subscribers for each wireless communication network in each quartile.

FIG. 30 shows the calculation of market share of base subscribers for each wireless communication network in each quartile.

FIGS. 31 and 32 are sample excerpts of data files from which new and churning subscriber profiling information is to be generated.

FIG. 33 is a data sort of the files shown in FIGS. 31 and 32 identifying new and churning subscribers.

FIG. 34 is a data sort of the file in FIG. 31 counting the number of traffic channel assignments made to new subscribers.

FIG. 35 is a data sort of FIG. 34 arranging subscribers by number of traffic channel assignments.

FIG. 36 is a data sort of the file shown in FIG. 35 dividing the data into quartiles and counting the number of new subscribers for each wireless communication network in each quartile.

FIG. 37 shows the calculation of market share of new subscribers for each wireless communication network for each quartile.

FIG. 38 shows a data sort of FIG. 31 counting the number of traffic channel assignments made to churning subscribers.

FIG. 39 is a data sort of FIG. 38 arranging churning subscribers by the number of traffic channel assignments made.

FIG. 40 is a data sort of the file shown in FIG. 39 dividing the data into quartiles and counting the number of churning subscribers for each wireless communication network in each quartile.

FIG. 41 shows the calculation of market share of churning subscribers for each wireless communication network for each quartile.

DETAILED DESCRIPTION OF THE PREFERRED EMBODIMENT

The present invention encompasses data gathering systems and related methods for gathering data from wireless communication networks. The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Figure 1:
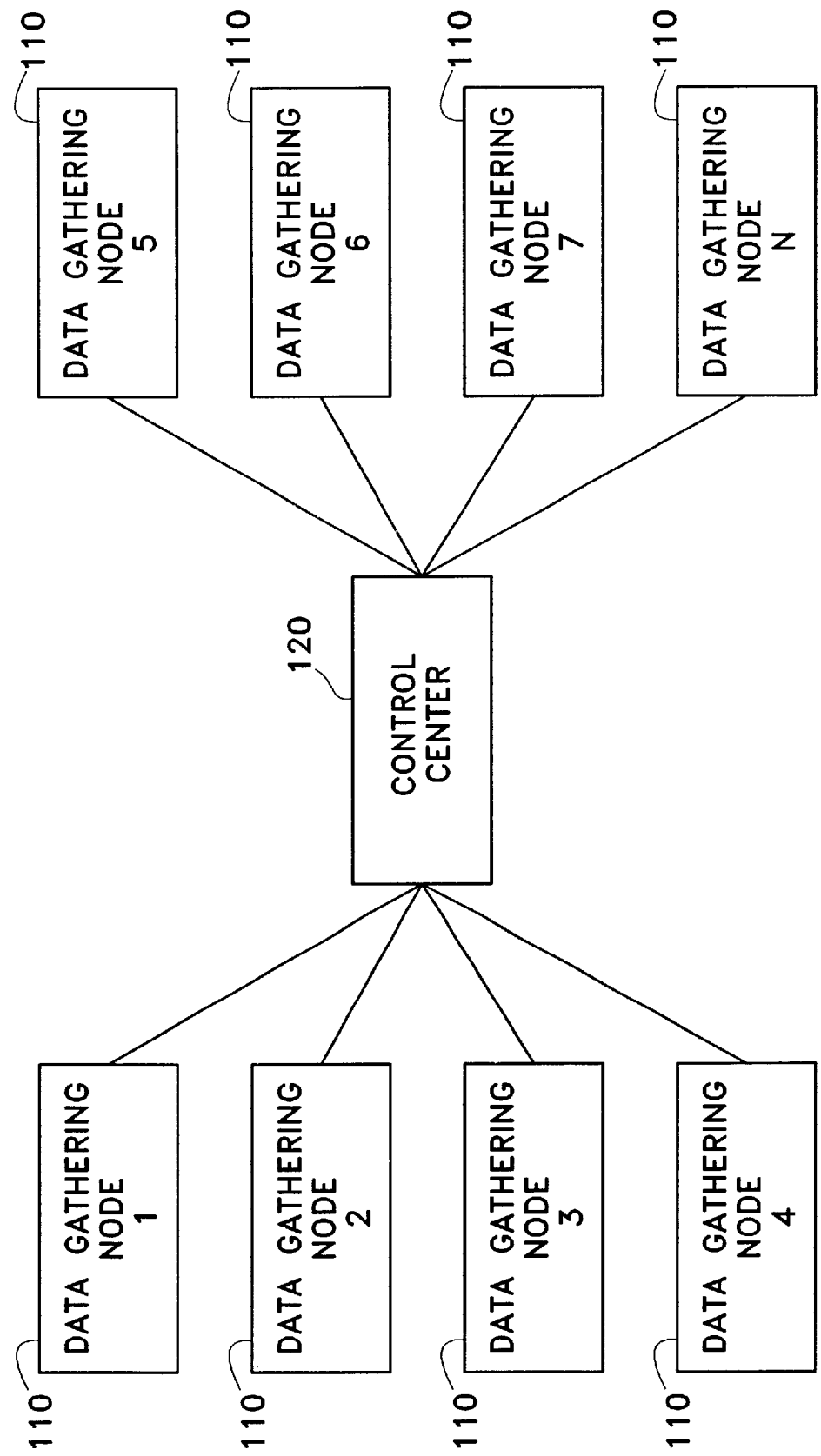
FIG. 1 is an illustrative block diagram of a data gathering system for wireless communication networks in accordance with a presently preferred embodiment of the invention.

A block diagram of a presently preferred embodiment of a data gathering system for wireless communication networks is shown in FIG. 1. In a presently preferred embodiment of the invention, the data gathering system comprises N data gathering nodes (110) placed at various locations in a geographic area served by wireless communication networks, where N is an integer greater than one and represents the number of data gathering nodes used to gather data from cell sites in the wireless communication networks. Each data gathering node is coupled to a control center (120).

Figure 2:
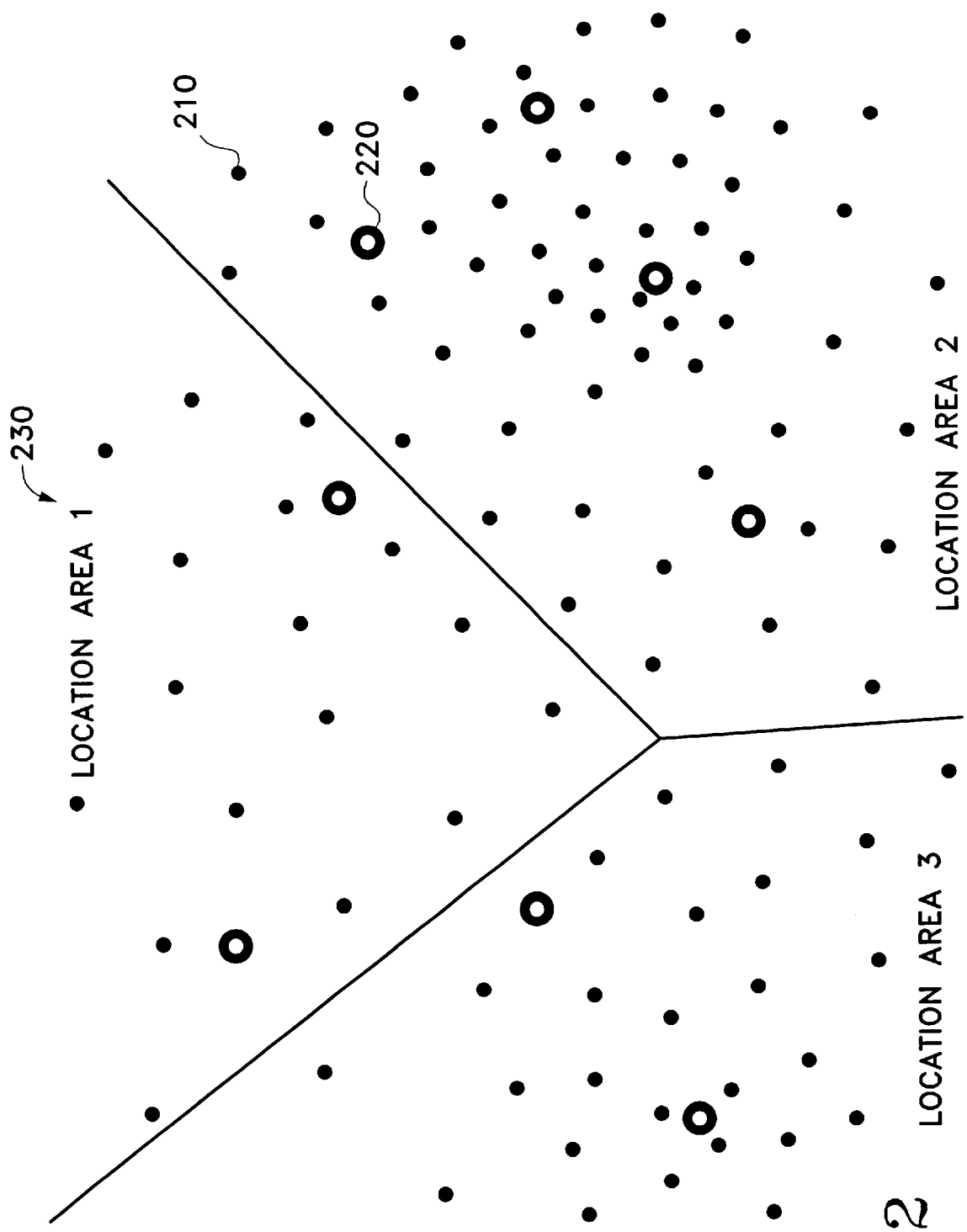
FIG. 2 is a representation of a cell layout of a wireless communication network and shows the placement of data gathering nodes like the one in FIG. 4.

Referring to FIG. 2, a sample wireless communication network is represented by a distribution of cell sites (210) throughout a geographic area. The density of all sites (210) is greater in areas of high wireless communication traffic. The placement of each data gathering node (220) is dependent on the cell layouts of the wireless communication networks. A survey may be conducted prior to selecting monitoring locations in order to provide useful information regarding the density of cell sites (210) and the approximate areas the cell sites serve. Data gathering nodes (220) are placed in locations that permit each data gathering node to monitor an approximately equal number of cell sites (210) in each network and, in aggregate, maximize the number of cell sites (210) of each network that are monitored. Typically, in areas with greater cell densities, data gathering nodes (220) are spaced more closely together and locations are selected which have a smaller area in which they can effectively monitor cell sites.

Typically, cells within a wireless communication network are associated with location areas (230) which are defined by the network operator. In the preferred embodiment, at least one data gathering node (220) is placed within each location area (230) of each wireless communication network to "sample" or gather data from the group of cell sites surrounding the data gathering node (a "cell group"). Data gathering nodes (220), either transportable or fixed, may also be deployed within each location area (230) to gather data from additional cell sites (210) depending on the quantity and density of cell sites (210) within a particular location area (230) in order to gain sufficient samples of subscriber messages.

Factors affecting the cell sites (210) from which a data gathering node can gather data include the physical environment of the node (particularly its height above the local terrain and the physical structures in the immediate vicinity of its antenna network), the relative locations and orientations of the local cell site antennas, the transmit power of the cells, and the terrain and morphology between the node and cell locations. The data gathering nodes (220) that are initially placed based on the cell layouts and location areas are meant to remain fixed for an extended period of time, although some initial adjustment may be necessary to optimize the gathering of data from the most number of cell sites (210) by each data gathering node from each wireless communication network. Periodic adjustments may be required in response to ongoing changes in the monitored networks. When the data gathering nodes (220) are initially placed, particular attention is paid to ensure that data is gathered from all cell sites in high usage areas such as business centers, high traffic areas, or airports and bridges.

Figure 4:
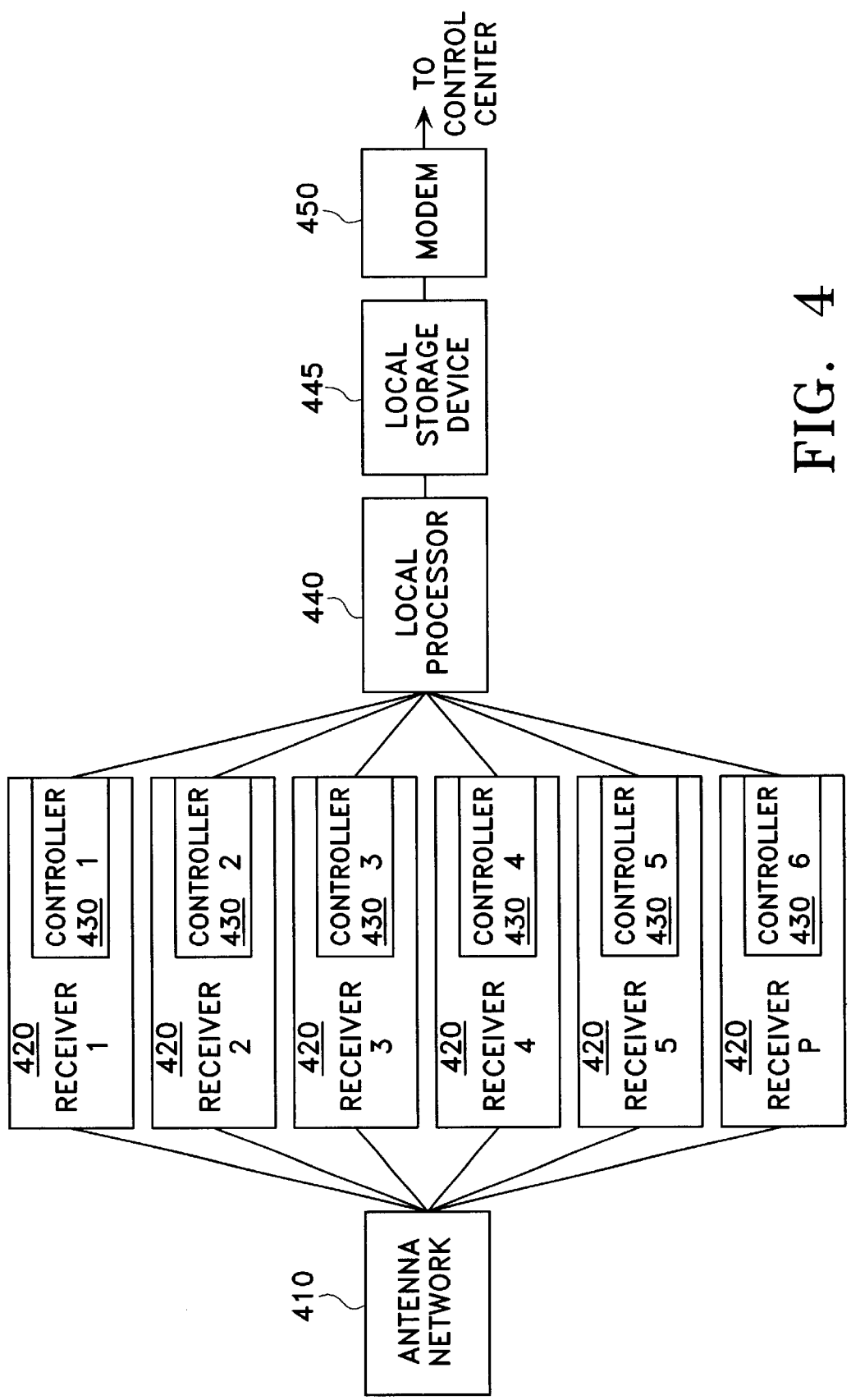
FIG. 4 is a block diagram of the presently preferred embodiment of one of the data gathering nodes of the system of FIG. 1.

As shown in FIG. 4, each node may have multiple receivers, each configured to monitor control channels of base stations of one of multiple cellular networks. Prior to performing monitoring operations, each receiver is programmed to undertake an initialization process in which it scans all of the appropriate control channels of the wireless communication network that it is monitoring. The local processor will create and maintain a record of all readable control channels, their corresponding cell identifiers (or other information that may permit distinguishing the control channel of once cell site from that of another), location area identifiers, and the approximate received signal strength of each. This information will be uploaded to the control center (120), which then determines which data gathering nodes (220) are responsible for monitoring which cell sites (210).

The control center will develop a set of sampling plans based upon the system configuration data. In the preferred embodiment, groups of cells for each network will be designated as within the sampling plan of a data gathering node based upon the following objectives and constraints: (1) all cells within a group will be within the same location area, (2) the number of cells in each group will be the same, (3) the levels of subscriber messages will be the same in each group, (4) the signal levels from each cell within the group will exceed a designated CAI-dependent threshold, and (5) the sampling plan will be consistent with the configuration of the data gathering node. The development of the sampling plan may be performed manually, or may be accomplished automatically using an optimization program or process that provides a optimal solution using assigned weighting factors for each objectives, while maintaining location area and data gathering node configuration constraints.

Figure 3:
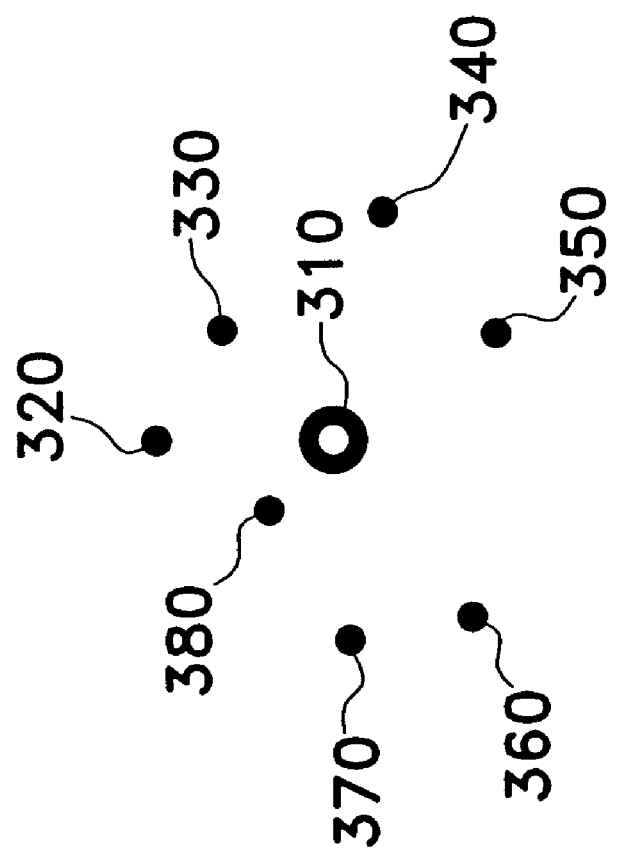
FIG. 3 is a representation of a group of cell sites comprising a cell group from which a data gathering node of FIG. 4 samples to gather data.

FIG. 3 shows a grouping of cell sites of one cellular system surrounding a data gathering node (310) that is monitored by one of the receivers of node (310) in accordance with a presently preferred embodiment of the invention. Although a cell group for only one wireless communication network is shown, each data gathering node will sample from cell groups for each wireless communication network in a similar manner. The data gathering node (310) samples signals transmitted from a base station in cell site (320) for a time period, and then samples signals transmitted from the base station in cell site (330) for a time period, followed by cell site (340), cell site (350), cell site (360), cell site (370), and finally cell site (380). The data gathering node (310) samples signals from base stations belonging to each wireless communication network.

Once all of the cell sites of a cellular system that are associated with the data gathering node have been sampled, the sampling process is then repeated again starting with cell site (320). The data gathering node monitors signals transmitted from the base station in a new cell by switching to the corresponding channel assignment of the base station in the new cell. In the preferred embodiment, a data gathering node will gather data from several seconds to several minutes from each cell in the cell group (230). The time periods may be uniform for each cell, or may be weighted based upon historical rates of subscriber messages monitored from each cell site. Other factors affecting the sampling period include the wireless communication network from which data is being gathered, and the strength at the data gathering node of the signal from the cell being monitored. In an alternative embodiment, each data gathering node does not sample each cell in the group of cell sites, but rather only a single cell site.

Referring to FIG. 4, a block diagram of the presently preferred embodiment of the data gathering node of the system of FIG. 1 is shown. Each data gathering node comprises an antenna network (410) that comprises one or more antennas and an RF distribution network connecting the antenna(s) to the receivers (420), P receivers (420), where P is an integer greater than one and represents the number of forward control channels from which data is to be gathered, a local processor with capabilities similar to a personal computer (440), a local storage device such as a hard drive (445), and a modem (450). Currently there typically are between six and eight wireless communication networks in each major market. Some common air interface standards utilize more than one forward control cannel in a cell site, thus requiring more than one receiver per wireless communication network.

The antenna network (410) is coupled to each receiver (420) for signal reception, and each receiver (420) includes a corresponding controller (430). The combination of receivers at each data gathering node (110) is capable of receiving and decoding traffic from any common air interface standard on which a particular service provider may be operating, including N/AMPS (Narrowband/Advanced Mobile Phone Service), TDMA (Time Division Multiple Access), CDMA (Code Division Multiple Access), GSM (Global System for Mobile telephones), and iDEN in the cellular, SMR and PCS frequency bands. Each receiver (420) is coupled to the local processor (440). Each controller (430) allows the local processor (440) to control its corresponding receiver (420) functions, such as channel selection, decode mode, and cell sampling patterns. Each receiver is capable of receiving a forward control channel (FCC), forward traffic channel (FTC), reverse control channel (RCC), and reverse traffic channel (RTC) signals of a cellular communication network, determining the approximate received signal strength for the channel, and either decoding the signaling data or determining the presence of traffic.

It is the task of the receivers to process the incoming radio signals into useful information by demodulating the signals and decoding the raw data into useful information according to the particular cellular communication standard being used. In the presently preferred embodiment, each receiver (420) monitors the forward control channels of a different wireless communication network, observing all messages broadcast by the base station sent to all MSUs in the cell site associated with the service provider of interest. Different receivers can be configured to receive information compliant with N/AMPS (Narrowband/Advanced Mobile Phone Service), TDMA (Time Division Multiple Access), CDMA (Code Division Multiple Access), GSM (Global System for Mobile telephones), and iDEN in the cellular, SMR and PCS frequency bands. In alternative embodiments, each receiver (420) may monitor a reverse control channel, forward traffic channel, or reverse traffic channel of a different wireless communication network. Messages decoded from the reverse control channel can be processed to generate subscriber calling pattern information as well as subscriber identity information, as further described below.

Demodulation and decoding of the forward control channel signal yields the messages transmitted over the forward control channel, as well as filler data, repeated messages, and checksum data. Filler data, repeated messages, and checksum data are generally filtered out and discarded by the receiver to facilitate data handling, leaving only formatted messages. In the presently preferred embodiment, each receiver (420) selects the following messages to save and discards all other messages: (1) certain overhead messages that provide system and cell site identification, network quality information (e.g. busy/idle bit), and registration instructions, (2) Registration Confirmations, which include the subscriber MIN being confirmed, time of day and date of the confirmation, base station identification, and frequency/carrier identifier, (3) Pages, which include the subscriber MIN being paged, and (4) Traffic channel assignments, which include the subscriber MIN for which a channel is being assigned.

The filtered messages are then sent to the local processor (440) which records the time of receipt of each message. The local processor (440) is comparable in capabilities to a desktop personal computer. The local processor (440) is equipped with a fault tolerant power supply of sufficient dimension and capabilities to assure immunity to short duration power interruptions and the ability to shut down and restart in the event of a prolonged power outage. The local processor (440), based upon data processing commands received from the control center (120), may further filter messages. Messages are accumulated in temporary memory (RAM) in block files associated with the forward control channels associated with each receiver. Certain fields in the messages, such as portions of the subscriber MIN, are encrypted into unique subscriber identifier numbers that correlate to a specific subscriber using standard public/private key algorithms such as DES or MDS. Portions of the MIN corresponding to the area code are not encrypted into the unique subscriber identifier in order to gather data on roamers. Each data gathering node (110) will use the same public key to encrypt the MIN to simplify key management. The corresponding private key is held in escrow, and is unavailable to be used to decrypt the unique subscriber identifiers, thus protecting the privacy of subscribers. In an alternative embodiment, subscriber MINS are encrypted into unique subscriber identifiers at the receivers (440) rather than the local processor (440). At no time is an unencrypted MIN stored on a permanent media vulnerable to security breaches.

On a periodic basis, or whenever the forward control channel monitoring assignment is changed, the block file associated with the forward control channel is closed, compressed using a standard compression format such as ZIP to minimize storage and transmission requirements, and sent to a local storage device (445) such as a hard drive where it is appended to a file corresponding to its associated wireless communication network. A new block file is created which corresponds to the next block time period and forward control channel.

Alternatives exist to using MINs to generate unique subscriber identifiers. In one alternative embodiment, each receiver (420) monitors the reverse control channel as well as the forward control channel. Demodulation and decoding of the reverse control channel signal yields a message corresponding to the ESN of the MSU. In this alternative embodiment, the ESN is encrypted to produce a unique subscriber identifier rather than the MIN gathered from the forward control channel. In another alternative embodiment, the unique RF wave pattern (RF fingerprint) transmitted by each MSU on the reverse control channel is used to assign a different unique subscriber identifier to each RF fingerprint. In these alternative embodiments, the messages pertaining to the MINs gathered from the forward control channel are filtered out with the extraneous information rather than encrypted.

On a scheduled basis, all files are closed and prepared for uploading to the control center (120). A file header is created for each wireless communication network file that summarizes the statistics of the corresponding file, including peg counts for each type of message recorded and a summary of any apparent alarm conditions or system outages detected during the reporting period. The control center (120) initiates a dialup routine to connect with the local processor (440), which sends the data file containing data gathered since the previous dialup. Alternatively, the local processor (440) may initiate the communications session based upon previously downloaded instructions and schedules from the control center (120). In alternative embodiments, the connection between the control center (120) and the local processor (440) can be made via the internet, an RF link, or a wide area network.

The control center (120) may also initiate a dialup routine to connect with the local processor (440) at other times to transmit any revised settings for the receivers to the local processor (440), such as frequency selection or sampling patterns. The local processor (440) will then transmit changes to the controller (430) at each receiver (420). In the preferred embodiment, the control center (120) initiates a dialup routine once a day, at which time the local processor (440) sends the data file containing data gathered since the previous dialup and the control center (120) transmits any revised settings for the receivers to the local processor (440). In the preferred embodiment, the dialup linkage occurs landline via a standard telephone modem (450), but in an alternative embodiment the dialup linkage may be wireless.

At the control center (120), each data file received from a data gathering node is decompressed and the data file is error checked to ensure data integrity. This includes examining the timestamps of the first and last event in the data file and confirming that the data file is composed of data gathered during the expected time period since the previous data upload. Second, messages are sampled from the data file and compared to the messages in the corresponding positions in the previous day's data to confirm that the messages are not identical to the previous day's data. In an alternative embodiment, instead of error checking the data file against only the prior day's data file, the data file can be error checked against several previous days of data collected to ensure that new data has been collected. In the preferred embodiment, the first message, last message, and eight messages at equal intervals between the first and last messages are sampled, for a total of ten sampled messages.

The data file is also checked to ensure that receivers have been functioning properly and gathering data throughout the collection period. Data files collected from previous collection periods are used to generate a normal range of occurrences for each type of message over a given collection period. After the data file is downloaded, the control center (120) counts the number of occurrences of each type of message and ensures that the numbers fall within the expected normal range of each type of message.

After the uploaded data files from all the data gathering nodes (110) have been error checked, they are processed to generate a single file of messages. Since data is gathered from multiple data gathering nodes simultaneously, there may be undesired duplicate entries for the same event. This is particularly the case when multiple data gathering nodes are monitoring cells within the same location area. Since, for the purposes of the presently preferred embodiment, the desired data is that a particular MSU received a page at a particular time, redundant page signals attempting to locate the MSU are undesirable and eliminated.

To eliminate redundant pages, the control center (120) sorts through all of the data files received from each data gathering node (110) and identifies pages to the same subscriber that were received at different data gathering nodes (110) within a pre-determined window of time and selects the page with the earliest time stamp. The control center (120) then eliminates all other pages to the same subscriber within the pre-determined window of time. The pre-determined window of time may vary depending on the wireless communication network standard from which the data is gathered, and may be refined from time to time based on prior data that has been gathered.

Figure 5:
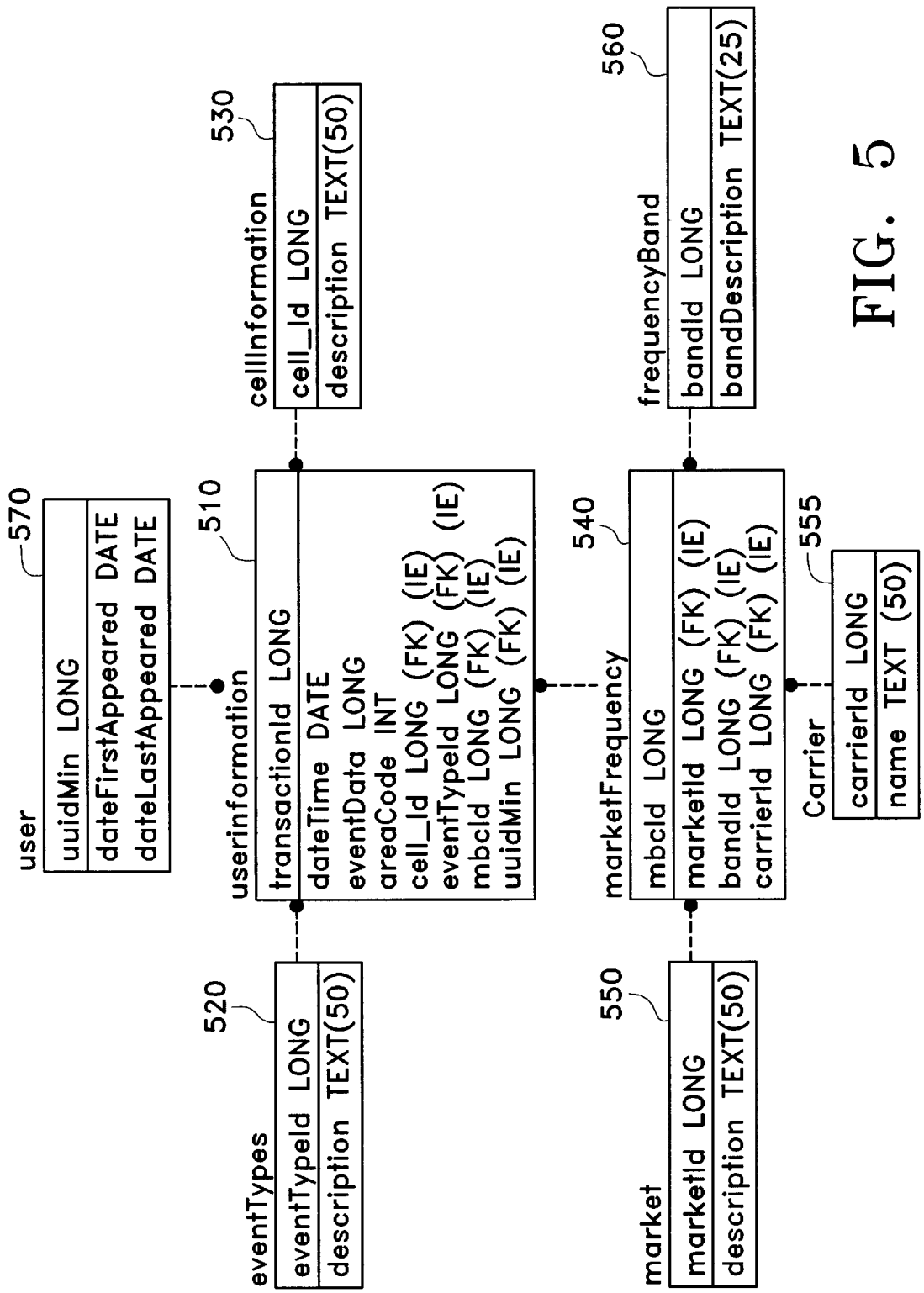
FIG. 5 is a representation of storage of the gathered data in a relational database.

Once the data files from each data gathering node (110) are processed into a single file of overhead messages, pages, traffic channel assignments, and registration events, this file is processed for storage in a relational database at the control center (120). A representation of the storage format for gathered data is shown in FIG. 5. A userinformation table (510) is created for each event containing fields on the event date and time, area code of the subscriber, cell site location, event type, market frequency band, and carrier. Information pertaining to the event type, cell site location, market, frequency band, and carrier fields is represented in the userinformation table (510) by an indexed numerical value, with a corresponding relational table for cross-referencing each indexed numerical value with a text description of its meaning.

Each type of event is designated an index value in the userinformation table (510), with a related eventType table (520) cross-referencing the index value with the type of event (page, traffic channel assignment, registrations). Similarly, the cell site location of the event is designated an index value, with a relational cellinformation table (530) cross-referencing the index value with a text description of the cell site locations.

Market, carrier, and frequency band information is allocated a single field in the userinformation table (510) and is designated a single index value. This index value is designated by a marketFrequency table (540), which contains individual fields for market, carrier, and frequency band information. The market is designated an index value in the marketFrequency table (540), with a relational market table (550) cross-referencing each index value with a text description of the corresponding market. Similarly, both the carrier and frequency band are each designated an index value in the marketFrequency table (540), with a relational Carrier table (555) and frequencyBand table (560) cross-referencing the index values with a text description of the corresponding carrier and frequency band.

All new data files received from all data gathering nodes (110) are backed up and archived on a regularly scheduled basis using the standard commercial features of a database management system. Standard archiving procedures are used to back up to an offline storage media such as magnetic tape or CD-ROM, which are then stored in a secure, fireproof safe.

A data mining application is run on the data file to aggregate and analyze the data to produce summary tables and reports. The format of a sample table is shown in FIG. 5. A user table (570) identifies each unique subscriber identification number and keeps track of the date the unique subscriber identification number first appeared and the date it last appeared. The user table (570) is updated each time a new file is processed. In the preferred embodiment, the data mining application is run at the control center (120). In an alternative embodiment, the data mining application can access the control center remotely to aggregate and analyze the data file stored at the control center (120). The data mining application generates periodic reports (monthly in the preferred embodiment) containing marketing and usage characterization information useful to wireless communication network service providers, wireless equipment manufacturers, service retailers, consultants, and financial institutions. Reports can be provided through web-based access, e-mail delivery, electronic data delivery, or hard print. In the presently preferred embodiment, such information comprises the share of subscribers relative to other wireless communication networks, the number of new subscribers, the number of churning subscribers (subscribers who have dropped their service), and the share of total calls made by subscribers of a wireless communication network relative to subscribers of other wireless communication networks, the number and share of roamers for each wireless communication network, and profiling of the quality of new, existing, and churning subscribers for each wireless communication network based upon the share of subscriber calls made.

In alternative embodiments, the data mining application may generate other types of marketing and usage characterization information, such as subscriber usage characteristics with respect to items such as number, time and location of calls made and received for each service provider, and use the number of gross adds for a wireless communication network following media advertising or special promotional pricing plans as a basis to track the impact and effectiveness of such advertising or special promotions. It is recognized that the data mining application can process the data files to generate many other types of marketing and usage characterization information similar to those described herein.

FIGS. 6 and 7 are sample excerpts of information contained in the data files stored at the control center (120) for illustration of how the data mining application generates information on market share of subscribers for each wireless communication network, the number and share of new subscribers and churning subscribers, the number and share of roamers, and share of total calls made by subscribers. Only data for two wireless communication networks is shown, but a complete file will have data for all wireless communication networks.

FIG. 6 represents excerpts of data files containing data taken during a baseline period. This baseline period raw data is compared to actual data received from service providers for the time period corresponding to the baseline period to determine how much data was missed by the data gathering system. FIG. 7 is a sample excerpt of a data file at the control center (120) that the data mining application is to analyze to generate marketing and usage characterization information.

The data mining application calculates the subscriber share for each wireless communication network by first generating a subscriber share gross-up coefficient that accounts for data that is missed by the data gathering nodes (120). The data mining application sorts through the baselining period data and generates a list of different subscriber identifiers that are contained in the baselining period data. These different subscriber identifiers are compared to a list of actual subscriber identifiers generated from information received from service providers to determine how many subscribers the data gathering nodes missed. The comparison of these two lists is shown in FIG. 8. FIG. 10 shows one method for calculating the subscriber share gross-up coefficient for each wireless communication network. The actual number of subscribers during the baseline period is divided by the number of measured subscribers during the baseline period. Alternatively, more comprehensive standard statistical methods can be used to calculate gross-up coefficients. The data gathering nodes will miss subscriber identifiers because not all of the cells in the wireless communication network are monitored simultaneously and continuously. As a result, for example, an event may have started and ended in a cell before being recorded. However, this base number of subscribers approximates the actual number of subscribers because as the number of recorded events increases, the number of unique subscriber identifier numbers grows asymptotically to the actual level. Although a particular event may be missed, the more data that is recorded in the future, the more likely future events involving the same unique subscriber identifiers may be recorded. Only one record is required to identify that a subscriber is active. Where the data collection period is a month, a sufficient number of events have been recorded to approach this asymptotic level. These additional factors may be taken into account when generating the gross-up coefficients for each wireless communication network.

Figure 11:
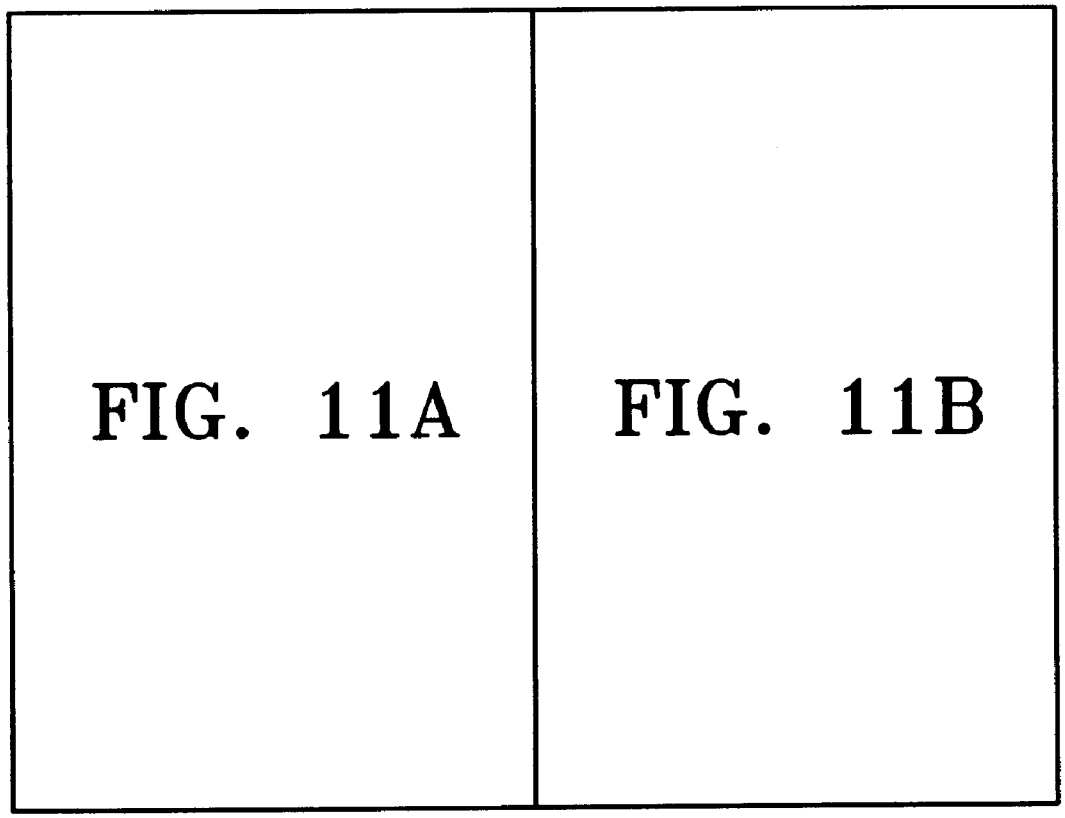
FIG. 11 is a sample report containing information on subscriber share.

To determine the share of subscribers for each wireless communication network, the data mining application sorts the data file and counts the number of different subscriber identifiers for each wireless communication network. FIG. 9 is the result of such a sort of the file shown in FIG. 7. The number of subscribers counted for each wireless communication network is multiplied by the corresponding subscriber share gross-up coefficient to generate an extrapolated number of subscribers for each wireless communication network. The market share of each wireless communication network is then generated by dividing the extrapolated number of subscribers for each wireless communication network by the total number of extrapolated subscribers for all wireless communication networks. FIG. 10 shows the extrapolation of the number of subscribers counted for each wireless communication network shown in FIG. 9 and the calculation of the subscriber share for each wireless communication network. A sample report containing information on subscriber share over a monthly period is shown in FIG. 11.

FIG. 12 is a sample excerpt of data for a particular time period in which it is desired to determine the number of new and churning subscribers since a prior collection period. The data mining application calculates the number of new subscribers added by over a particular time period by each wireless communication network by comparing a list of unique subscriber identifiers of the particular time period to a list of unique subscriber identifiers of a prior time period and counting the number of unique subscriber identifiers that do not appear in the prior period. Similarly, the number of churning subscribers for each wireless communication network who discontinued their service at the end of a prior time period is calculated by comparing a list of the unique subscriber identifiers of the particular time period to a list of unique subscriber identifiers of the prior time period and counting the number of unique subscriber identifiers that appear in the prior time period, but not the particular time period. FIG. 13 shows this process for a list of unique subscriber identifiers sorted from a prior time period data file shown in FIG. 7 and a list of unique subscriber identifiers from the particular time period shown in FIG. 12.

The number of new subscribers for each wireless communication network counted in FIG. 13 is multiplied by a corresponding new subscriber gross-up coefficient to generate an extrapolated number of new subscribers for each wireless communication network. The new subscriber gross-up coefficient can be calculated in many ways. In the presently preferred embodiment, the subscriber share gross-up coefficient calculated previously is used since the number of new subscribers missed by the data gathering nodes is proportional to the number of subscribers missed. The share of new subscribers for each wireless communication network is calculated by dividing the extrapolated number of new subscribers for each wireless communication network by the total number of extrapolated subscribers for all wireless communication networks. FIG. 14 shows the extrapolation of the number of new subscribers counted for each wireless communication network shown in FIG. 13 and the calculation of the new subscriber share for each wireless communication network.

Figure 16:
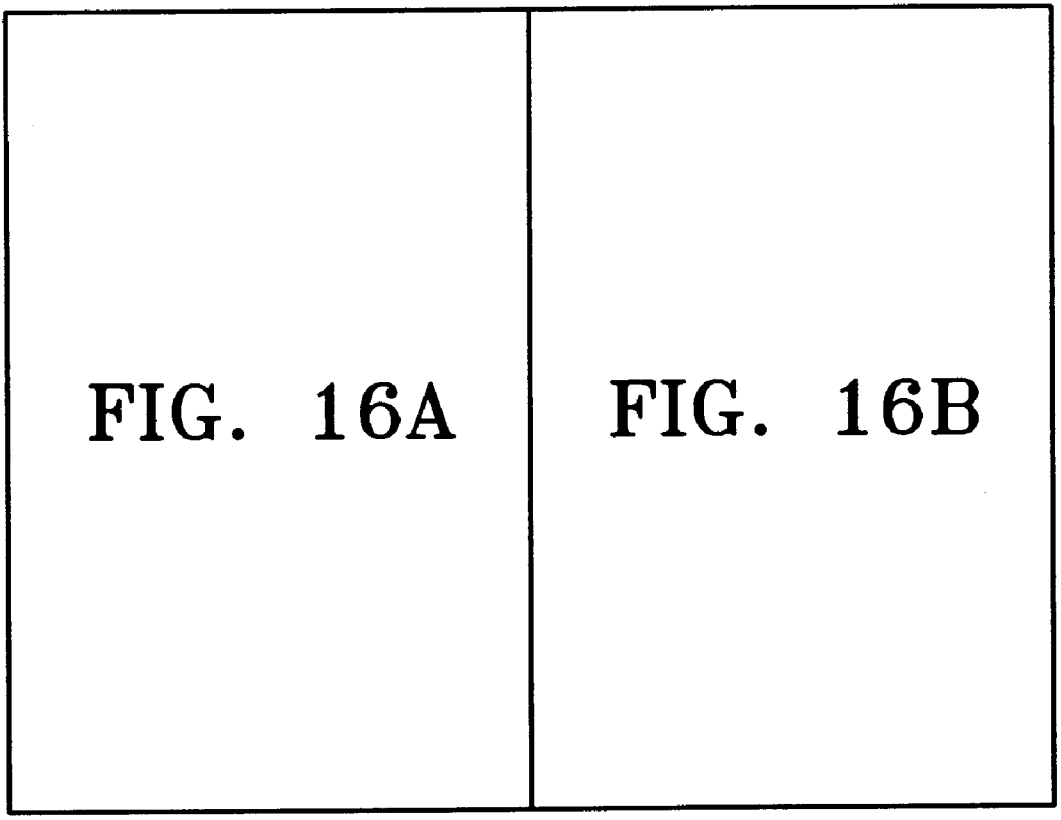
FIG. 16 is a sample report containing information on new subscribers.
Figure 17:
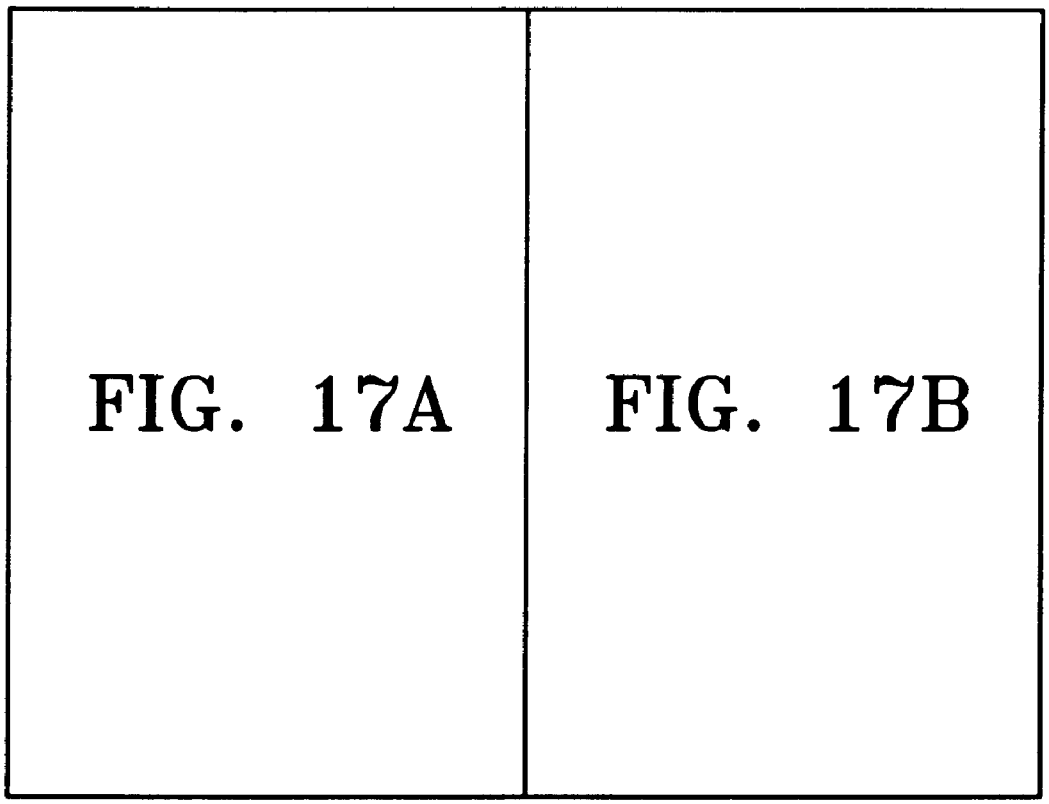
FIG. 17 is a sample report containing information on churning subscribers.

The same process for calculating share of new subscribers for each wireless communication network is followed for calculating the share of churning subscribers counted in FIG. 13. FIG. 15 shows the extrapolation of the number of churning subscribers counted for each wireless communication network shown in FIG. 13 and the calculation of the churning subscriber share for each wireless communication network. FIGS. 16 and 17 show sample reports containing information on new and churning subscribers over a monthly period.

The data mining application calculates the roamer share for each wireless communication network by first generating a roamer gross-up coefficient that accounts for data that is missed by the data gathering nodes (120). The data mining application sorts through the baseline period raw data shown in FIG. 6 and generates a list of roamers by identifying area codes outside the wireless communication network for which data is being gathered. This list of roamers is compared to a list of actual roamers generated from information received from service providers to determine how many roamers the data gathering nodes missed. The comparison of these two lists is shown in FIG. 18. A roamer gross-up coefficent is calculated by dividing the number of actual roamers by the measured number of roamers. The calculation of the roamer gross-up coefficient from the data in FIG. 18 is shown in FIG. 20.

Figures 21, 21A:
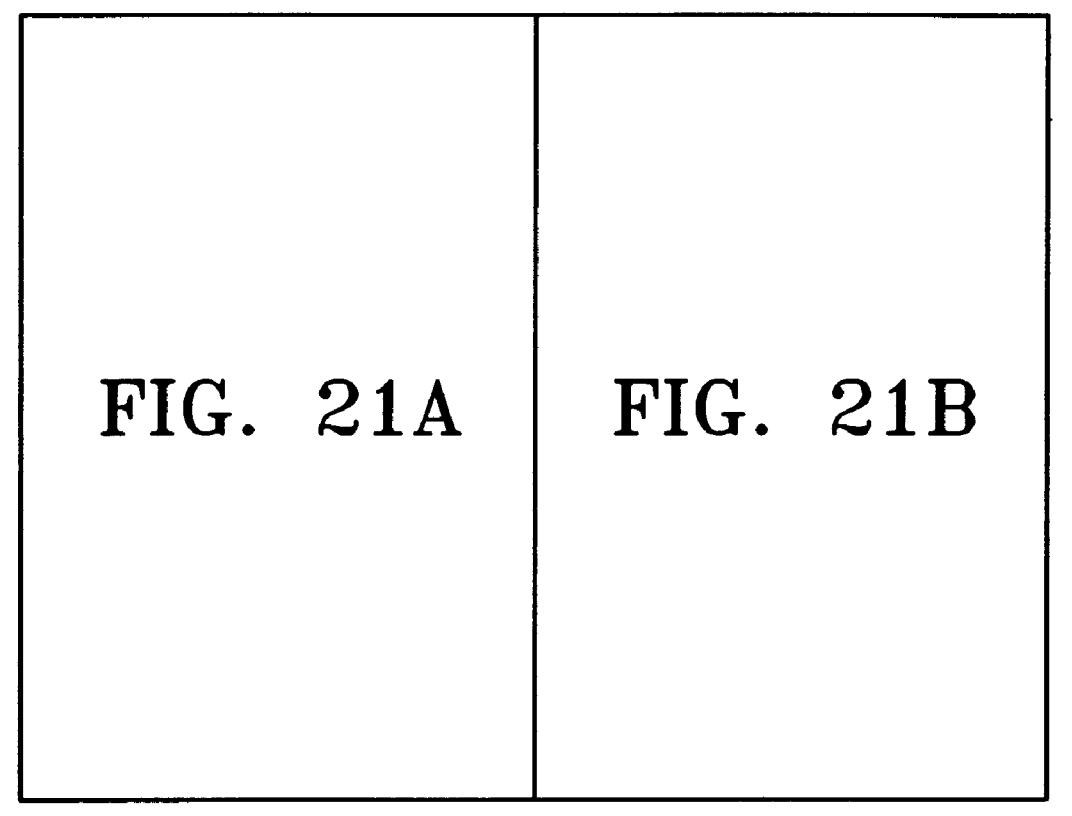

The data mining application calculates the number and share of roamers over a particular period for each wireless communication network by sorting the data file for the particular period and counting the number of roamers. FIG. 19 shows the result of such a data sort of the data file shown in FIG. 7. The number of roamers counted for each wireless communication network is multiplied by the corresponding roamer gross-up coefficient for each wireless communication network to generate an extrapolated number of roamers for each wireless communication network. The share of roamers for each wireless communication network is then generated by dividing the extrapolated number of subscribers for each wireless communication network by the total number of extrapolated roamers for all wireless communication networks. FIG. 20 shows the extrapolation of the number of roamers counted for each wireless communication network shown in FIG. 19 and the calculation of the roamer share for each wireless communication network. A sample report showing roamer activity over a monthly period is shown in FIG. 21.

The data mining application calculates the call share for each wireless communication network by first generating a call share gross-up factor that accounts for data that is missed by the data gathering nodes (120). The data mining application sorts through the baselining period raw data shown in FIG. 6 and generates a list counting the number of traffic channel assignments made, which correspond to subscriber calls. This data sort is compared to a list of actual traffic channel assignments generated from data received from service providers to determine how many calls the data gathering nodes missed. The comparison of these two lists is shown in FIG. 22. The call share gross-up coefficient is calculated by dividing the number of actual traffic channel assignments made by the measured number of traffic channel assignments made.

Figures 25, 25A:
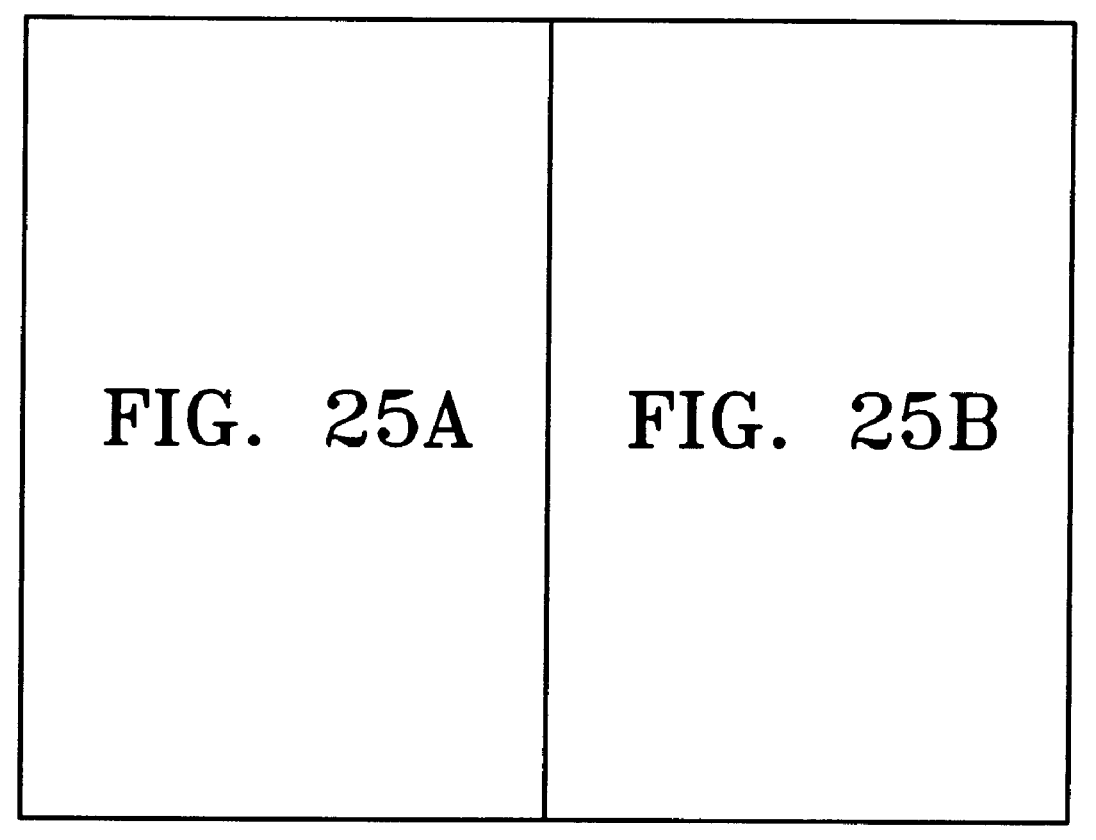

The number of traffic channel assignments made for each wireless communication network is multiplied by the corresponding call share gross-up coefficent for each wireless communication network to generate an extrapolated number of traffic channel assignments for each wireless communication network. The share of calls made for each wireless communication network is generated by dividing the extrapolated number of traffic channel assignments made for each wireless communication network by the total number of extrapolated traffic channel assignments for all wireless communication networks. FIG. 24 shows the extrapolation of the number of traffic channel assignments made for each wireless communication network and the calculation of call share for each wireless communication network. A sample report containing information on caller share over a monthly period is shown in FIG. 25.

The data mining application also processes the data files to generate information on the quality of the base, new, and churning subscribers for each wireless communication network based upon the number of calls each subscriber of each wireless communication network makes. FIG. 26 is a sample excerpt of a data file stored at the control center (120) for illustration of how the data mining application generates information on the quality of base subscribers for each wireless communication network. Only data for two wireless communication networks is shown, but a complete file will have data for all wireless communication network.

The data mining application calculates the quality of base subscribers over a particular period by sorting the data file for the particular period, identifying each different subscriber for each wireless communication network, and counting the number of traffic channel assignments made to each different subscriber. FIG. 27 shows such a data sort of the file excerpt shown in FIG. 26. This data is further sorted by number of traffic channel assignments to produce a list of subscribers with the highest number of traffic channel assignments listed first and the subscribers with the lowest number of traffic channel assignments listed last. FIG. 28 shows such a data sort of the data found in FIG. 27. In the presently preferred embodiment, this list is divided into quartiles based on the number of traffic channel assignments made. For each quartile, the number of subscribers for each wireless communication network is counted. FIG. 29 shows such a data sort of the data found in FIG. 28. For each quartile, the market share percentage of each wireless communication network is calculated by dividing the number of subscribers for each wireless communication network by the total number of subscribers for all wireless communication networks in the quartile. FIG. 30 shows sample market share calculations for base subscribers for the data found in FIG. 29.

FIGS. 31 and 32 are sample excerpts of data files stored at the control center (120) for illustration of how the data mining application generates information on the quality of new and churning subscribers of each wireless communication network. The data shown in FIG. 32 is taken at a particular time period later than FIG. 31. The data mining application first identifies which subscribers are new subscribers and which subscribers are churning using a similar process to that described earlier when determining the number and share of added and churning subscribers. The data mining application identifies the number of new subscribers added by over a particular time period by each wireless communication network by comparing a list of unique subscriber identifiers of the particular time period to a prior time period and counting the number of unique subscriber identifiers that do not appear in the prior period. Similarly, the number of subscribers for each wireless communication network who discontinued their service at the end of a prior time period is approximated by comparing a list of the unique subscriber identifiers of the particular time period to the prior time period and counting the number of unique subscriber identifiers that appear in the prior time period, but not the present time period.

Sample data excerpted from a particular time period in which it is desired to calculate the number of new and dropped subscribers is shown in FIG. 32. The data mining applications sorts through the raw data of FIG. 32 and generates a list of different subscriber identifiers for each wireless communication network. The data mining application then sorts through the raw data of a prior time period, shown in FIG. 31, and generates a list of different subscribers for each wireless communication network. These lists are compared to identify the new subscribers appearing in the particular time period but not the prior time period and to identify the churning subscribers appearing in the prior time period, but not the particular time period. The comparison of these two lists is shown in FIG. 33.

Figure 33:
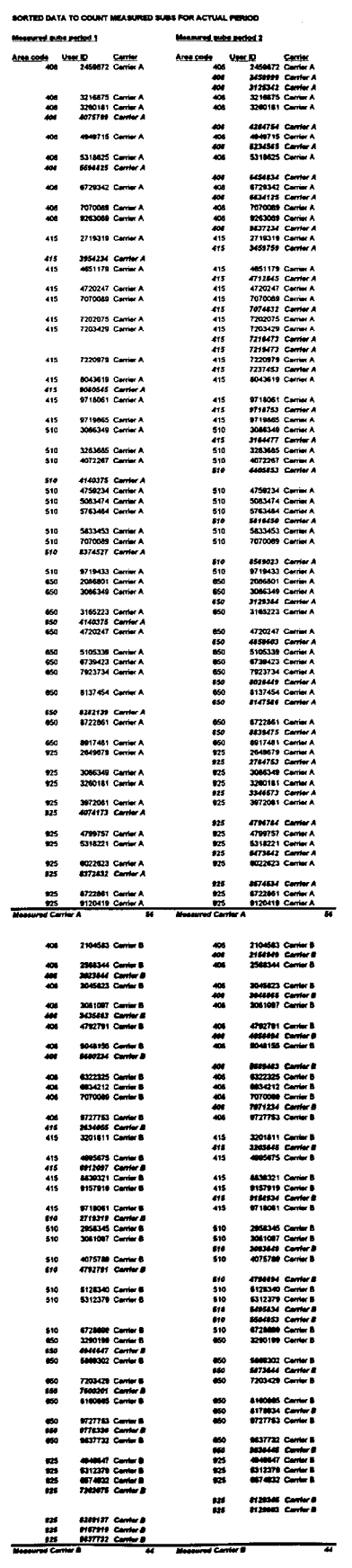

To calculate the quality of new subscribers for each wireless communication network, the data mining application re-sorts the data in FIG. 32, counting the number of traffic channel assignments made to the new subscribers identified from the data in FIG. 33 for each wireless communication network. The results of this data sort are shown in FIG. 34. This data is further sorted by number of traffic channel assignments to produce a list of new subscribers with the highest number of traffic channel assignments listed first and the new subscribers with the lowest number of traffic channel assignments listed last. FIG. 35 shows such a data sort of the data found in FIG. 34. In the presently preferred embodiment, this list is divided into quartiles based on the number of traffic channel assignments made. For each quartile, the number of new subscribers for each wireless communication network is counted. FIG. 36 shows such a data sort of the data found in FIG. 35. For each quartile, the market share percentage of new subscribers for each wireless communication network is calculated by dividing the number of new subscribers for each wireless communication network by the total number of new subscribers for all wireless communication networks in the quartile. FIG. 37 shows sample market share percentage calculations for new subscribers for the data found in FIG. 36.

To calculate the quality of churning subscribers for each wireless communication network, the data mining application re-sorts the data in FIG. 31, counting the number of traffic channel assignments made to the churning subscribers identified from the data in FIG. 33 for each wireless communication network. The results of this data sort are shown in FIG. 38. This data is further sorted by number of traffic channel assignments to produce a list of churning subscribers with the highest number of traffic channel assignments listed first and the new subscribers with the lowest number of traffic channel assignments listed last. FIG. 39 shows such a data sort of the data found in FIG. 38. In the presently preferred embodiment, this list is divided into quartiles based on the number of traffic channel assignments made. For each quartile, the number of churning subscribers for each wireless communication network is counted. FIG. 40 shows such a data sort of the data found in FIG. 39. For each quartile, the market share percentage of churning subscribers for each wireless communication network is calculated by dividing the number of churning subscribers for each wireless communication network by the total number of churning subscribers for all wireless communication networks in the quartile. FIG. 41 shows sample market share percentage calculations for churning subscribers for the data found in FIG. 40.

The market share and usage characterization information generated by the data mining application is useful to useful to wireless communication network service providers, enabling them to (1) quantitatively compare themselves to competitors (2) better understand the utilization patterns of the customer base within a region, (3) tailor their sales and marketing expenditures toward this customer base, and (4) evaluate the success of pricing, promotions, and advertising programs introduced within a market.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiment but, on the contrary, is intended to cover various modifications and equivalent arrangements included within the scope of the appended claims.

What is claimed is:

1. A system for gathering data from a plurality of wireless communication networks, said system comprising:
   a plurality of data gathering nodes, each data gathering node of said plurality of data gathering nodes comprising:
      an antenna system; and
      a plurality of receivers tuned to gather data from the plurality of wireless communication networks, each receiver of said plurality of receivers coupled to said antenna system; and
   a control center coupled to said plurality of data gathering nodes, said control center processing data received from said plurality of data gathering nodes, wherein the control center further comprises a relational database for storing data gathered by said plurality of data gathering nodes, and wherein the relational database utilizes event type, cell location, market location, carrier location, and frequency band relational tables to cross-reference index value meanings in a user information table.

2. A system for gathering data from a plurality of wireless communication networks, said system comprising:
   a plurality of data gathering nodes, each data gathering node of said plurality of data gathering nodes comprising:
      an antenna system; and
      a plurality of receivers tuned to gather data from the plurality of wireless communication networks, each receiver of said plurality of receivers coupled to said antenna system;
   a control center coupled to said plurality of data gathering nodes, said control center processing data received from said plurality of data gathering nodes; and
   a data mining application that processes the data gathered by said plurality of data gathering nodes to produce marketing and usage characterization information.

3. The system of claim 2 wherein said marketing and usage characterization information produced comprises information on subscriber share, call share, number of new subscribers, and number of churning subscribers for each wireless communication network of the plurality of wireless communication networks.

4. A system for gathering data from a plurality of wireless communication networks, each wireless communication network of said plurality of wireless communication networks comprising a cell layout of cell sites divided into location areas that overlap the cell layout of each other wireless communication network in a given geographic area, said system comprising:
   a plurality of data gathering nodes, each data gathering node of said plurality of data gathering nodes comprising:
      an antenna system; and
      a plurality of receivers tuned to gather data from the plurality of wireless communication networks, each receiver of said plurality of receivers coupled to said antenna system, wherein at least one data gathering node of said plurality of data gathering nodes is placed in a different location area of each wireless communication network of said plurality of wireless communication networks allowing it to gather data from a group of cell sites, and
      wherein each data gathering node gathers data for a time period from a first cell in a cell group of each wireless communication network, then gathers data for a time period from a second cell in a cell group of each wireless communication network, and then gathers data for a time period from each cell in a cell group of each wireless communication network until data has been gathered for all cells in a cell group of each wireless communication network; and
   a control center coupled to said plurality of data gathering nodes, said control center processing data received from said plurality of data gathering nodes.

5. A method for gathering data from a plurality of wireless communication networks comprising the steps of:
   deploying a plurality of data gathering nodes at various geographic locations in a plurality of wireless communication networks;
   gathering data at said plurality of data gathering nodes from each wireless communication network of said plurality of wireless communication networks; and
   processing the data at a control center using a data mining application to produce marketing and usage characterization information useful for wireless communication network service providers to determine their relative strengths and weaknesses to other wireless communication network service providers.

6. A method for gathering data from a plurality of wireless communication networks, wherein each wireless communication network of said plurality of wireless communication networks comprises a layout of cell sites divided into location areas, the method comprising:

deploying a plurality of data gathering nodes at various geographic locations in a plurality of wireless communication networks, comprising placing at least one data gathering node of said plurality of data gathering nodes in each location area of each wireless communication network of said plurality of wireless communication networks;

gathering data at said plurality of data gathering nodes from each wireless communication network of said plurality of wireless communication networks, comprising:

at each data gathering node of said plurality of data gathering nodes, employing a sampling algorithm to gather data from a cell group of each wireless communication network of said plurality of wireless communication networks; and simultaneously employing said sampling algorithm at all data gathering nodes of said plurality of data gathering nodes to gather data from each location area of said plurality of wireless communication networks; and processing the data at a control center.

7. The method of claim 6, wherein said sampling algorithm to gather data from a cell group of each wireless communication network, comprising the steps of:

monitoring the channel assignment of a first cell base station for a time period for each wireless communication network;

changing the monitoring frequency to monitor the channel assignment of a second cell base station for a time period for each wireless communication network; and changing the monitoring frequency to monitor the channel assignment of the base station of each of N cells for a time period for each wireless communication network, where N equals the number of cells in each cell group of the data gathering node and is not necessarily equal for each wireless communication network.

* * * * *